US011859577B2

(12) United States Patent
Kashiwa et al.

(10) Patent No.: US 11,859,577 B2
(45) Date of Patent: Jan. 2, 2024

(54) ENGINE DEVICE

(71) Applicant: Yanmar Power Technology Co., Ltd., Osaka (JP)

(72) Inventors: Koki Kashiwa, Osaka (JP); Hiroaki Naganawa, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 25 days.

(21) Appl. No.: 17/406,046

(22) Filed: Aug. 18, 2021

(65) Prior Publication Data

US 2021/0381466 A1 Dec. 9, 2021

Related U.S. Application Data

(63) Continuation of application No. 16/809,213, filed on Mar. 4, 2020, now Pat. No. 11,125,182, which is a continuation of application No. 16/091,833, filed as application No. PCT/JP2017/012962 on Mar. 29, 2017, now Pat. No. 10,598,124.

(30) Foreign Application Priority Data

Apr. 8, 2016 (JP) ................................ 2016-078465
Apr. 8, 2016 (JP) ................................ 2016-078466

(51) Int. Cl.

| | |
|---|---|
| ***F02F 7/00*** | (2006.01) |
| ***F02N 15/00*** | (2006.01) |
| ***F02B 67/00*** | (2006.01) |
| ***F01M 1/10*** | (2006.01) |
| ***F01M 11/03*** | (2006.01) |
| ***F01P 7/16*** | (2006.01) |
| ***F01M 5/00*** | (2006.01) |

(52) U.S. Cl.

CPC ............ *F02F 7/0073* (2013.01); *F01M 1/10* (2013.01); *F01M 5/002* (2013.01); *F01M 11/03* (2013.01); *F01P 7/16* (2013.01); *F02B 67/00* (2013.01); *F02F 7/0068* (2013.01); *F02N 15/006* (2013.01); *F01M 2011/033* (2013.01)

(58) Field of Classification Search

CPC ........ F02F 7/0073; F02F 7/0068; F01M 1/10; F01M 5/002; F01M 11/03; F01M 2011/033; F01P 7/16; F02B 67/00; F02N 15/006

See application file for complete search history.

(56) References Cited

U.S. PATENT DOCUMENTS

2011/0088649 A1* 4/2011 Minneker, Jr. ........ F16H 57/025 123/179.25

* cited by examiner

*Primary Examiner* — Jacob M Amick

(74) *Attorney, Agent, or Firm* — Chris Mizumoto

(57) ABSTRACT

An engine device including a cylinder block having one side portion to which a flywheel that is rotated integrally with a crankshaft is disposed. The engine device is provided with a starter that transmits a rotational force to the flywheel at a time of engine start. A flywheel housing, which accommodates the flywheel and includes a starter attachment pedestal for attaching the starter, is attached to the one side portion of the cylinder block. The starter is disposed inner side of the engine than a portion of the flywheel housing, the portion being located outermost in the engine with respect to a direction that is perpendicular to a direction along a crankshaft center and that is parallel to the cylinder head joining surface of the cylinder block.

20 Claims, 37 Drawing Sheets

ENGINE DEVICE

CROSS REFERENCES TO RELATED APPLICATIONS

This application is a continuation of U.S application Ser. No. 16/809,213, filed Mar. 4, 2020, which is a continuation of U.S. patent application Ser. No. 16/091,833, filed Oct. 5, 2018, which is a national stage application pursuant to 35 U.S.C. § 371 of International Application No. PCT/JP2017/012962, filed on Mar. 29, 2017, which claims priority under 35 U.S.C. § 119 to JP Patent Application Nos. 2016-078465 filed on Apr. 8, 2016 and JP Patent Application No. 2016-078466 filed on Apr. 8, 2016, the disclosures of which are hereby incorporated by reference in their entireties.

DESCRIPTION

Technical Field

The present invention relates to an engine device, and particularly to an engine device including a flywheel and a starter, the flywheel being disposed on one side of a cylinder block and being rotated integrally with a crankshaft, the starter being configured to transmit a rotational force to the flywheel at a time of engine start.

Background Art

An engine device in which a flywheel that is rotated integrally with a crankshaft is disposed on one side of a cylinder block is well known (see, for example, Patent Literature 1 (PTL 1)). The flywheel has, on its outer circumference, a ring gear configured to be meshed with a pinion gear of an engine starting starter. At a time of engine start, the crankshaft is rotated by the starter via the flywheel, to activate the engine.

An engine starting starter has a complicated structure including, for example, a mechanism for sliding a pinion gear so that the pinion gear is separatably meshed with a ring gear of a flywheel, and a mechanism for reducing a motor rotational frequency in order to exert a high torque on rotation of the pinion gear. This raises a problem that the starter is likely to be broken down by contact with a foreign object.

PATENT LITERATURE

PTL 1: Japanese Patent Application Laid-Open No. 2012-189027

SUMMARY OF INVENTION

In view of the problems described above, an object of the present invention is to reduce contact of a foreign object with the starter.

An engine device according to an aspect of the present invention is an engine device including a cylinder block having one side portion to which a flywheel that is rotated integrally with a crankshaft is disposed, the engine device being provided with a starter that transmits a rotational force to the flywheel at a time of engine start, wherein: a flywheel housing that accommodates the flywheel and that includes a starter attachment pedestal for attaching the starter is attached to the one side portion; and the starter is disposed inner of an engine than a portion of the flywheel housing, the portion being located outermost in the engine with respect to a direction that is perpendicular to a crankshaft center direction and that is parallel to a cylinder head joining surface of the cylinder block.

The engine device according to the aspect of the present invention may be configured as, for example, follows. The cylinder block may be formed integrally with a pair of housing bracket portions and reinforcing ribs, the pair of housing bracket portions protruding from opposite side portions of the cylinder block extending along the crankshaft center direction, the pair of housing bracket portions protruding from end portions of the opposite side portions close to the one side portion, the reinforcing ribs being flared at their sides close to the corresponding housing bracket portions so that each of the reinforcing ribs is across each of the housing bracket portions and a side wall of each of the opposite side portions. The flywheel housing may have, in its peripheral edge portion, the starter attachment pedestal at a location exposed to a bracket recessed portion that is formed by a peripheral edge portion of the housing bracket portion being recessed. The cylinder block may have the reinforcing rib at a location near the bracket recessed portion.

The engine device according to the aspect of the present invention may be configured as, for example, follows. There may be provided a turbocharger lubricant pipe for circulating a lubricant to a turbocharger, and an EGR cooler for cooling an EGR gas that is part of an exhaust gas and that is mixed with fresh air; and the starter may be disposed at a position overlapping neither the turbocharger lubricant pipe nor the EGR cooler when viewed from the cylinder head joining surface side.

The engine device according to the aspect of the present invention may be configured as, for example, follows. A motor shaft center of the starter may be disposed below the crankshaft center with respect to a direction perpendicular to the cylinder head joining surface.

The engine device according to the aspect of the present invention may be configured as, for example, follows. There may be provided: an oil cooler for heat exchange between a lubricant and a coolant, and an oil filter for purifying a lubricant; and a bracket member that supports the oil cooler and the oil filter, the bracket member being attached to the cylinder block. A coolant outlet, a coolant return port, a lubricant outlet, and a lubricant return port may be provided in an attaching part of the cylinder block to which the bracket member is attached. Via the bracket member, a coolant and a lubricant may be circulated in the oil cooler, and a lubricant may be circulated in the oil filter.

A configuration may be also possible, for example, in which: the bracket member has a coolant inflow hole to be connected to the coolant outlet, and a coolant outflow hole to be connected to the coolant return port; and a fluid passage cross-sectional area of the coolant outflow hole is smaller than a fluid passage cross-sectional area of the coolant inflow hole.

A configuration may be also possible, for example, in which: the bracket member has, in its surface parallel to a joining surface joined to the attaching part, an oil cooler attaching part to which the oil cooler is attached; and the bracket member has, on a distal end side of a coupling portion provided upright on the oil cooler attaching part, an oil filter attaching part to which the oil filter is attached on the side opposite to the oil cooler.

The engine device according to an embodiment of the present invention has a flywheel housing attached to one side portion thereof, the flywheel housing accommodating a flywheel and including a starter attachment pedestal to which a starter is attached, and the starter is disposed inner of an engine than a portion of the flywheel housing, the portion being located outermost in the engine with respect to a direction that is perpendicular to a crankshaft center direction and that is parallel to a cylinder head joining surface of a cylinder block. This configuration can reduce contact of a foreign object with the starter. Accordingly, breakdown of the starter and mispositioning in attachment can be reduced or minimized, which may otherwise be caused by contact with a foreign object.

The engine device according to the embodiment may be configured such that: the cylinder block is formed integrally with a pair of housing bracket portions and reinforcing ribs, the pair of housing bracket portions protruding from opposite side portions of the cylinder block extending along the crankshaft center direction, the pair of housing bracket portions protruding from end portions of the opposite side portions close to the one side portion, the reinforcing ribs being flared at their sides close to the corresponding housing bracket portions so that each of the reinforcing ribs is across each of the housing bracket portions and a side wall of each of the opposite side portions; the flywheel housing has, in its peripheral edge portion, the starter attachment pedestal at a location exposed to a bracket recessed portion that is formed by a peripheral edge portion of the housing bracket portion being recessed; and the cylinder block has the reinforcing rib at a location near the bracket recessed portion. This configuration can enhance a rigidity of the starter attachment pedestal and therearound. Thus, mispositioning and deformation of the starter can be prevented, which may otherwise be caused by, for example, distortion of the starter attachment pedestal. Accordingly, breakdown of the starter and poor meshing between a pinion gear of the starter and a ring gear of the flywheel can be prevented.

The engine device according to the embodiment may be, for example, configured such that: there is provided a turbocharger lubricant pipe for circulating a lubricant to a turbocharger, and an EGR cooler for cooling an EGR gas that is part of an exhaust gas and that is mixed with fresh air; and the starter is disposed at a position overlapping neither the turbocharger lubricant pipe nor the EGR cooler when viewed from the cylinder head joining surface side. With this configuration, even when a liquid such as the lubricant leaks from the turbocharger or a liquid such as the coolant leaks from the EGR cooler, the liquid can be prevented from adhering to the starter, so that stain and breakdown of the starter can be prevented, which may otherwise be caused by adherence of the liquid.

The engine device according to the embodiment may be configured such that a motor shaft center of the starter is disposed below the crankshaft center with respect to a direction perpendicular to the cylinder head joining surface. This configuration can lower the center of gravity of the engine device as compared to a configuration in which a motor axis, which occupies a large percentage of the total weight of the starter, is disposed above the crankshaft center. Accordingly, the center of gravity of a vehicle equipped with the engine device can be lowered.

The engine device according to the embodiment may include: an oil cooler for heat exchange between a lubricant and a coolant, and an oil filter for purifying a lubricant; and a bracket member that supports the oil cooler and the oil filter, the bracket member being attached to the cylinder block, and may be configured such that: a coolant outlet, a coolant return port, a lubricant outlet, and a lubricant return port are provided in an attaching part of the cylinder block to which the bracket member is attached; and via the bracket member, a coolant and a lubricant are circulated in the oil cooler, and a lubricant is circulated in the oil filter. This configuration eliminates the need to provide coolant piping to be connected to the oil cooler and a lubricant pipe member for connecting the oil cooler to the oil filter, thus reducing the number of component parts. In addition, since the oil cooler and the oil filter are supported by the same single bracket member, the oil cooler and the oil filter can be arranged compactly, and moreover a structure for attaching them can be simplified.

The engine device according to the embodiment may be configured such that: the bracket member has a coolant inflow hole to be connected to the coolant outlet, and a coolant outflow hole to be connected to the coolant return port; and a fluid passage cross-sectional area of the coolant outflow hole is smaller than a fluid passage cross-sectional area of the coolant inflow hole. This can raise a water pressure in the coolant path that extends from the coolant outlet provided in the attaching part of the cylinder block, through the coolant inflow hole and a coolant passage provided in the oil cooler, to the coolant outflow hole. Accordingly, a phenomenon in which a larger amount of coolant than necessary flows out from the coolant inflow hole to the coolant return port to drop the water pressure in a coolant passage provided inside the cylinder block can be prevented. Thus, a deterioration in the cooling efficiency of the engine device can be prevented.

The engine device according to the embodiment may be configured such that: the bracket member has, in its surface parallel to a joining surface joined to the attaching part, an oil cooler attaching part to which the oil cooler is attached; and the bracket member has, on a distal end side of a coupling portion provided upright on the oil cooler attaching part, an oil filter attaching part to which the oil filter is attached on the side opposite to the oil cooler. This allows the oil filter to protrude substantially in parallel to a lateral side portion of the cylinder block, which enables the oil cooler and the oil filter to be arranged compactly and also enables the oil filter to protrude from the lateral side portion of the cylinder block by a shortened distance, thereby compactifying the engine device.

DESCRIPTION OF EMBODIMENT

Figure 1:
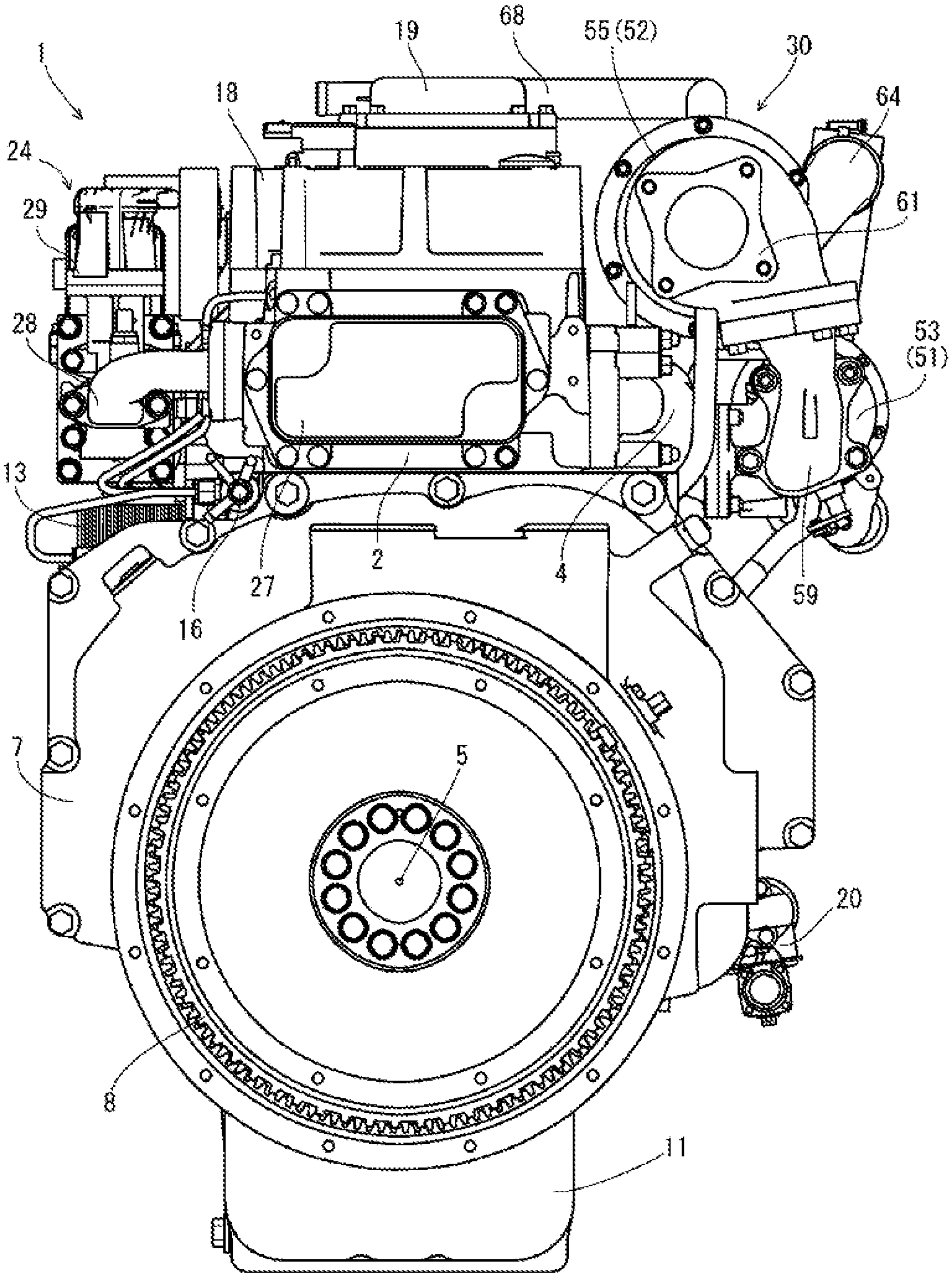
FIG. 1 is a front view of an engine.
Figure 2:
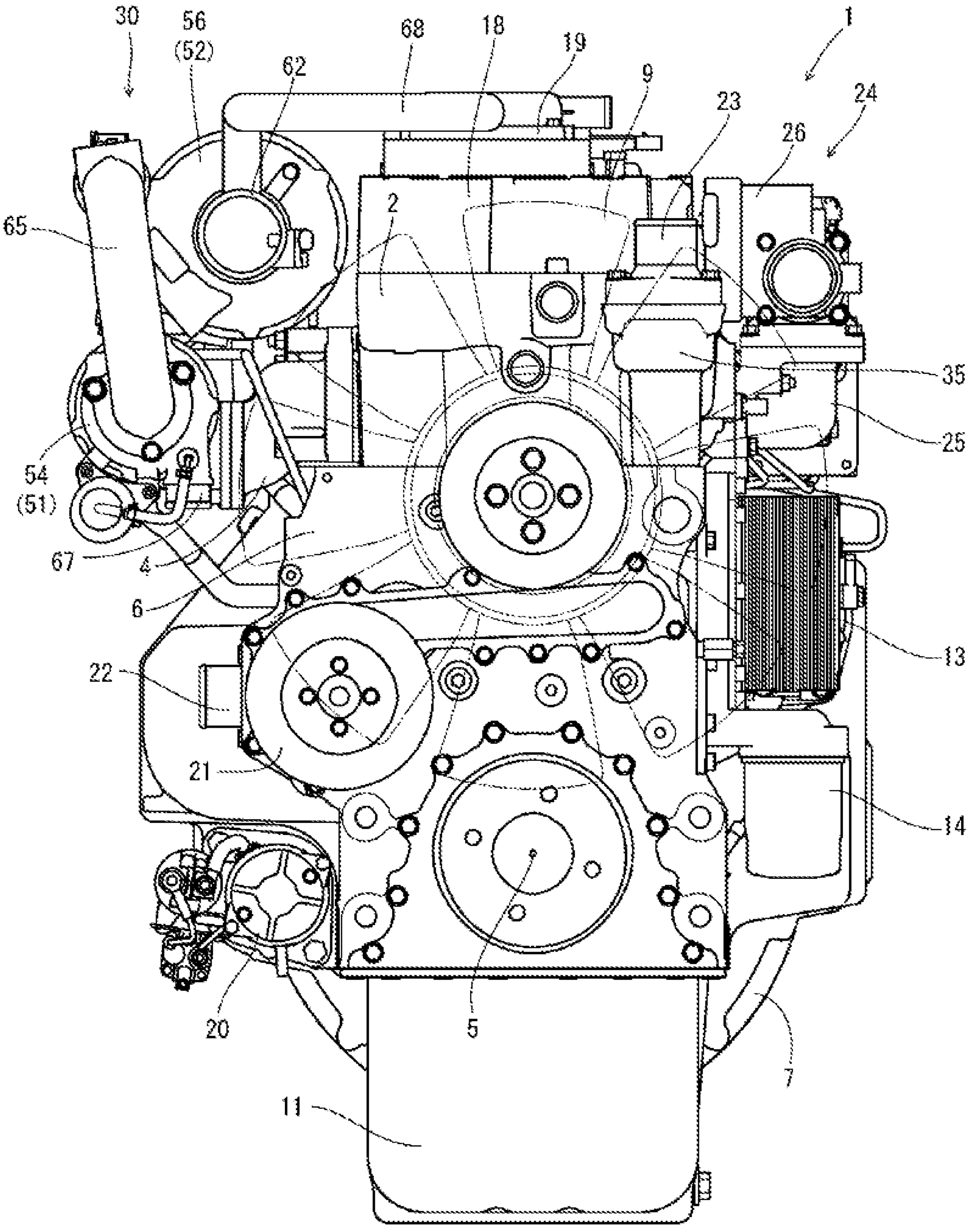
FIG. 2 is a rear view of the engine.
Figure 3:
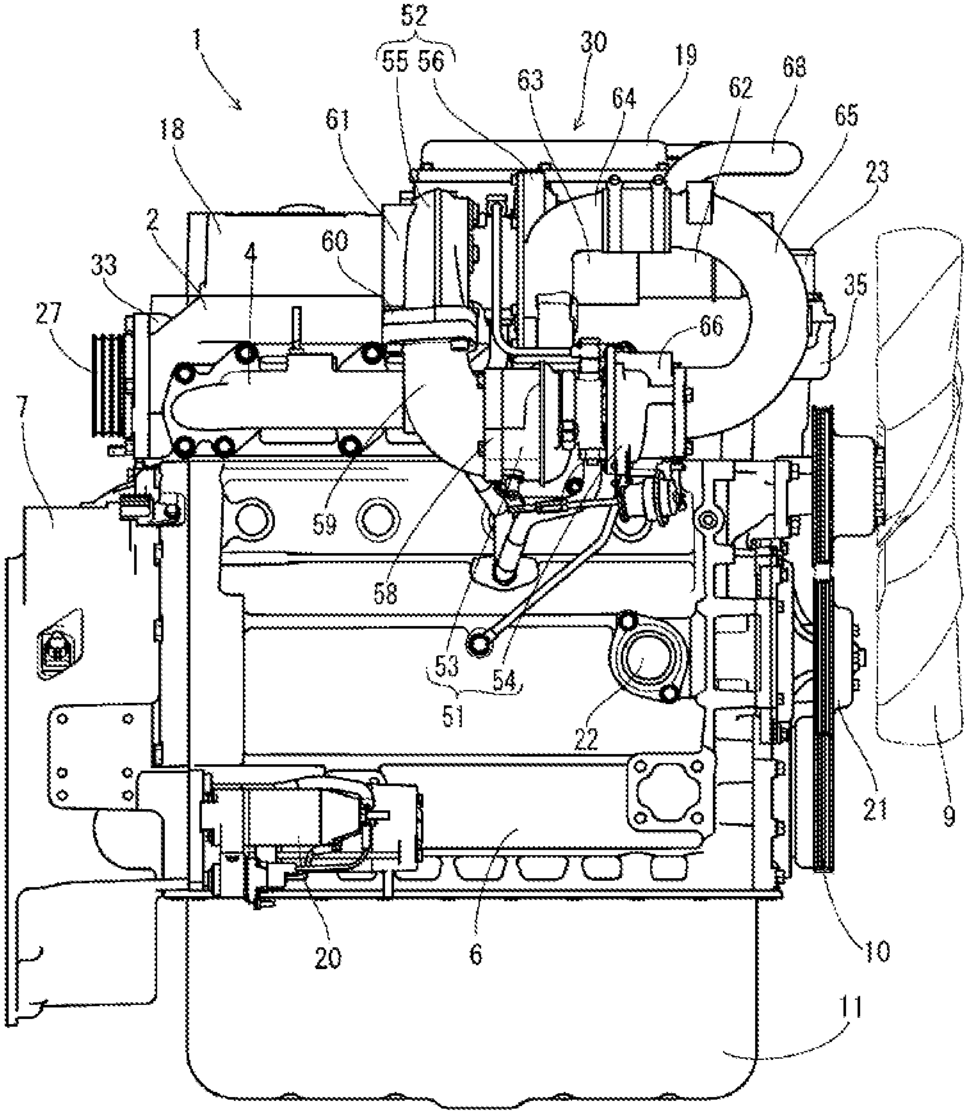
FIG. 3 is a left side view of the engine.
Figure 4:
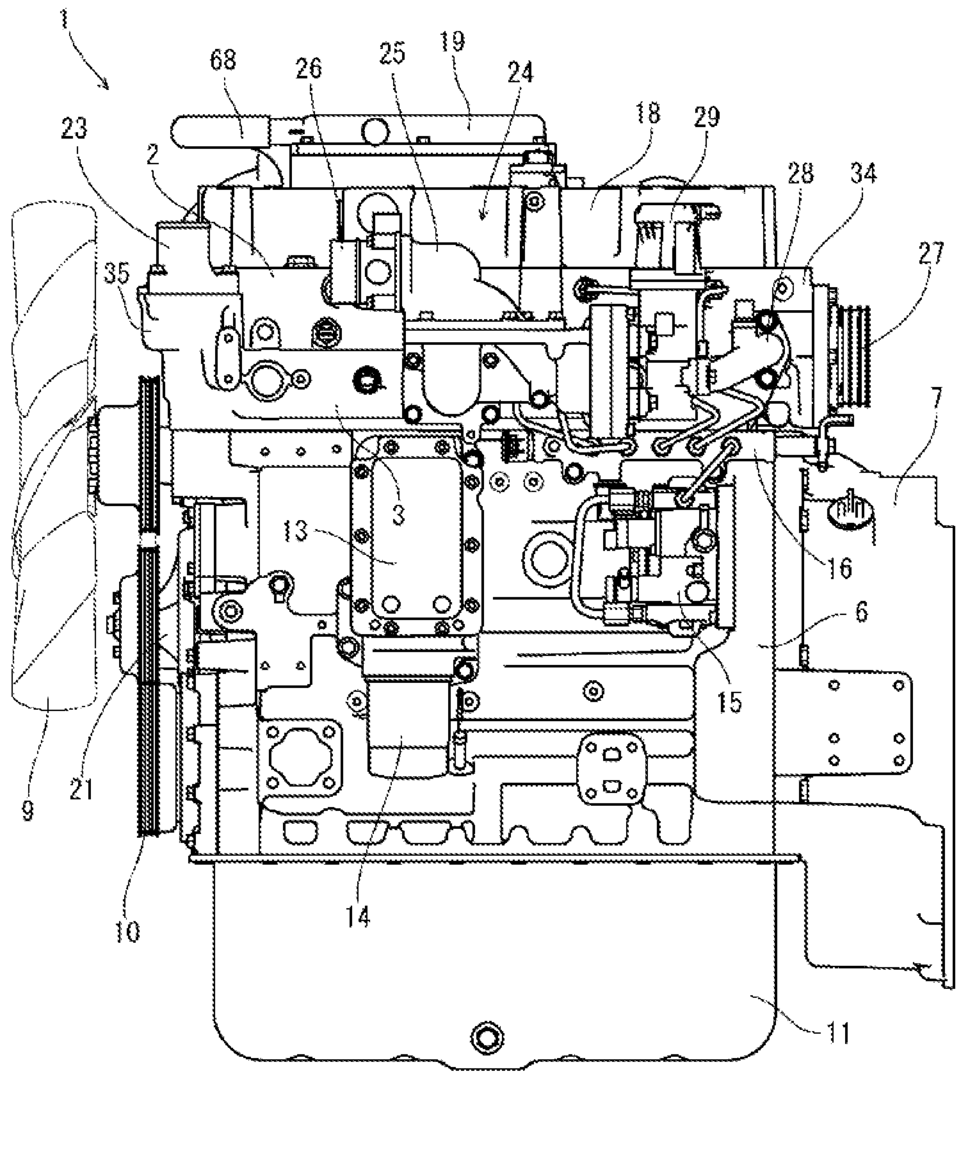
FIG. 4 is a right side view of the engine.

In the following, an embodiment of the present invention will be described with reference to the drawings. First, referring to FIG. 1 to FIG. 8, an overall structure of an engine (engine device) constituted by a diesel engine will be described. In the descriptions below, opposite side portions parallel to a crankshaft 5 (side portions on opposite sides relative to the crankshaft 5) will be defined as left and right, a side where a flywheel housing 7 is disposed will be defined as front, and a side where a cooling fan 9 is disposed will be defined as rear. For convenience, these are used as a benchmark for a positional relationship of left, right, front, rear, up, and down in an engine 1.

As shown in FIG. 1 to FIG. 8, an intake manifold 3 and an exhaust manifold 4 are disposed in one side portion and the other side portion of the engine 1 parallel to the crankshaft 5. In the embodiment, the intake manifold 3 provided on a right surface of a cylinder head 2 is formed integrally with the cylinder head 2. The exhaust manifold 4 is provided on a left surface of the cylinder head 2. The cylinder head 2 is mounted on a cylinder block 6 in which the crankshaft 5 and a piston (not shown) are disposed. The cylinder block 6 pivotally supports the crankshaft 5 such that the crankshaft 5 is rotatable.

The crankshaft 5 has its front and rear distal ends protruding from front and rear surfaces of the cylinder block 6. The flywheel housing 7 is fixed to one side portion of the engine 1 (in the embodiment, a front surface side of the cylinder block 6) intersecting the crankshaft 5. A flywheel 8 is disposed in the flywheel housing 7. The flywheel 8, which is pivotally supported on the front end side of the crankshaft 5, is configured to rotate integrally with the crankshaft 5. The flywheel 8 is configured such that power of the engine 1 is extracted to an actuating part of a work machine (for example, a hydraulic shovel, a forklift, or the like) through the flywheel 8. The cooling fan 9 is disposed in the other side portion of the engine 1 (in the embodiment, a rear surface side of the cylinder block 6) intersecting the crankshaft 5. A rotational force is transmitted from the rear end side of the crankshaft 5 to the cooling fan 9 through a V-belt 10.

An oil pan 11 is disposed on a lower surface of the cylinder block 6. A lubricant is stored in the oil pan 11. The lubricant in the oil pan 11 is suctioned by an oil pump 12 (see FIG. 11) disposed on the right surface side of the cylinder block 6, the oil pump 12 being arranged in a coupling portion where the cylinder block 6 is coupled to the flywheel housing 7. The lubricant is then supplied to lubrication parts of the engine 1 through an oil cooler 13 and an oil filter 14 that are disposed on the right surface of the cylinder block 6. The lubricant supplied to the lubrication parts is then returned to the oil pan 11. The oil pump 12 is configured to be driven by rotation of the crankshaft 5.

In the coupling portion where the cylinder block 6 is coupled to the flywheel housing 7, a fuel feed pump 15 for feeding a fuel is attached. The fuel feed pump 15 is disposed below an EGR device 24. A common rail 16 is fixed to a side surface of the cylinder block 6 at a location below the intake manifold 3 of the cylinder head 2. The common rail 16 is disposed above the fuel feed pump 15. Injectors 17 (see FIG. 24) for four cylinders are provided on an upper surface of the cylinder head 2 which is covered with a head cover 18. Each of the injectors 17 has a fuel injection valve of electromagnetic-controlled type.

Each of the injectors 17 is connected to a fuel tank 118 (see FIG. 24) through the fuel feed pump 15 and the common rail 16 having a cylindrical shape. The fuel tank 118 is mounted in a work vehicle. A fuel in the fuel tank 118 is pressure-fed from the fuel feed pump 15 to the common rail 16, so that a high-pressure fuel is stored in the common rail 16. By controlling the opening/closing of the fuel injection valves 119 (see FIG. 24) of the injectors 17, the high-pressure fuel in the common rail 16 is injected from the injectors 17 to the respective cylinders of the engine 1.

A blow-by gas recirculation device 19 is provided on an upper surface of the head cover 18 covering intake and exhaust valves (not shown), etc. disposed on the upper surface of the cylinder head 2. The blow-by gas recirculation device 19 takes in a blow-by gas that has leaked out of a combustion chamber of the engine 1 or the like toward the upper surface of the cylinder head 2. A blow-by gas outlet of the blow-by gas recirculation device 19 is in communication with an intake part of a two-stage turbocharger 30 through a recirculation hose 68. A blow-by gas, from which a lubricant component is removed in the blow-by gas recirculation device 19, is then recirculated to the intake manifold 3 via the two-stage turbocharger 30.

An engine starting starter 20 is attached to the flywheel housing 7. The starter 20 is disposed below the exhaust manifold 4. A position where the starter 20 is attached to the flywheel housing 7 is below a coupling portion where the cylinder block 6 is coupled to the flywheel housing 7.

A coolant pump 21 for circulating a coolant is provided in a portion of the rear surface of the cylinder block 6, the portion being a little left-hand. The coolant pump 21 is disposed below the cooling fan 9. Rotation of the crankshaft 5 causes the coolant pump 21 as well as the cooling fan 9 to be driven through the cooling fan driving V-belt 10. Driving the coolant pump 21 causes a coolant in a radiator (not shown) mounted in the work vehicle to be supplied to the coolant pump 21. The coolant is then supplied to the cylinder head 2 and the cylinder block 6, to cool the engine 1.

A coolant inlet pipe 22 disposed below the exhaust manifold 4 is provided on the left surface of the cylinder block 6 and is fixed at a height equal to the height of the coolant pump 21. The coolant inlet pipe 22 is in communication with a coolant outlet of the radiator. A coolant outlet pipe 23 that is in communication with a coolant inlet of the radiator is fixed to a rear portion of the cylinder head 2. The cylinder head 2 has a coolant drainage 35 that protrudes rearward from the intake manifold 3. The coolant outlet pipe 23 is provided on an upper surface of the coolant drainage 35.

The inlet side of the intake manifold 3 is coupled to an air cleaner (not shown) via a collector 25 of an EGR device 24 (exhaust-gas recirculation device) which will be described later. Fresh air (outside air) suctioned by the air cleaner is subjected to dust removal and purification in the air cleaner, then fed to the intake manifold 3 through the collector 25, and then supplied to the respective cylinders of the engine 1. In the embodiment, the collector 25 of the EGR device 24 is coupled to the right side of the intake manifold 3 which is formed integrally with the cylinder head 2 to form the right surface of the cylinder head 2. That is, an outlet opening of the collector 25 of the EGR device 24 is coupled to an inlet opening of the intake manifold 3 provided on the right surface of the cylinder head 2. In this embodiment, the collector 25 of the EGR device 24 is coupled to the air cleaner via an intercooler (not shown) and the two-stage turbocharger 30, as will be described later.

The EGR device 24 includes: the collector 25 serving as a relay pipe passage that mixes a recirculation exhaust gas of the engine 1 (an EGR gas from the exhaust manifold 4) with fresh air (outside air from the air cleaner), and supplies a mixed gas to the intake manifold 3; an intake throttle member 26 that communicates the collector 25 with the air cleaner; a recirculation exhaust gas tube 28 that constitutes a part of a recirculation flow pipe passage connected to the exhaust manifold 4 via an EGR cooler 27; and an EGR valve member 29 that communicates the collector 25 with the recirculation exhaust gas tube 28.

The EGR device 24 is disposed on the right lateral side of the intake manifold 3 in the cylinder head 2. The EGR device 24 is fixed to the right surface of the cylinder head 2, and is in communication with the intake manifold 3 in the cylinder head 2. In the EGR device 24, the collector 25 is coupled to the intake manifold 3 on the right surface of the cylinder head 2, and an EGR gas inlet of the recirculation exhaust gas tube 28 is coupled and fixed to a front portion of the intake manifold 3 on the right surface of the cylinder head 2. The EGR valve member 29 and the intake throttle member 26 are coupled to the front and rear of the collector 25, respectively. An EGR gas outlet of the recirculation exhaust gas tube 28 is coupled to the rear end of the EGR valve member 29.

The EGR cooler 27 is fixed to the front surface of the cylinder head 2. The coolant and the EGR gas flowing in the cylinder head 2 flows into and out of the EGR cooler 27. In the EGR cooler 27, the EGR gas is cooled. EGR cooler coupling bases 33, 34 for coupling the EGR cooler 27 to the front surface of the cylinder head 2 protrude from left and right portions of the front surface of the cylinder head 2. The EGR cooler 27 is coupled to the coupling bases 33, 34. That is, the EGR cooler 27 is disposed on the front side of the cylinder head 2 and at a position above the flywheel housing 7 such that a rear end surface of the EGR cooler 27 and the front surface of the cylinder head 2 are spaced from each other.

The two-stage turbocharger 30 is disposed on a lateral side (in the embodiment, the left lateral side) of the exhaust manifold 4. The two-stage turbocharger 30 includes a high-pressure turbocharger 51 and a low-pressure turbocharger 52. The high-pressure turbocharger 51 includes a high-pressure turbine 53 in which a turbine wheel (not shown) is provided and a high-pressure compressor 54 in which a blower wheel (not shown) is provided. The low-pressure turbocharger 52 includes a low-pressure turbine 55 in which a turbine wheel (not shown) is provided and a low-pressure compressor 56 in which a blower wheel (not shown) is provided.

An exhaust gas inlet 57 of the high-pressure turbine 53 is coupled to the exhaust manifold 4. An exhaust gas inlet 60 of the low-pressure turbine 55 is coupled to an exhaust gas outlet 58 of the high-pressure turbine 53 via a high-pressure exhaust gas tube 59. An exhaust gas introduction side end portion of an exhaust gas discharge pipe (not shown) is coupled to an exhaust gas outlet 61 of the low-pressure turbine 55. A fresh air supply side (fresh air outlet side) of the air cleaner (not shown) is connected to a fresh air inlet port (fresh air inlet) 63 of the low-pressure compressor 56 via an air supply pipe 62. A fresh air inlet port 66 of the high-pressure compressor 54 is coupled to a fresh air supply port (fresh air outlet) 64 of the low-pressure compressor 56 via a low-pressure fresh air passage pipe 65. A fresh air introduction side of the intercooler (not shown) is connected to a fresh air supply port 67 of the high-pressure compressor 54 via a high-pressure fresh air passage pipe (not shown).

The high-pressure turbocharger 51 is coupled to the exhaust gas outlet 58 of the exhaust manifold 4, and is fixed to the left lateral side of the exhaust manifold 4. On the other hand, the low-pressure turbocharger 52 is coupled to the high-pressure turbocharger 51 via the high-pressure exhaust gas tube 59 and the low-pressure fresh air passage pipe 65, and is fixed above the exhaust manifold 4. Thus, the exhaust manifold 4 and the high-pressure turbocharger 51 with a small diameter are disposed side-by-side with respect to the left-right direction below the low-pressure turbocharger 52 with a large diameter. As a result, the two-stage turbocharger 30 is arranged so as to surround the left surface and the upper surface of the exhaust manifold 4. That is, the exhaust manifold 4 and the two-stage turbocharger 30 are arranged so as to form a rectangular shape in a rear view (or front view), and are compactly fixed to the left surface of the cylinder head 2.

Next, referring to FIG. 9 to FIG. 13, a configuration of the cylinder block 6 will be described. The cylinder block 6 is provided with a left housing bracket portion 304 and a right housing bracket portion 305 (protruding portions) that are disposed in end portions of a left surface 301 and a right surface 302 of the cylinder block 6, the end portions being on the front surface 303 side and extending in a direction along a crankshaft center 300. The flywheel housing 7 is fixed to the left housing bracket portion 304 and the right housing bracket portion 305 with a plurality of bolts. A left-side first reinforcing rib 306, a left-side second reinforcing rib 307, a left-side third reinforcing rib 308, and a left-side fourth reinforcing rib 309, which are arranged in this order from up to down (from the top deck side to the oil pan rail side), are provided between the left housing bracket portion 304 and a side wall of the left surface 301. A right-side first reinforcing rib 310 and a right-side second reinforcing rib 311, which are arranged in this order from up to down, are disposed between the right housing bracket portion 305 and the side wall of the right surface 302. The housing bracket portions 304, 305 and the reinforcing ribs 306 to 311 are formed integrally with the cylinder block 6.

Each of the reinforcing ribs 306 to 311 extends in the direction along the crankshaft center 300. In a plan view, each of the housing bracket portions 304, 305 has a substantially wide triangular shape. The left-side reinforcing ribs 307, 308, 309 and the right-side second reinforcing rib 311 have linear portions 307*a*, 308*a*, 309*a*, 311*a* that extend from the substantially triangular portions toward a rear surface 312 of the cylinder block 6 (see FIG. 7 and FIG. 8, too). The reinforcing ribs 306, 307, 308 are disposed in a cylinder portion of the cylinder block 6. The reinforcing ribs 309, 310, 311 are disposed in a skirt portion of the cylinder block 6.

Figure 17:
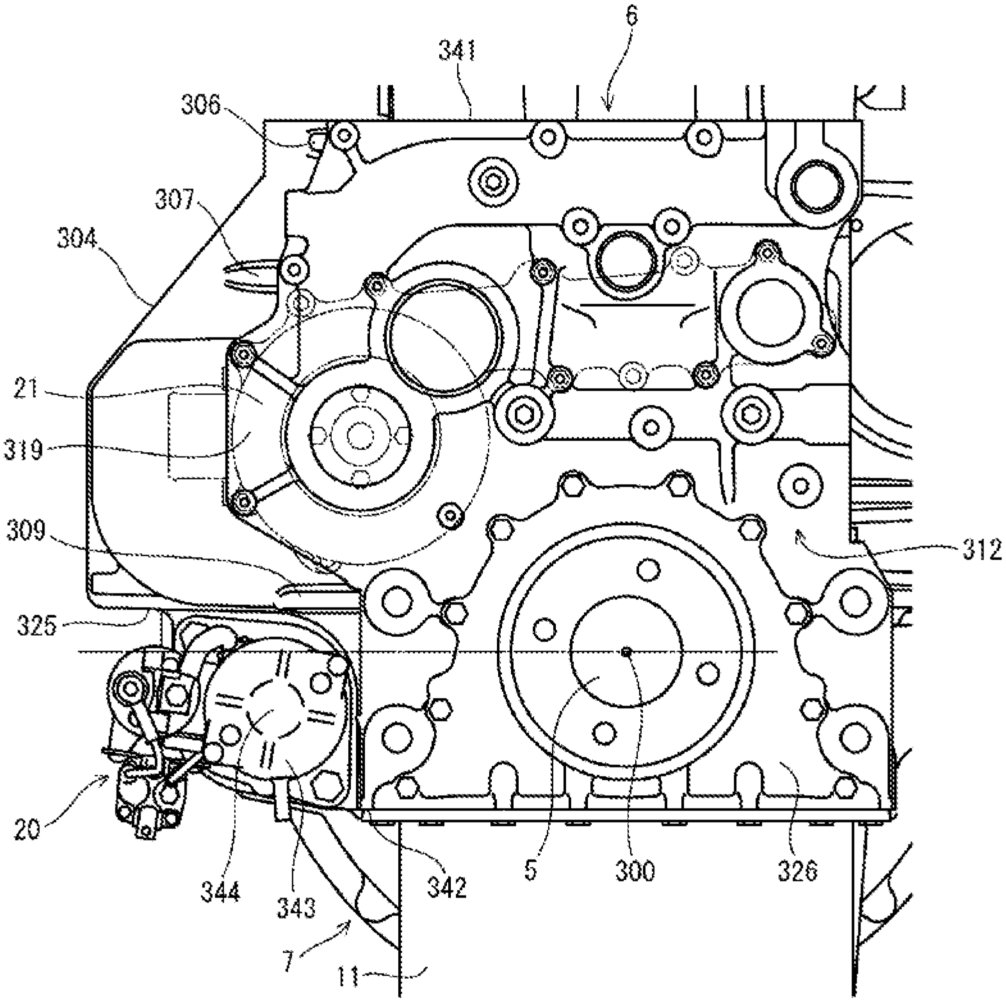
FIG. 17 is a rear view for illustrating a position where a starter is attached.
Figure 18:
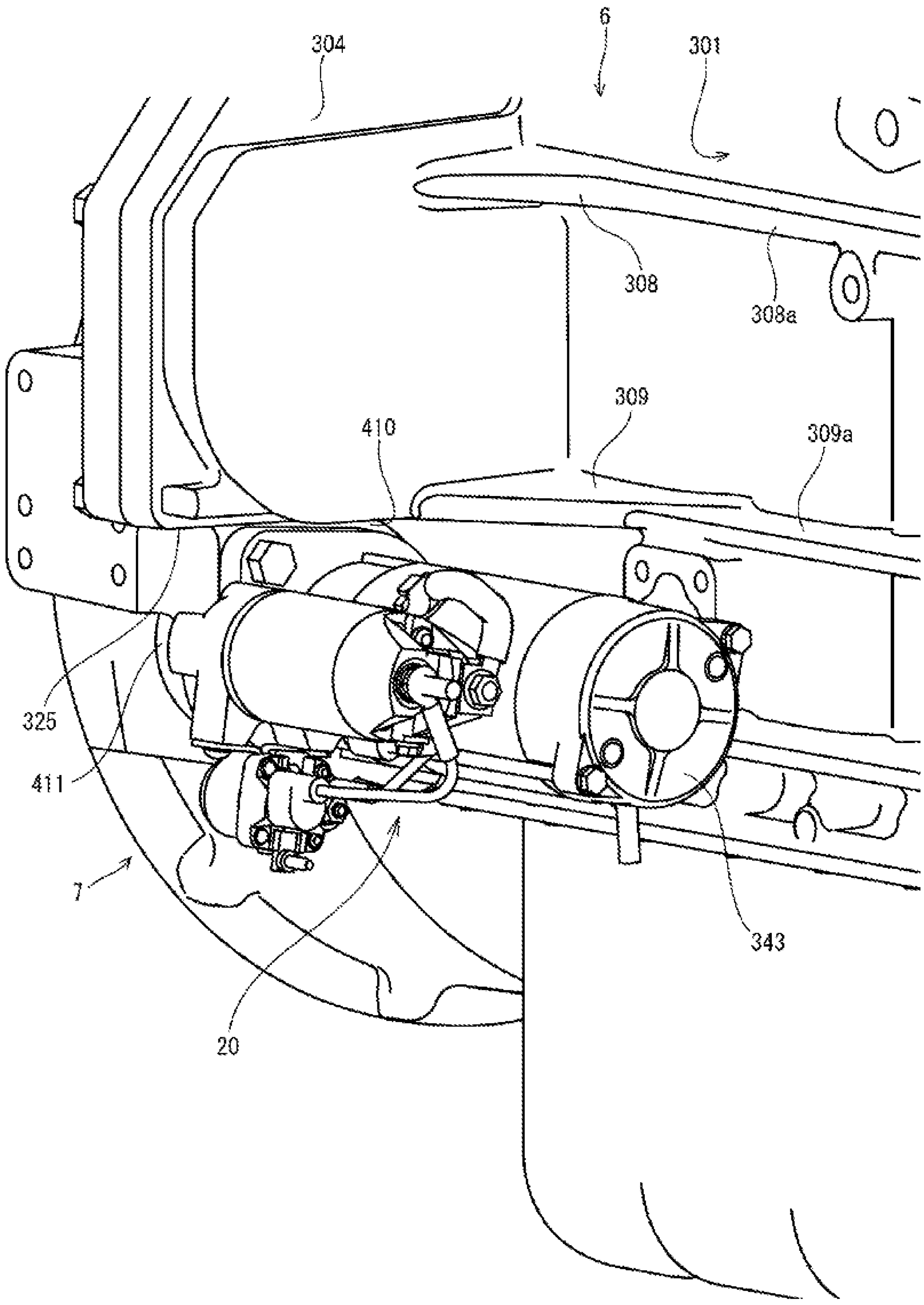
FIG. 18 is a perspective view showing the position where the starter is attached.

Each of the left surface 301 and the right surface 302 is provided with two mount attachment pedestals 317 for attachment of an engine mount which couples the engine 1 to a vehicle body. The two mount attachment pedestals 317 are arranged one behind the other with respect to the front-rear direction, and protrude at positions close to the oil pan rail. The left-side fourth reinforcing rib 309 is coupled to the two mount attachment pedestals 317 protruding from the left surface 301. The right-side second reinforcing rib 311 is coupled to the two mount attachment pedestals 317 protruding from the right surface 302. As shown in FIG. 17, a crank case covering member 326 is secured to the rear surface 312 of the cylinder block 6 with bolts. The crank case covering member 326 covers surroundings of the crankshaft 5 so as not to expose the inside of a crank case to the outside of the engine 1. The oil pan 11 is fastened to a lower surface of the crank case covering member 326 with at least one bolt.

The housing bracket portions 304, 305 and the reinforcing ribs 306 to 311 which are formed integrally with the cylinder block 6 contribute to enhancement of the rigidity of the cylinder block 6, and particularly the rigidity and strength of a portion of the cylinder block 6 near the front surface 303. Thus, vibration and noise of the engine 1 can be reduced. In addition, since the housing bracket portions 304, 305 and the reinforcing ribs 306 to 311 contribute to an increase in a surface area of the cylinder block 6, the cooling efficiency of the cylinder block 6 can be enhanced, and therefore the cooling efficiency of the engine 1 can be enhanced.

A coolant pump attaching part 319 and an inlet pipe attachment pedestal 320 are provided so as to protrude from a portion of the left surface 301 of the cylinder block 6, the portion being relatively close to the rear surface 312. To the coolant pump attaching part 319, a coolant pump 21 (see FIG. 2, etc.) is attached. To the inlet pipe attachment pedestal 320, the coolant inlet pipe 22 (see FIG. 3, etc.) is attached. The coolant pump attaching part 319 and the inlet pipe attachment pedestal 320 are formed integrally with the cylinder block 6. A portion of the inlet pipe attachment pedestal 320 close to the rear surface 312 is coupled to the coolant pump attaching part 319. The coolant pump attaching part 319 and the inlet pipe attachment pedestal 320 protrude in a direction away from the crankshaft 5, and can enhance the rigidity, the strength, and the cooling efficiency of the cylinder block 6.

A camshaft casing 314 (see FIG. 13) for accommodating a camshaft 313 is provided inside the cylinder block 6. Although details are omitted, a crank gear 331 fixed to the crankshaft 5 and a cam gear 332 fixed to the camshaft 313 are disposed on the front surface 303 of the cylinder block 6. The cam gear 332 and the camshaft 313 are rotated in conjunction with the crank gear 331. Driving a valve mechanism (not shown) that is associated with the camshaft 313 causes an intake valve and an exhaust valve (not shown) of the engine 1 to be opened or closed. The engine 1 of this embodiment has a so-called overhead valve system.

The camshaft casing 314 is disposed in the cylinder portion of the cylinder block 6, and is arranged at a position relatively close to the left surface 301. The camshaft 313 and the camshaft casing 314 are disposed in the direction along the crankshaft center 300. Substantially triangular portions and the linear portions 307*a*, 308*a* of the left-side second reinforcing rib 307 and the left-side third reinforcing rib 308 provided on the left surface 301 of the cylinder block 6 are arranged close to a position where the camshaft casing 314 is disposed in a side view, and more specifically at a position overlapping the position where the camshaft casing 314 is disposed.

This embodiment, in which the rigidity of the camshaft casing 314 and therearound is enhanced by the left-side second reinforcing rib 307 and the left-side third reinforcing rib 308, can prevent distortion of the camshaft casing 314. Accordingly, a variation in the rotation resistance and the rotational friction of the camshaft 313, which may occur due to distortion of the camshaft casing 314, can be prevented, so that the camshaft 313 can be rotated appropriately to open or close the intake valve and the exhaust valve (not shown) appropriately.

Of a lubricant passage provided in the cylinder block 6, a part is disposed in the skirt portion of the cylinder block 6 and arranged at a position relatively close to the right surface 302. The part includes a lubricant sucking passage 315 and a lubricant supply passage 316. The lubricant supply passage 316 is disposed in the skirt portion of the cylinder block 6 and arranged at a position relatively close to the cylinder portion. The lubricant sucking passage 315 is arranged at a position relatively close to the oil pan rail as compared to the lubricant supply passage 316.

One end of the lubricant sucking passage 315 is opened in an oil pan rail lower surface (a surface opposed to the oil pan 11) of the cylinder block 6, and is connected to a lubricant sucking pipe (not shown) disposed in the oil pan 11. The other end of the lubricant sucking passage 315 is opened in the front surface 303 of the cylinder block 6, and is connected to a suction port of the oil pump 12 (see FIG. 11) fixed to the front surface 303. One end of the lubricant supply passage 316 is opened in the front surface 303 of the cylinder block 6 at a position different from the position where the lubricant sucking passage 315 is opened, and is connected to an ejection port of the oil pump 12. The other end of the lubricant supply passage 316 is opened in an oil cooler bracket attachment pedestal 318 protruding from the right surface 302 of the cylinder block 6, and is connected to a suction port of the oil cooler 13 (see FIG. 4, etc.) disposed on the oil cooler bracket attachment pedestal 318. Not only the lubricant sucking passage 315 and the lubricant supply passage 316 but also other lubricant passages are provided in the cylinder block 6.

On the right surface 302 of the cylinder block 6, the right-side first reinforcing rib 310 is arranged close to the position where the lubricant supply passage 316 is arranged in a side view. More specifically, the right-side first reinforcing rib 310 is arranged so as to overlap the position where the lubricant supply passage 316 is arranged in a side view. The right-side second reinforcing rib 311 is arranged close to the position where the lubricant sucking passage 315 is arranged in a side view. The reinforcing ribs 310, 311 and the passages 315, 316 extend in the direction along the crankshaft center 300.

In this embodiment, the cooling efficiency in the vicinity of the lubricant sucking passage 315, the oil pump 12, and the lubricant supply passage 316 can be enhanced by the right housing bracket portion 305, the right-side first reinforcing rib 310, and the right-side second reinforcing rib 311. In particular, the right-side first reinforcing rib 310 arranged at a position overlapping the lubricant supply passage 316 in a side view efficiently dissipates heat in the vicinity of the lubricant supply passage 316 to the outside. This can lower the temperature of the lubricant flowing into the oil cooler 13, and can reduce the amount of heat exchange required of the oil cooler 13.

A gear train structure of the engine 1 will now be described with reference to FIG. 10 to FIG. 16. A gear case 330 is provided in a space surrounded by the front surface 303 of the cylinder block 6, the housing bracket portions 304, 305, and the flywheel housing 7. As shown in FIG. 12 and FIG. 14, front distal end portions of the crankshaft 5 and the camshaft 313 protrude from the front surface 303 of the cylinder block 6. The crank gear 331 is secured to the front distal end portion of the crankshaft 5. The cam gear 332 is secured to the front distal end portion of the camshaft 313. A disk-shaped camshaft pulser 339 is fastened with bolts to a surface of the cam gear 332 on the flywheel housing 7 side such that the camshaft pulser 339 is rotatable integrally with the cam gear 332.

Figure 12:
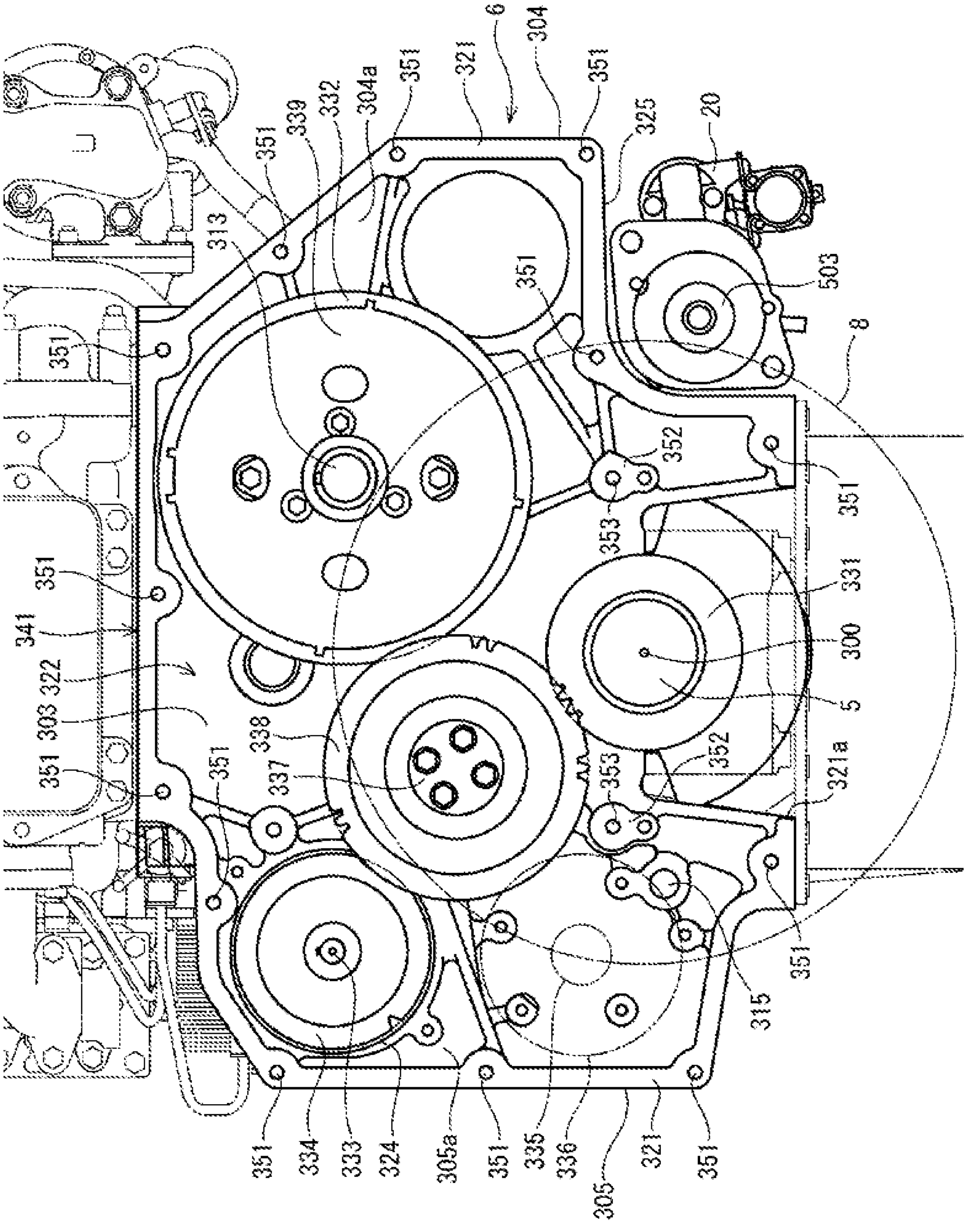
FIG. 12 is a front view showing a gear train.
Figure 13:
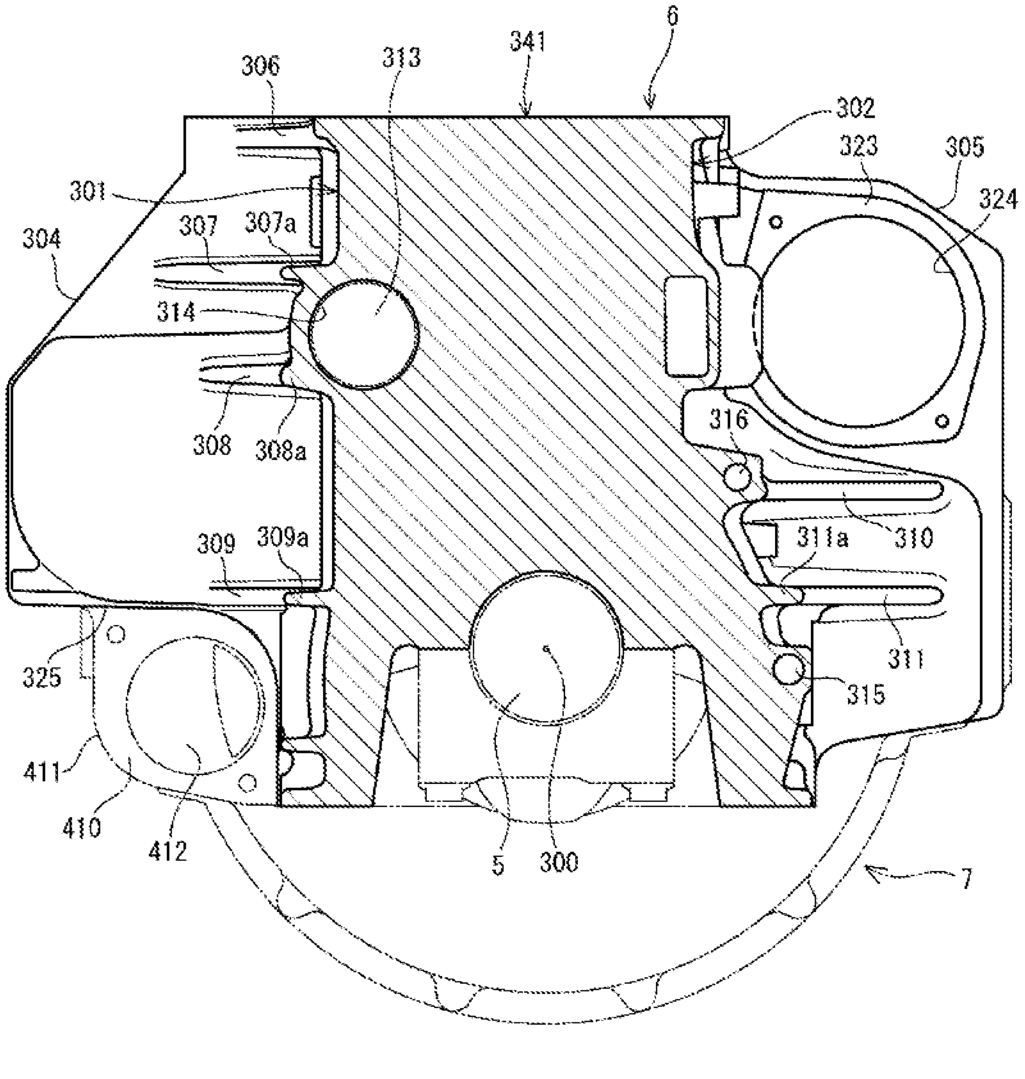
FIG. 13 is a cross-sectional view taken along the line 13-13 in FIG. 9.
Figure 14:
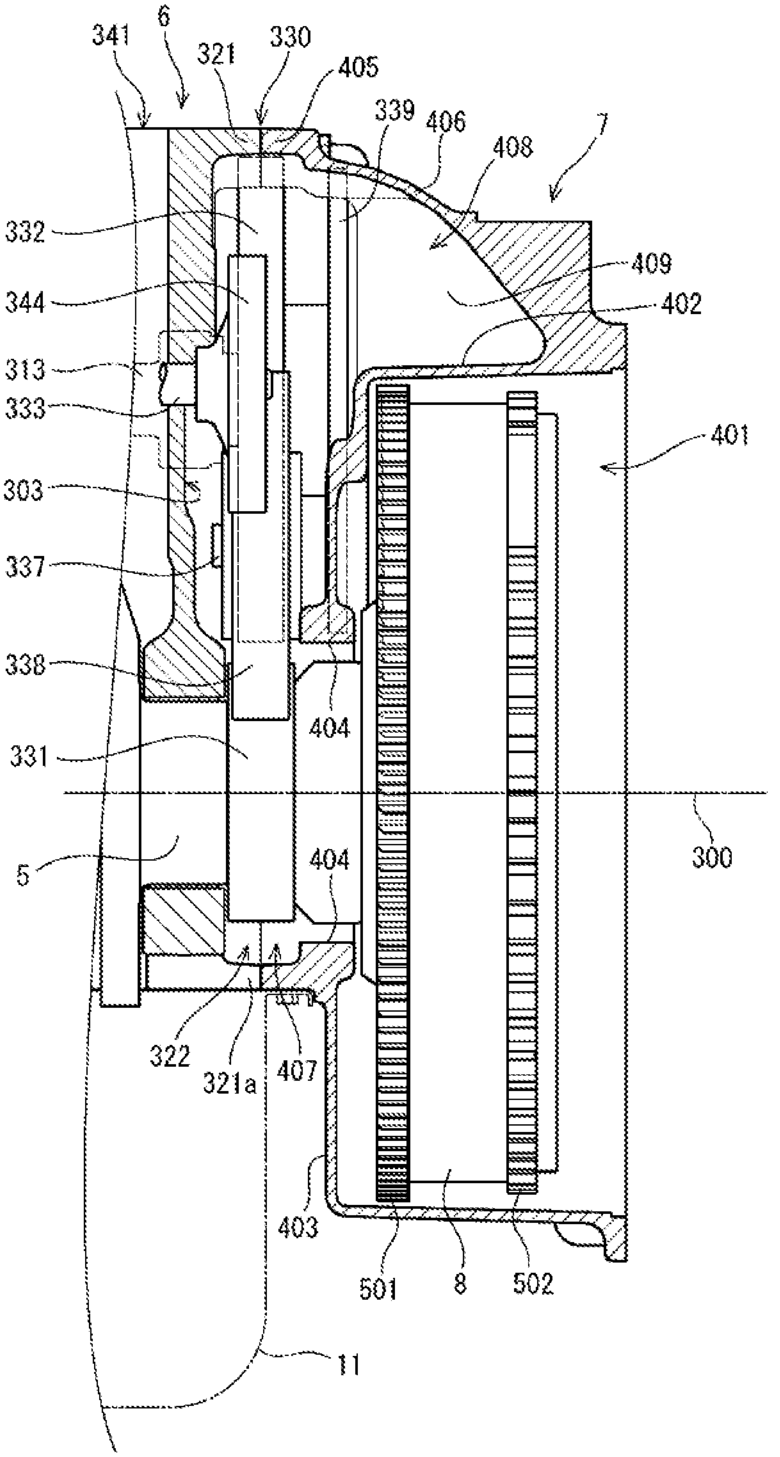
FIG. 14 is a cross-sectional view taken along the line 14-14 in FIG. 9.
Figure 16:
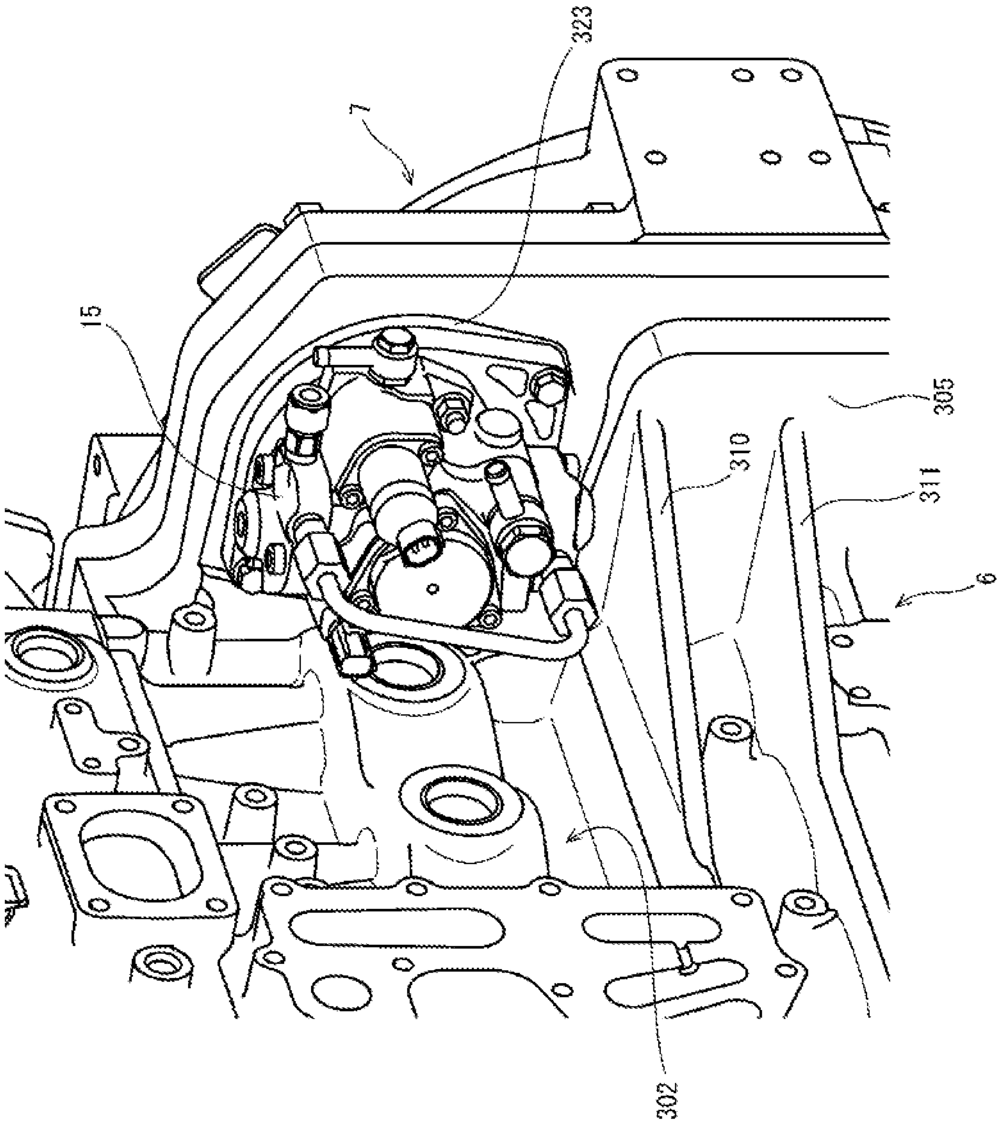
FIG. 16 is a perspective view showing a position where a fuel feed pump is attached.

As shown in FIG. 12, FIG. 13, and FIG. 16, the fuel feed pump 15 provided in the right housing bracket portion 305 of the cylinder block 6 includes a fuel feed pump shaft 333 as a rotation shaft extending in parallel to the rotation axis of the crankshaft 5. The front end side of the fuel feed pump shaft 333 protrudes from a front surface 305*a* of the right housing bracket portion 305. A fuel feed pump gear 334 is secured to a front distal end portion of the fuel feed pump shaft 333. As shown in FIG. 13, the right housing bracket portion 305 of the cylinder block 6 includes a fuel feed pump attachment pedestal 323 for arranging the fuel feed pump 15 above the right-side first reinforcing rib 310. The fuel feed pump attachment pedestal 323 has a fuel feed pump shaft insertion hole 324 with a size that allows the fuel feed pump gear 334 to pass therethrough.

Figure 11:
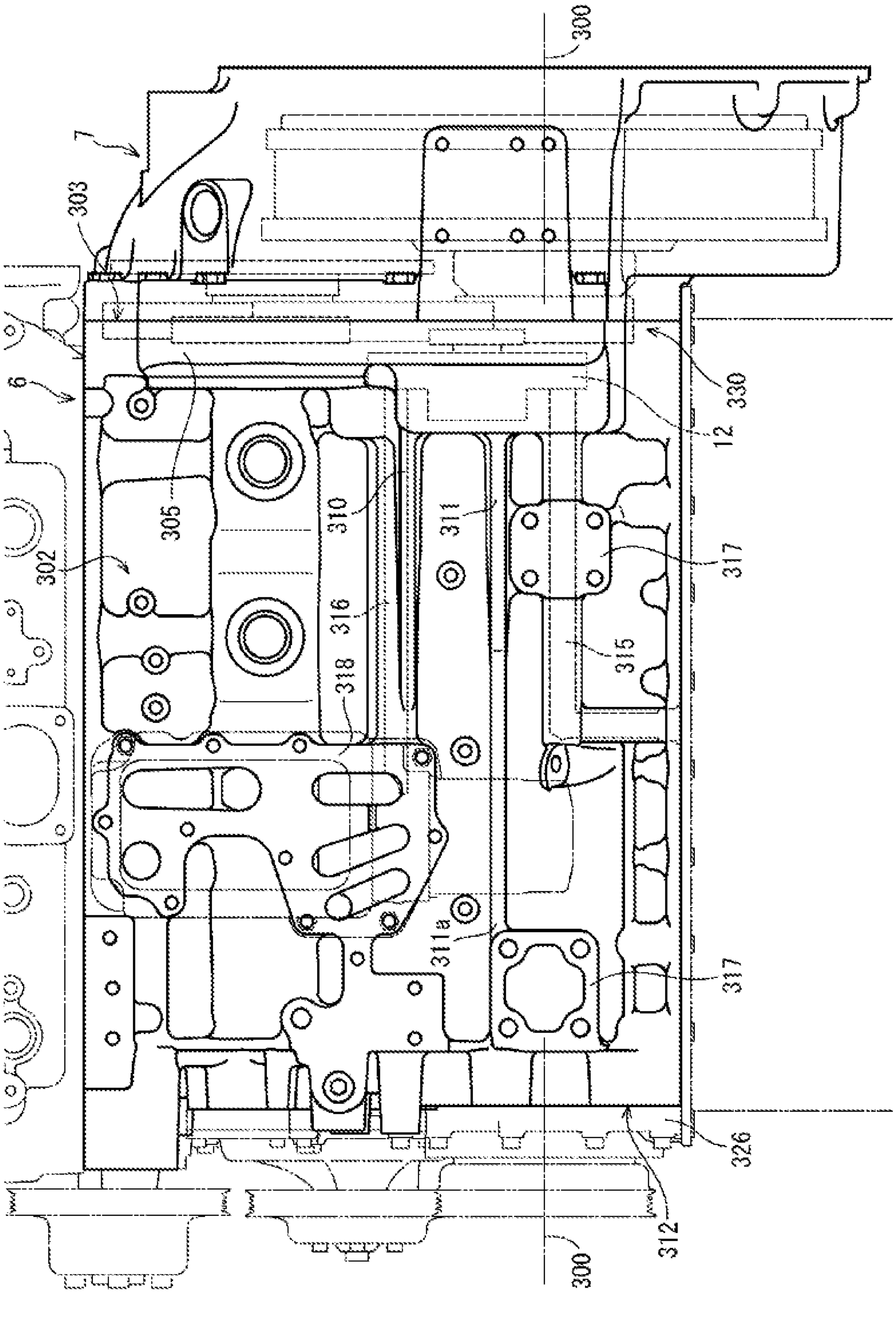
FIG. 11 is a right side view showing the cylinder block and the flywheel housing.

As shown in FIG. 11 and FIG. 12, the oil pump 12, which is disposed on the front surface 305*a* of the right housing bracket portion 305 and arranged below the fuel feed pump gear 334, includes an oil pump shaft 335 as a rotation shaft extending in parallel to the rotation axis of the crankshaft 5. An oil pump gear 336 is secured to a front distal end portion of the oil pump shaft 335.

On the front surface 303 of the cylinder block 6, an idle shaft 337 extending in parallel to the rotation axis of the crankshaft 5 is provided in a portion surrounded by the crankshaft 5, the camshaft 313, the fuel feed pump shaft 333, and the oil pump shaft 335. The idle shaft 337 is fixed to the front surface 303 of the cylinder block 6. An idle gear 338 is rotatably supported on the idle shaft 337.

The idle gear 338 is meshed with four gears, namely, the crank gear 331, the cam gear 332, the fuel feed pump gear 334, and the oil pump gear 336. Rotational power of the crankshaft 5 is transmitted from the crank gear 331 to the three gears of the cam gear 332, the fuel feed pump gear 334, and the oil pump gear 336, via the idle gear 338. Thus, the camshaft 313, the fuel feed pump shaft 333, and the oil pump shaft 335 are rotated in conjunction with the crankshaft 5. In the embodiment, the gear ratio among the gears 331, 332, 334, 336, 338 is set such that: two rotations of the crankshaft 5 correspond to one rotation of the camshaft 313; and one rotation of the crankshaft 5 corresponds to one rotation of the fuel feed pump shaft 333 and the oil pump shaft 335.

In this configuration, rotating the cam gear 332 and the camshaft 313 in conjunction with the crank gear 331 which rotates together with the crankshaft 5 to drive the valve mechanism (not shown) that is associated with the camshaft 313 causes the intake valve and the exhaust valve (not shown) provided in the cylinder head 2 to be opened or closed. In addition, rotating the fuel feed pump gear 334 and the fuel feed pump shaft 333 in conjunction with the crank gear 331 to drive the fuel feed pump 15 causes the fuel in the fuel tank 118 to be pressure-fed to the common rail 16 so that a high-pressure fuel is stored in the common rail 16. In addition, rotating the oil pump gear 336 and the oil pump shaft 335 in conjunction with the crank gear 331 to drive the oil pump 12 causes the lubricant in the oil pan 11 to be supplied to various sliding component parts and the like through a lubricating system circuit (details are not shown) including the lubricant sucking passage 315, the lubricant supply passage 316, the oil cooler 13, the oil filter 14, and the like.

As shown in FIG. 16, the fuel feed pump 15 serving as an auxiliary machine that is operated in conjunction with rotation of the crankshaft 5 is secured with bolts to the fuel feed pump attachment pedestal 323 of the right housing bracket portion 305. The right-side first reinforcing rib 310 is arranged close to the fuel feed pump attachment pedestal 323. The right-side first reinforcing rib 310 is arranged directly under the fuel feed pump 15, and the right-side second reinforcing rib 311 is arranged directly under the right-side first reinforcing rib 310. The reinforcing ribs 310, 311 can enhance the rigidity of the fuel feed pump attachment pedestal 323, and also can prevent the fuel feed pump 15 from being contacted by a foreign object such as muddy water or stone coming from below, for protection of the fuel feed pump 15.

The gear case 330 that accommodates the gear train will now be described with reference to FIG. 10 to FIG. 12, FIG. 14, and FIG. 15. A block-side projecting portion 321 that extends along a peripheral edge of a region including the front surfaces 303, 304*a*, 305*a* of the cylinder block 6 and of the left and right housing bracket portions 304, 305 is provided upright on a peripheral edge portion of the front surfaces 303, 304*a*, 305*a*. The block-side projecting portion 321 is joined with the flywheel housing 7. The block-side projecting portion 321 has a cutout portion 321*a* at a location between the left and right oil pan rails of the cylinder block 6. A space between an end surface of the block-side projecting portion 321 and the front surfaces 303, 304*a*, 305*a* in a side view defines a block-side gear casing 322.

Figure 15:
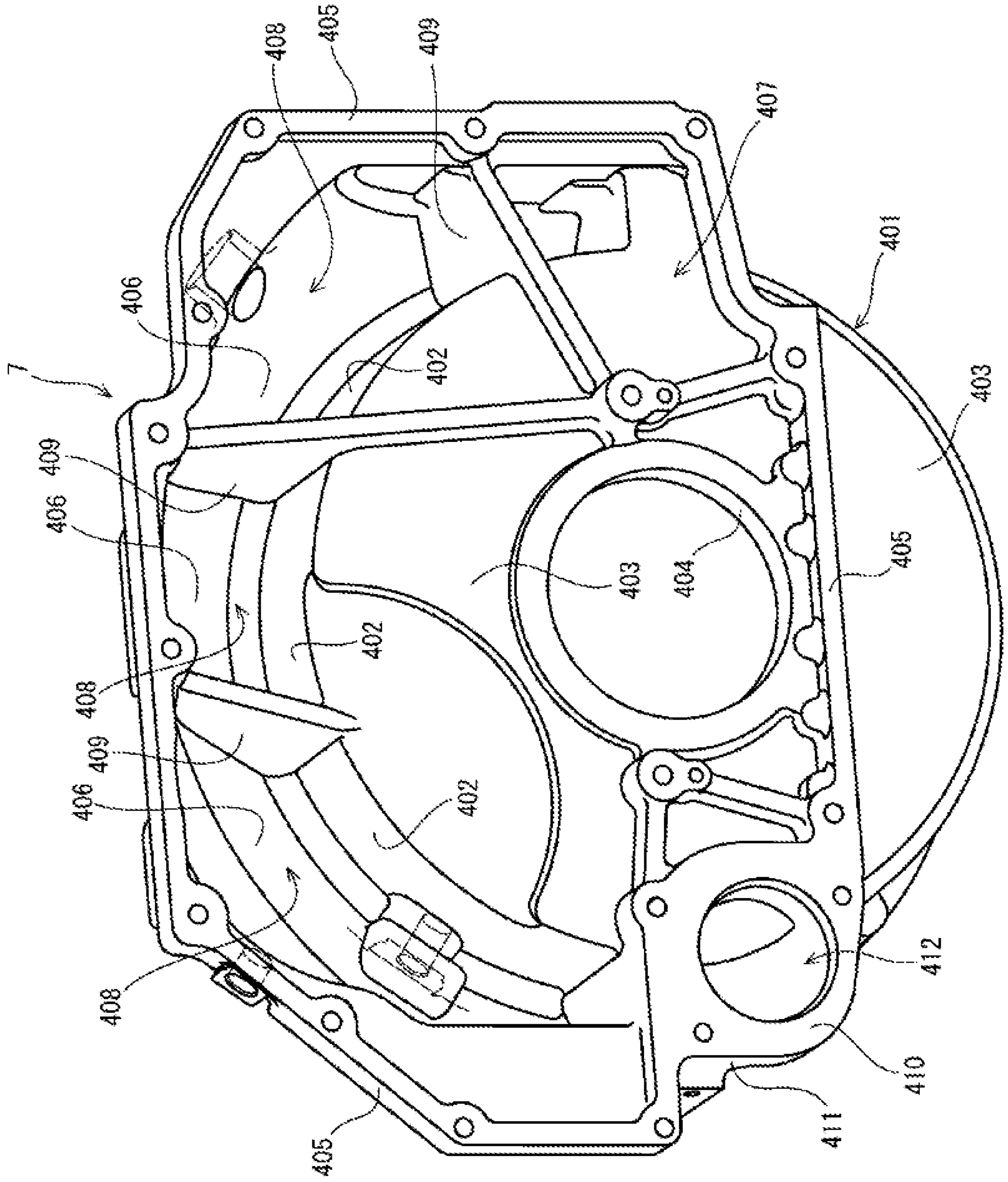
FIG. 15 is a perspective view showing inside of the flywheel housing.

As shown in FIG. 14 and FIG. 15, the flywheel housing 7 which is made of, for example, cast iron includes a flywheel accommodating part 401 that accommodates the flywheel 8. The flywheel accommodating part 401 has a bottomed cylindrical shape formed by a circumferential wall surface portion 402 and a rear wall surface portion 403 being coupled to each other. The circumferential wall surface portion 402 has a substantially cylindrical shape and covers the outer circumferential side of the flywheel 8. The rear wall surface portion 403 covers a rear surface side (a surface on the cylinder block 6 side) of the flywheel 8. The flywheel 8 is accommodated in a space surrounded by the circumferential wall surface portion 402 and the rear wall surface portion 403. The circumferential wall surface portion 402 is in the shape of a substantially truncated cone with its radius decreasing toward the rear wall surface portion 403. The rear wall surface portion 403 has, in its central portion, a crankshaft insertion hole 404 through which the crankshaft 5 is inserted.

A housing-side projecting portion 405 having an annular shape that corresponds to the shape of the block-side projecting portion 321 of the cylinder block 6 is coupled to the rear wall surface portion 403 so as to surround a position where the crankshaft insertion hole 404 is disposed. The center of the housing-side projecting portion 405 is deviated upward from the crankshaft insertion hole 404. A lower portion of the housing-side projecting portion 405, which extends in the left-right direction (lateral direction), is close to the crankshaft insertion hole 404 and is coupled to the rear wall surface portion 403.

Upper, left, and right portions of the housing-side projecting portion 405 are located outside the rear wall surface portion 403. A front portion of the circumferential wall surface portion 402 and a front portion of the housing-side projecting portion 405 located outside the rear wall surface portion 403 are coupled to each other in an outer wall portion 406. The outer wall portion 406 has a curved slope shape convexing in a direction away from the crankshaft 5. In the flywheel housing 7, a lower portion of the flywheel accommodating part 401 protrudes from the housing-side projecting portion 405 in a direction away from the crankshaft 5.

A space between the rear wall surface portion 403 and an end surface of the housing-side projecting portion 405 in a side view defines a housing-side gear casing 407. This housing-side gear casing 407 and the above-mentioned block-side gear casing 322 constitute the gear case 330.

Inside the flywheel housing 7, a lightening space 408 is formed between an outer wall of the circumferential wall surface portion 402 of the flywheel accommodating part 401 and an inner wall of the outer wall portion 406. A plurality of ribs 409 configured to couple the circumferential wall surface portion 402 to the outer wall portion 406 are disposed in the lightening space 408. The flywheel housing 7 has a starter attaching part 411 having a starter attachment pedestal 410 that is flush with the housing-side projecting portion 405. The starter attachment pedestal 410 is coupled to the circumferential wall surface portion 402 and the housing-side projecting portion 405 at a location outside the housing-side projecting portion 405. The starter attaching part 411 has a through hole 412 bored from the starter attachment pedestal 410 to the inner wall of the circumferential wall surface portion 402. The flywheel housing 7 is fastened to the front surface 303 side of the cylinder block 6 with bolts in thirteen bolt holes 351 of the block-side projecting portion 321 of the cylinder block 6 and in bolt holes 353 of two housing bolting boss portions 352 of the front surface 303.

Figure 19:
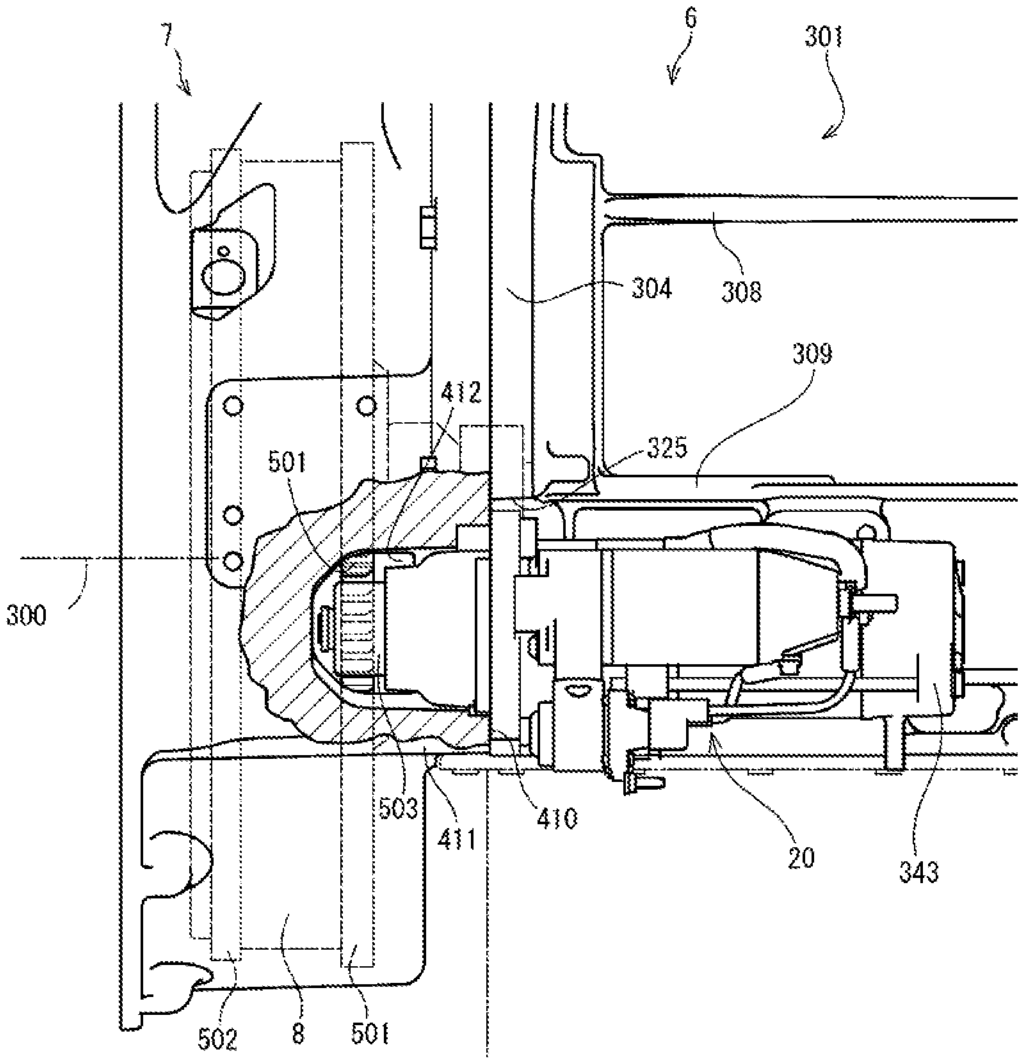
FIG. 19 is a partial cross-sectional left side view showing the position where the starter is attached.
Figure 20:
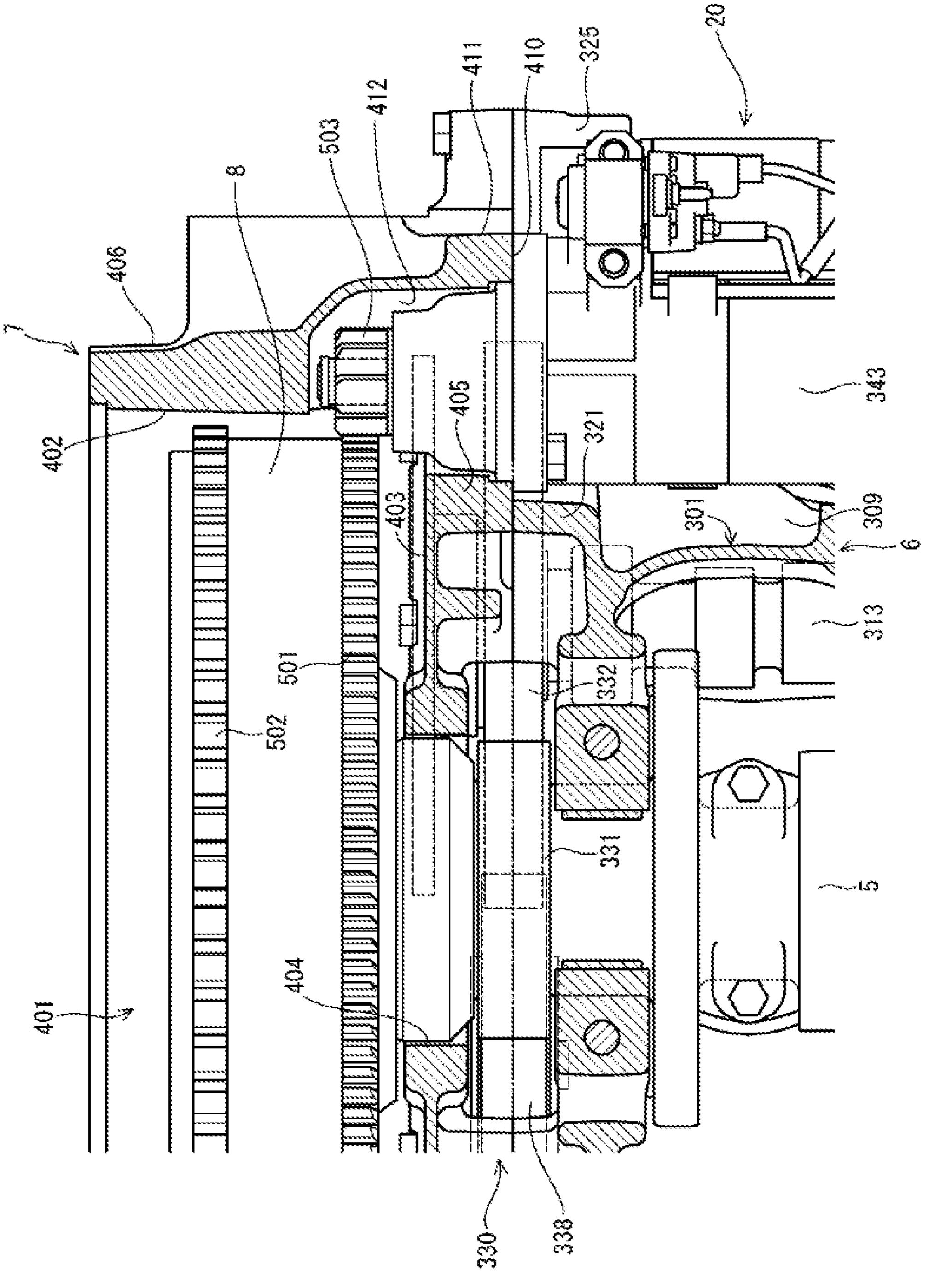
FIG. 20 is a cross-sectional bottom plan view showing the position where the starter is attached.

As shown in FIG. 10, FIG. 12, FIG. 13, and FIG. 17 to FIG. 20, the left housing bracket portion 304 of the cylinder block 6 has its peripheral edge portion recessed toward a peripheral edge portion of the flywheel housing 7, to form a bracket recessed portion 325 having a recessed shape. While the flywheel housing 7 is fixed to the cylinder block 6, the starter 20 is disposed to the starter attachment pedestal 410 of the flywheel housing 7 which is exposed on the lower side of the bracket recessed portion 325. As shown in FIG. 14, an annular ring gear 501 for the starter 20 and a crankshaft pulser 502 are fixed to the outer circumferential side of the flywheel 8. The ring gear 501 and the crankshaft pulser 502 are fitted in from opposite sides in a thickness direction of the flywheel 8. The starter 20 includes a pinion gear 503 (see FIG. 12, FIG. 19, and FIG. 20) that is disposed in the through hole 412 and is separatably meshed with the ring gear 501. Here, FIG. 19 and FIG. 20 show a state where the pinion gear 503 is meshed with the ring gear 501. As shown in FIG. 20, the through hole 412 in which an end portion of the starter 20 with the pinion gear 503 is inserted is partitioned from an internal space of the gear case 330 by the housing-side projecting portion 405. This can prevent a lubricant, vibration and noise in the gear case 330 from leaking into the through hole 412.

In the vicinity of the starter attachment pedestal 410, the flywheel housing 7 made of cast iron is fastened with bolts to the block-side projecting portion 321 (see FIG. 12 and FIG. 14) that is provided upright on the peripheral edge portion of the front surface 304*a* of the left housing bracket portion 304. In the cylinder block 6, the left-side fourth reinforcing rib 309 that couples the left housing bracket portion 304 to the left surface 301 is disposed near the bracket recessed portion 325 of the left housing bracket portion 304 which is provided near the starter attachment pedestal 410. Thereby, the rigidity of the starter attachment pedestal 410 and therearound is enhanced. In addition, the bracket recessed portion 325 of the left housing bracket portion 304 and a portion of the block-side projecting portion 321 (see FIG. 12) provided on the front surface 303 and near the starter attachment pedestal 410 so as to be continuous with the bracket recessed portion 325 also enhance the rigidity of the starter attachment pedestal 410 and therearound.

In this embodiment, the starter 20 can be attached to a portion given a high rigidity by the left-side fourth reinforcing rib 309 and the like. Thus, mispositioning and deformation of the starter 20 can be prevented, which may otherwise be caused by distortion of the starter attachment pedestal 410 or the left housing bracket portion 304. Accordingly, breakdown of the starter 20 and poor meshing between the pinion gear 503 of the starter 20 and the ring gear 501 of the flywheel 8 can be prevented.

As shown in FIG. 1, FIG. 2, FIG. 5, and FIG. 17, the starter 20 is disposed inner than a portion of the flywheel housing 7, the portion being located outermost in the engine 1 on the left surface 301 side of the cylinder block 6 with respect to a horizontal direction that is perpendicular to the direction along the crankshaft center 300 of the crankshaft 5 and that is parallel to a block upper surface 341 (cylinder head joining surface) of the cylinder block 6. In this manner, the starter 20 is arranged such that it is not located outermost in the engine 1 with respect to the horizontal direction. This can make the engine 1 compact, and can reduce breakdown of the starter 20, which may otherwise be caused by contact with a foreign object.

Figure 21:
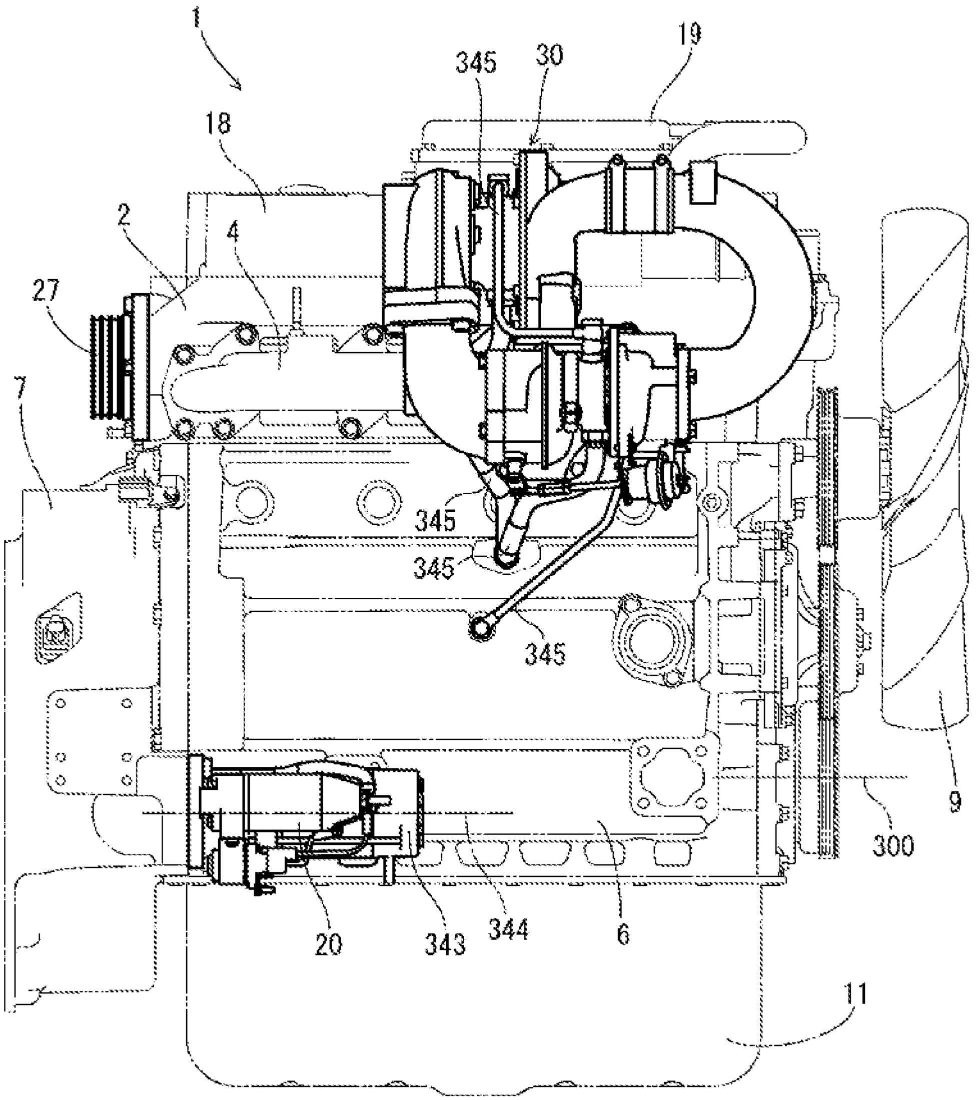
FIG. 21 is a left side view for illustrating the position where the starter is attached.

As shown in FIG. 17 and FIG. 21, a motor shaft center 344 of a motor unit 343 of the starter 20 is disposed closer to the block lower surface 342 of the cylinder block 6 than the crankshaft center 300 of the crankshaft 5 is with respect to the horizontal direction. This lowers the center of gravity of the engine 1 as compared to a configuration in which the starter 20 is disposed above the crankshaft center 300. Accordingly, the center of gravity of a vehicle equipped with the engine 1 can be lowered.

Figure 5:
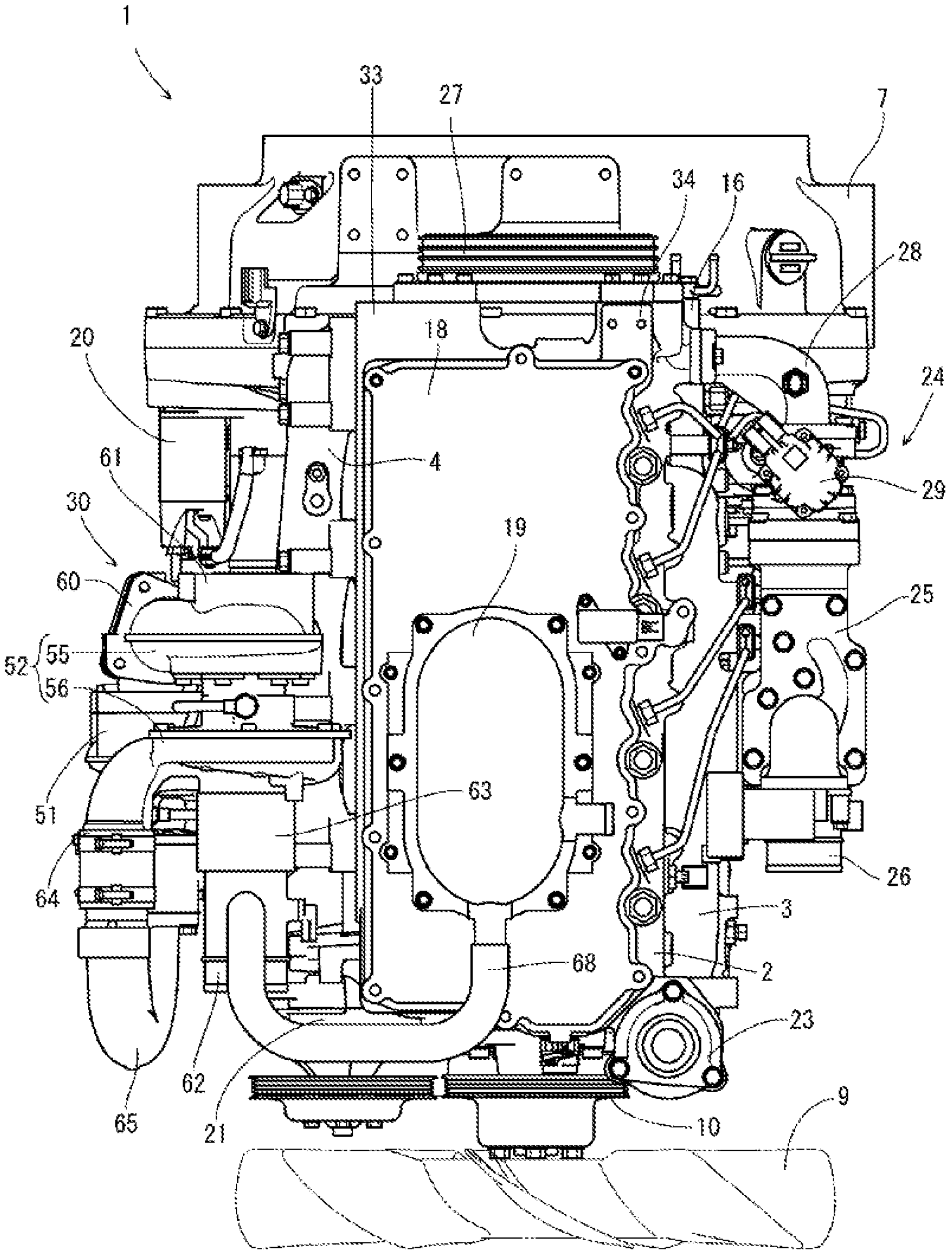
FIG. 5 is a top plan view of the engine.
Figure 6:
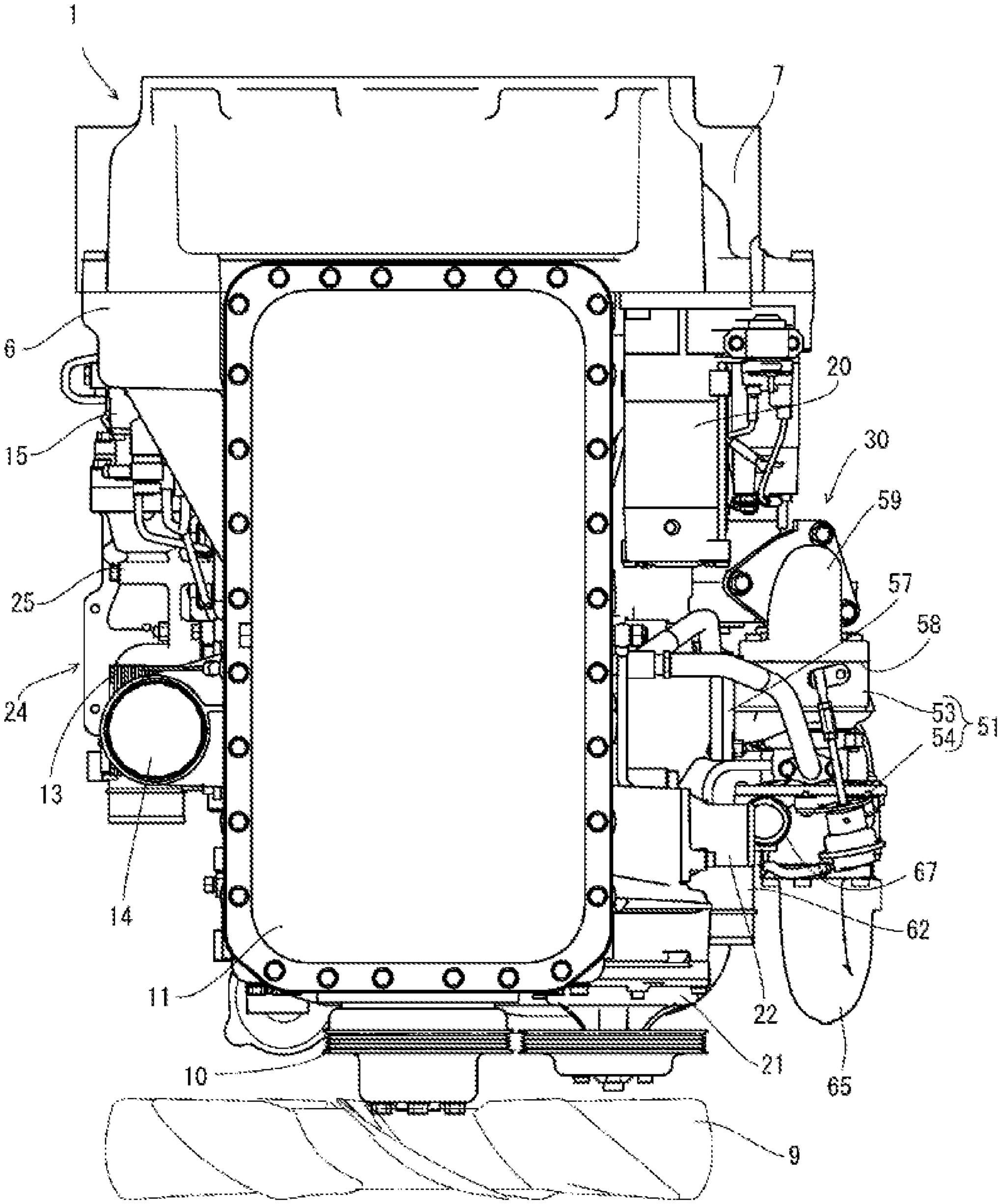
FIG. 6 is a bottom plan view of the engine.
Figure 7:
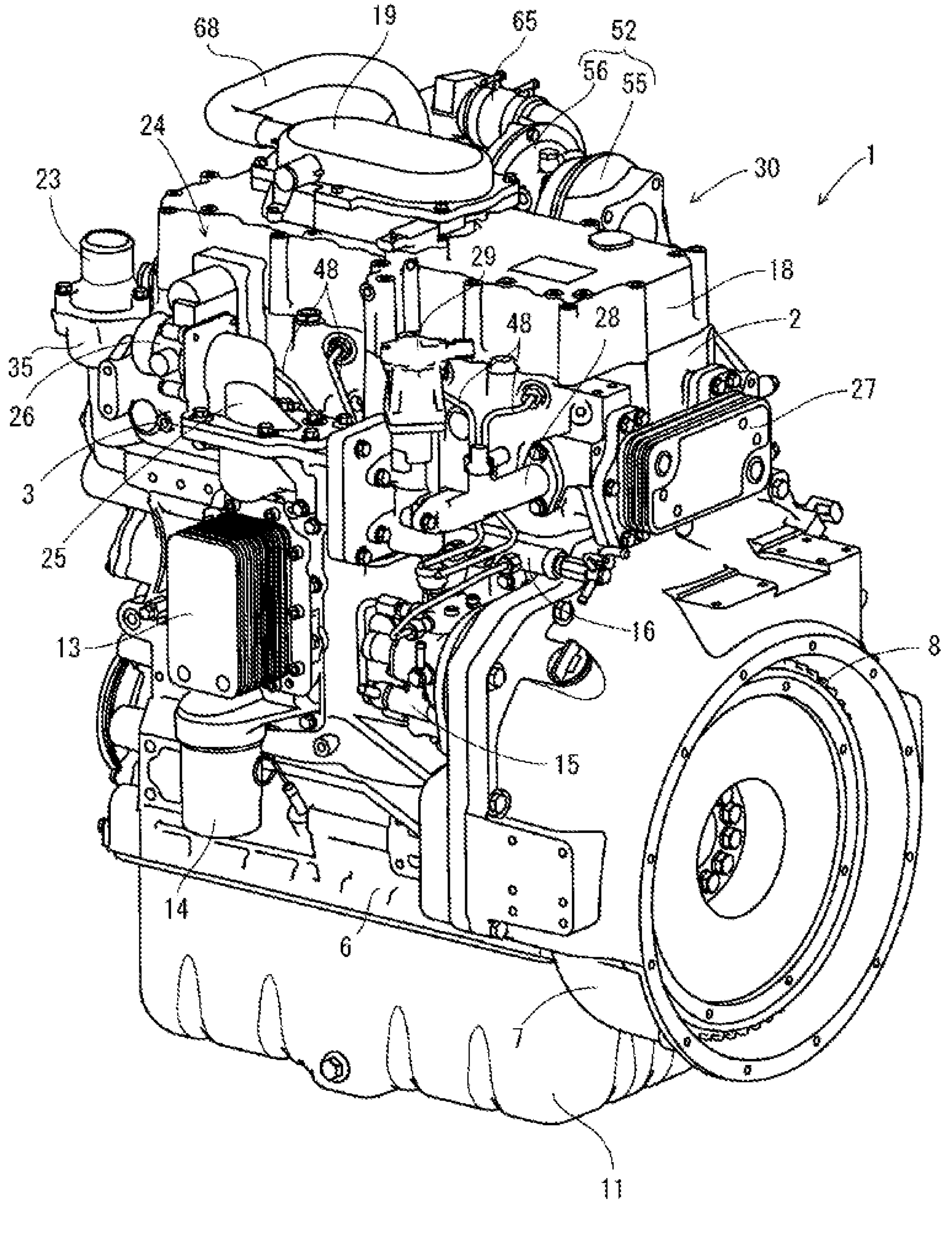
FIG. 7 is a perspective view of the engine as viewed from diagonally front.
Figure 8:
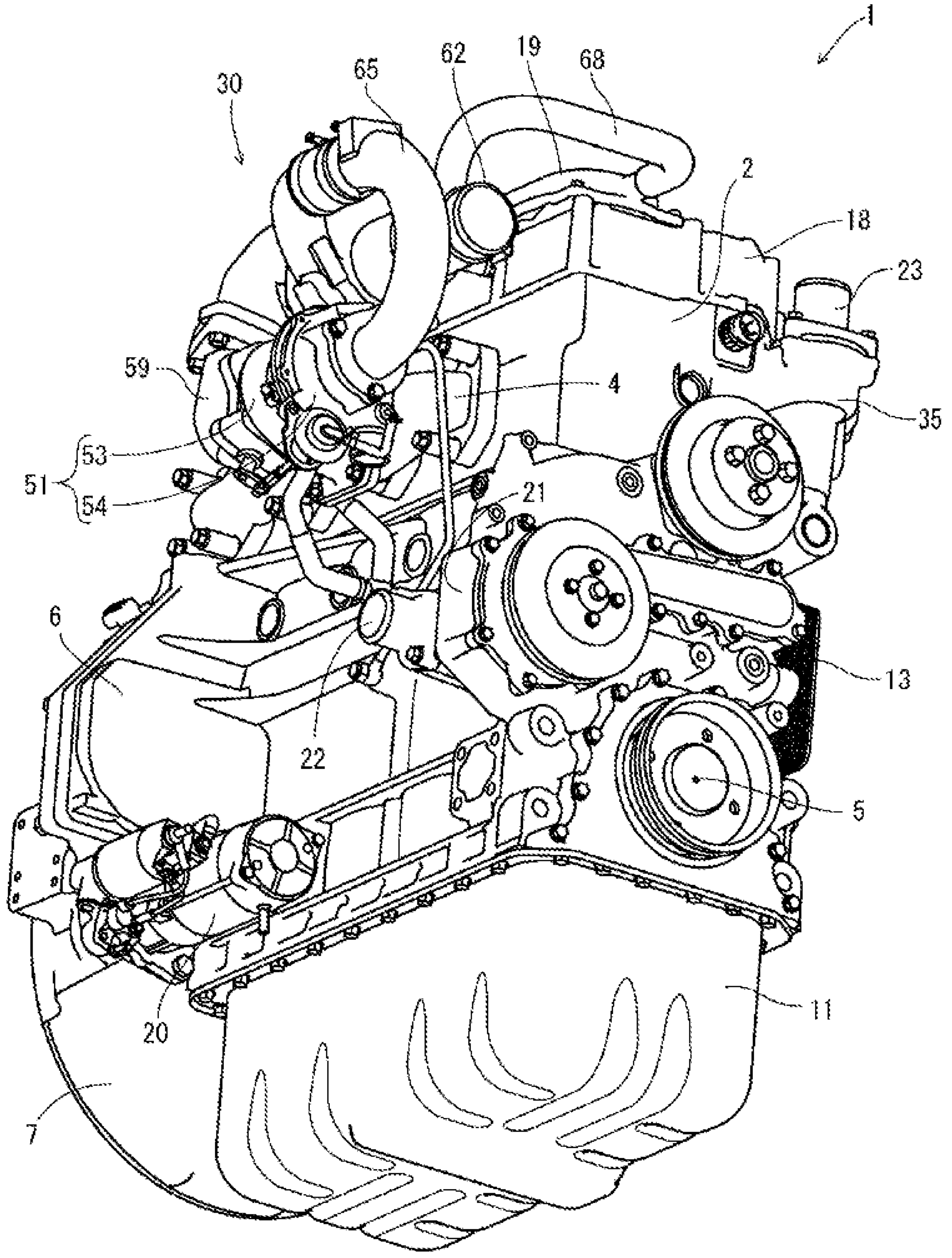
FIG. 8 is a perspective view of the engine as viewed from diagonally rear.
Figure 9:
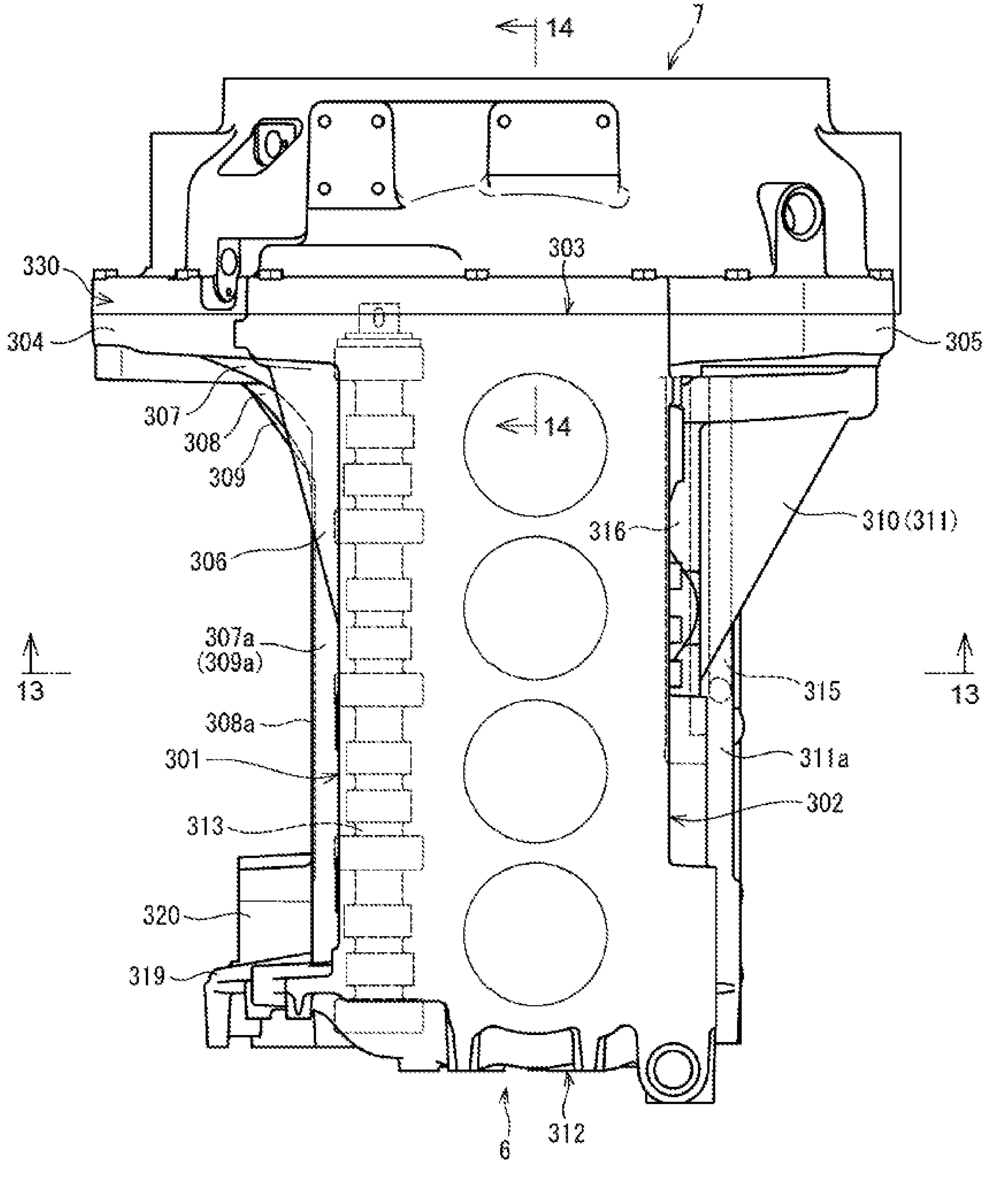
FIG. 9 is a top plan view showing a cylinder block and a flywheel housing.
Figure 10:
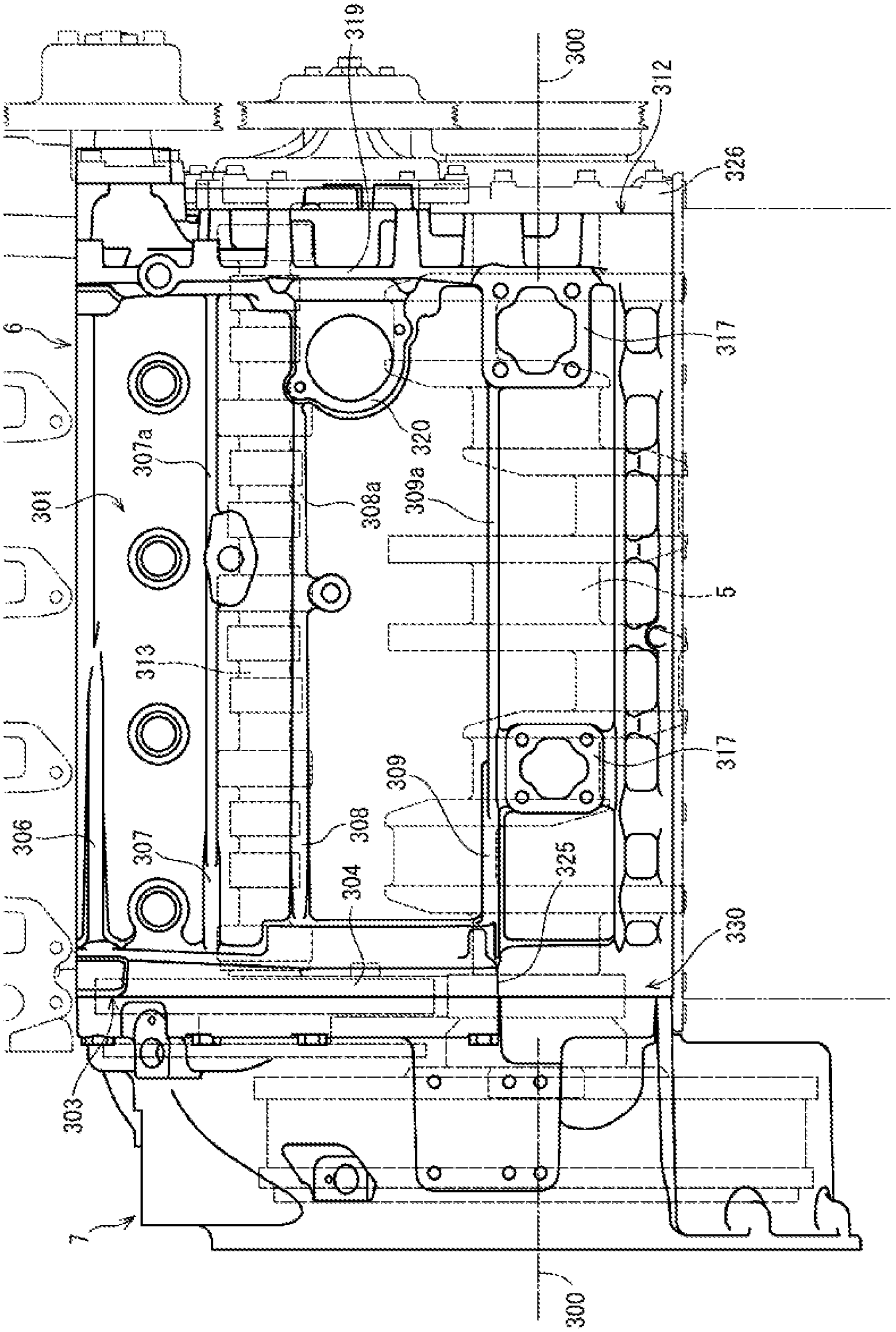
FIG. 10 is a left side view showing the cylinder block and the flywheel housing.

As shown in FIG. 5, FIG. 6, and FIG. 21, the starter 20 is arranged at a position not overlapping the two-stage turbocharger 30 with respect to the direction along the crankshaft center 300 of the crankshaft 5, and particularly is arranged at a position not overlapping a lubricant pipe 345 that circulates the lubricant to the two-stage turbocharger 30. As mentioned above, the EGR cooler 27 is fixed to the front surface of the cylinder head 2. With this configuration, even when a liquid such as the lubricant leaks from the two-stage turbocharger 30 or a liquid such as the coolant leaks from the EGR cooler 27, the liquid can be prevented from adhering to the starter 20, so that stain and breakdown of the starter 20 can be prevented, which may otherwise be caused by adherence of the liquid.

Figure 22:
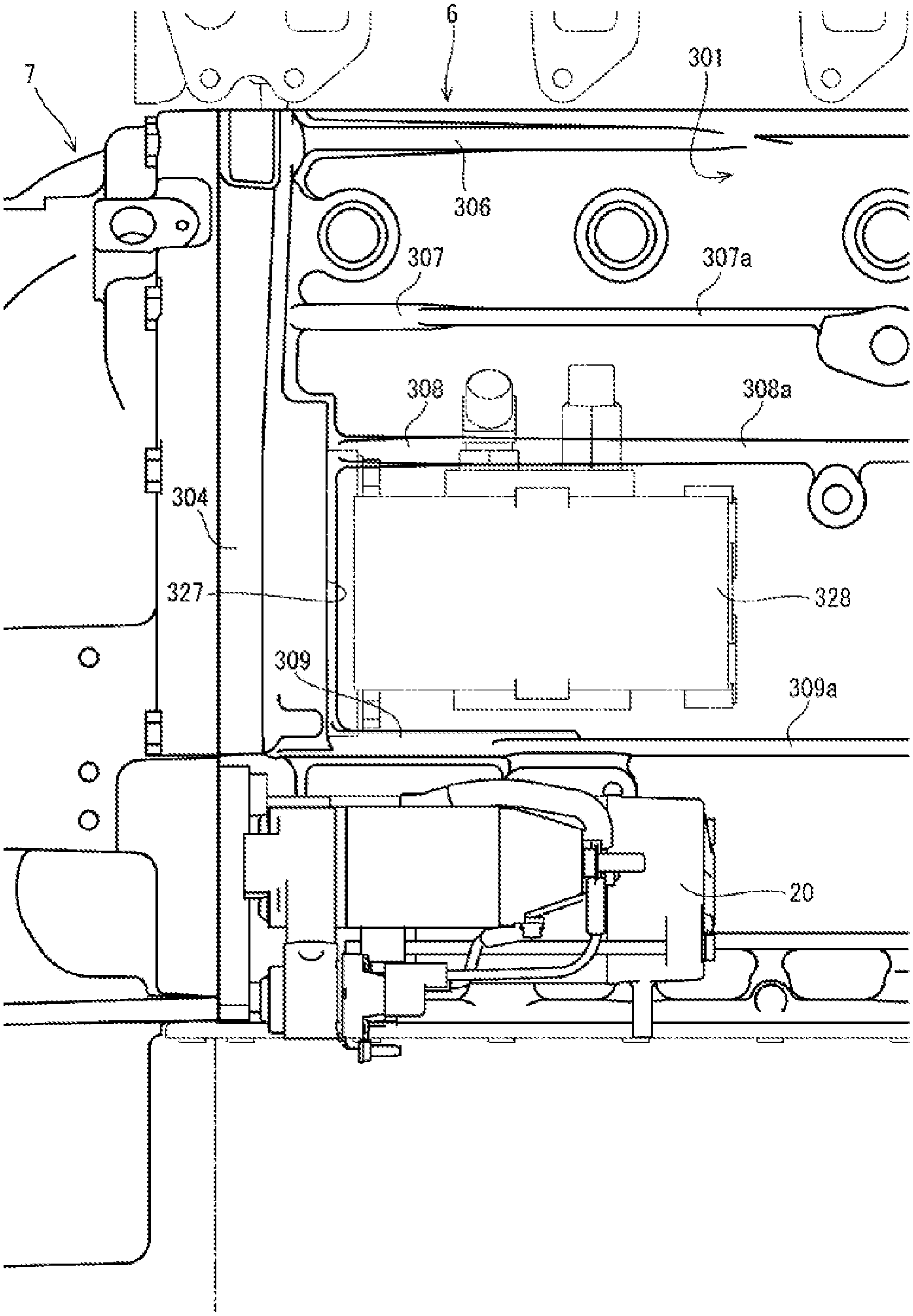
FIG. 22 is a left side view showing a position where an external auxiliary machine is attached.
Figure 23:
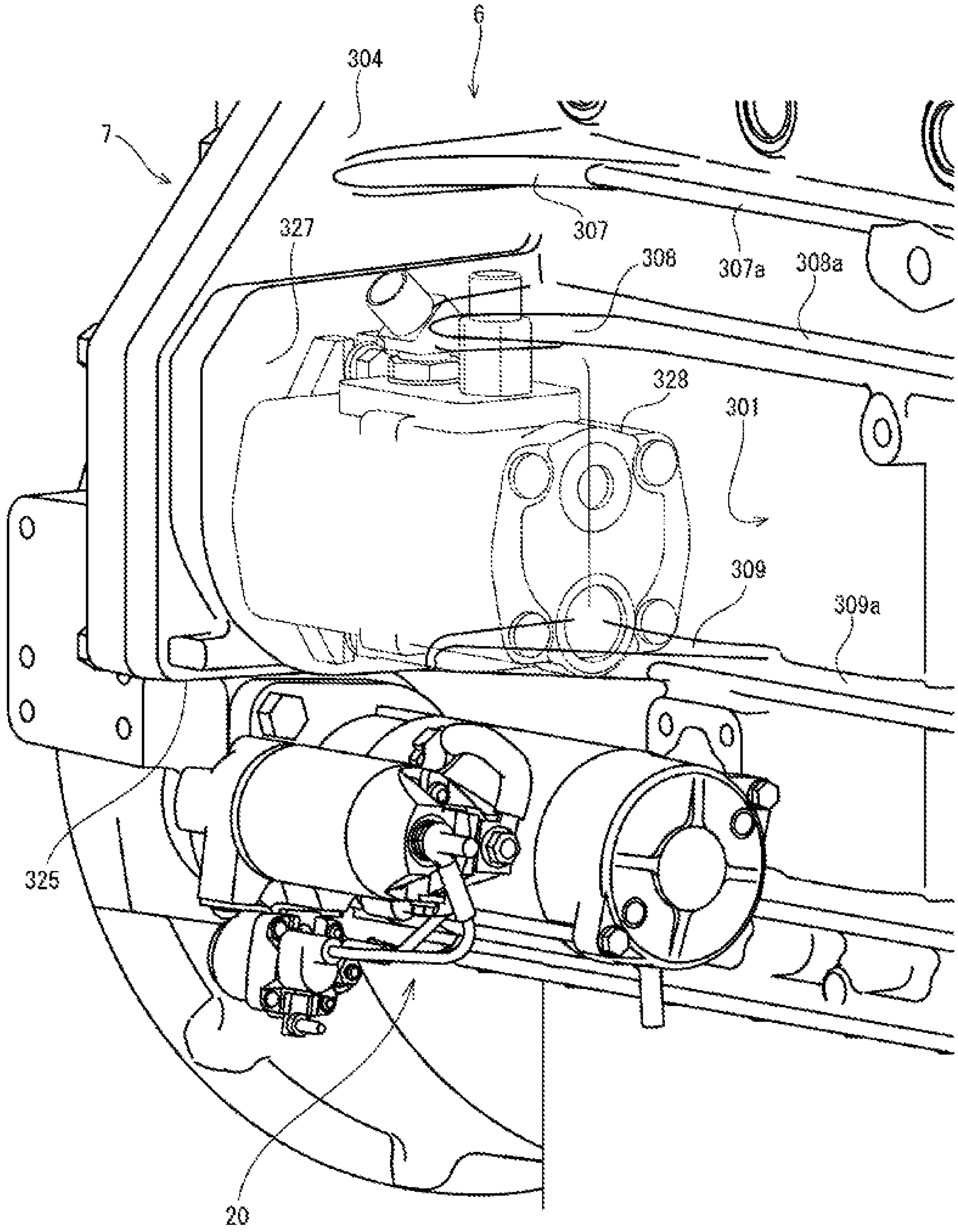
FIG. 23 is a perspective view showing the position where the external auxiliary machine is attached.

As shown in FIG. 22 and FIG. 23, an external auxiliary machine 328 that is operated in conjunction with rotation of the crankshaft 5 is disposed to an external auxiliary machine attachment pedestal 327 of the left housing bracket portion 304 of the cylinder block 6. The external auxiliary machine 328 is, for example, a work machine pump used in a work machine to which the engine 1 is mounted. The external auxiliary machine 328 is meshed with the cam gear 332 (see FIG. 12), and is actuated by rotation of an auxiliary machine gear (not shown) which is in conjunction with rotation of the crankshaft 5. The left-side third reinforcing rib 308 and the left-side fourth reinforcing rib 309 are disposed near the external auxiliary machine attachment pedestal 327. Since reinforcing ribs 308, 309 enhances the rigidity of the external auxiliary machine attachment pedestal 327, mispositioning and malfunction of the external auxiliary machine 328 can be prevented, which may otherwise be caused by distortion of the external auxiliary machine attachment pedestal 327. Moreover, the external auxiliary machine 328 is disposed directly above the starter 20, and therefore has a function for protecting the starter 20. Accordingly, the starter 20 can be prevented from being contacted by a foreign object such as a tool coming from above. Thus, breakdown and mispositioning of the starter 20 can be prevented, which may otherwise be caused by contact with the foreign object.

Figure 24:
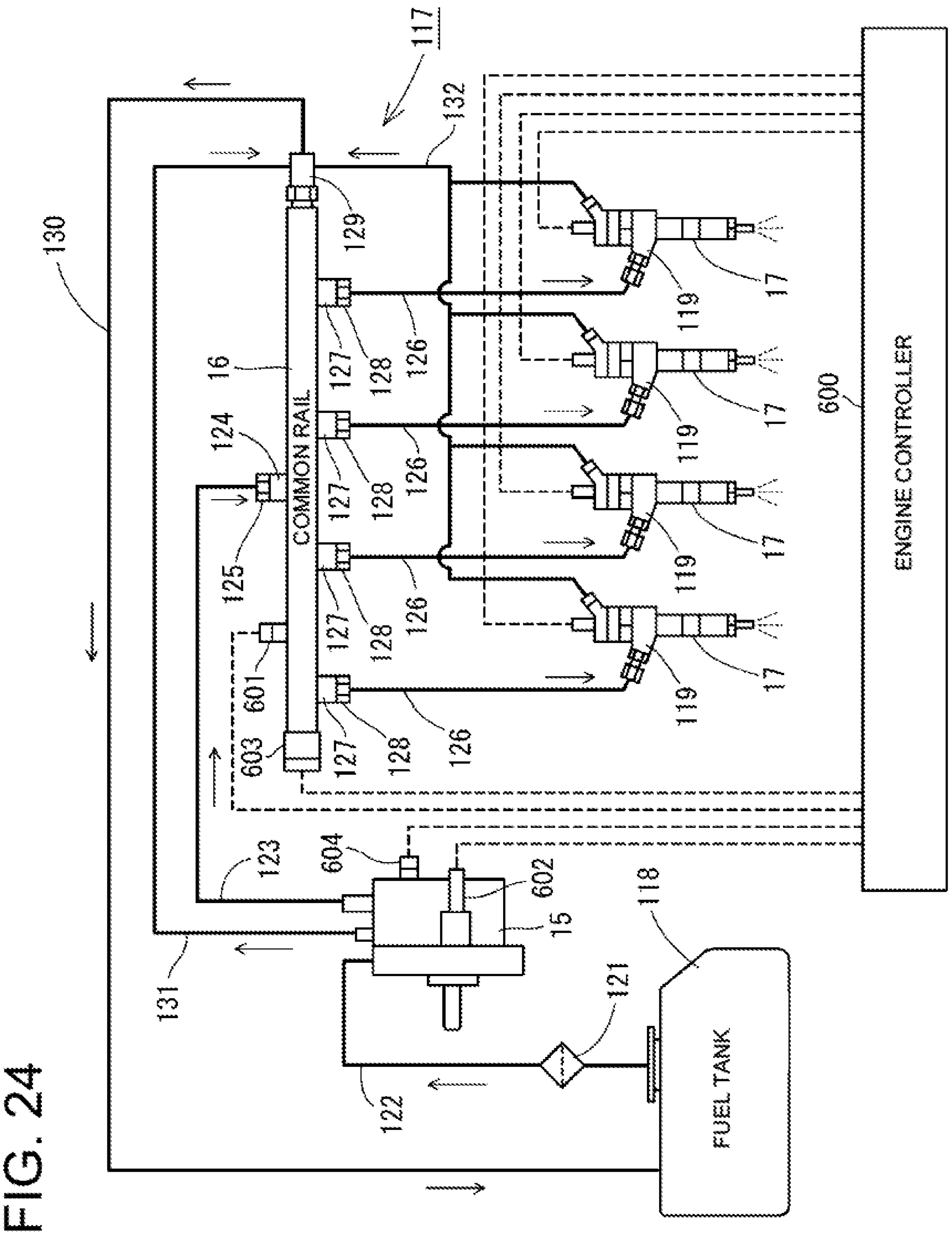
FIG. 24 is a diagram illustrating an engine fuel system.

A fuel system structure of a common rail system 117 and the engine 1 will now be described with reference to FIG. 24. As shown in FIG. 24, the fuel tank 118 is connected to the respective injectors 17 corresponding to four cylinders provided in the engine 1 through the fuel feed pump 15 and the common rail system 117. Each injector 17 has the fuel injection valve 119 of electromagnetic-controlled type. The common rail system 117 includes the common rail 16 having a cylindrical shape. The common rail 16 is provided on the right surface 302 of the cylinder block 6, and is disposed near the intake manifold 3.

The fuel tank 118 is connected to a suction side of the fuel feed pump 15 with interposition of a fuel filter 121 and a low-pressure tube 122. A fuel in the fuel tank 118 is suctioned into the fuel feed pump 15 through the fuel filter 121 and the low-pressure tube 122. Meanwhile, the common rail 16 is connected to an ejection side of the fuel feed pump 15 with interposition of a high-pressure tube 123. A high-pressure tube connector 124 is disposed longitudinally midway in the cylindrical common rail 16. An end portion of the high-pressure tube 123 is coupled to the high-pressure tube connector 124 by screwing with a high-pressure tube connector nut 125.

The injectors 17 corresponding to four cylinders are connected to the common rail 16 with interposition of four fuel injection pipes 126, respectively. Fuel injection pipe connectors 127 corresponding to four cylinders are arranged in a longitudinal direction of the cylindrical common rail 16. An end portion of each fuel injection pipe 126 is coupled to the corresponding fuel injection pipe connector 127 by screwing with a fuel injection pipe connector nut 128.

A return pipe connector 129 (pipe joint member) for returning a surplus fuel, which limits a fuel pressure in the common rail 16, is connected to a longitudinal end portion of the common rail 16. The return pipe connector 129 is connected to the fuel tank 118 through a fuel return pipe 130. A surplus fuel in the fuel feed pump 15 is fed to the return pipe connector 129 through a pump surplus fuel return pipe 131. A surplus fuel in each injector 17 is fed to the return pipe connector 129 through an injector surplus fuel return pipe 132. That is, the surplus fuel in the fuel feed pump 15, a surplus fuel in the common rail 16, and the surplus fuel in each injector 17 are merged in the return pipe connector 129, and then collected to the fuel tank 118 through the fuel return pipe 130. Here, it may be possible that the return pipe connector 129 is connected to the fuel tank 118 via a pipe joint member (not shown) for returning a filter surplus fuel, the pipe joint member being provided in the fuel filter 121.

A fuel pressure sensor 601 that detects a fuel pressure in the common rail 16 is provided in an end portion of the common rail 16 opposite to the end portion thereof having the return pipe connector 129. Under control by an engine controller 600, the degree of opening of a suction metering valve 602 of the fuel feed pump 15 is adjusted, while the fuel pressure in the common rail 16 is monitored based on an output of the fuel pressure sensor 601. Thereby, with adjustment of the amount of fuel suctioned by the fuel feed pump 15, and thus with adjustment of the amount of fuel ejected by the fuel feed pump 15, the fuel in the fuel tank 118 is pressure-fed to the common rail 16 by the fuel feed pump 15, so that a high-pressure fuel is stored in the common rail 16. Under control by the engine controller 600, opening/closing of each of the fuel injection valves 119 is controlled, so that the high-pressure fuel in the common rail 16 is injected from each injector 17 to each cylinder of the engine 1. That is, by electronically controlling each fuel injection valve 119, an injection pressure, an injection timing, and an injection period (injection amount) of the fuel supplied from each injector 17 can be controlled with a high accuracy. Accordingly, a nitrogen oxide (NOx) discharged from the engine 1 can be reduced. Noise and vibration of the engine 1 can be reduced. A pressure reducing valve 603 of electromagnetic-driven type for adjusting a pressure in the common rail 16 and a fuel temperature sensor 604 for detecting a fuel temperature in the fuel feed pump 15 are also electrically connected to the engine controller 600. Other devices as exemplified by various sensors provided in the engine 1 are also electrically connected to the engine controller 600, though not shown.

Figure 25:
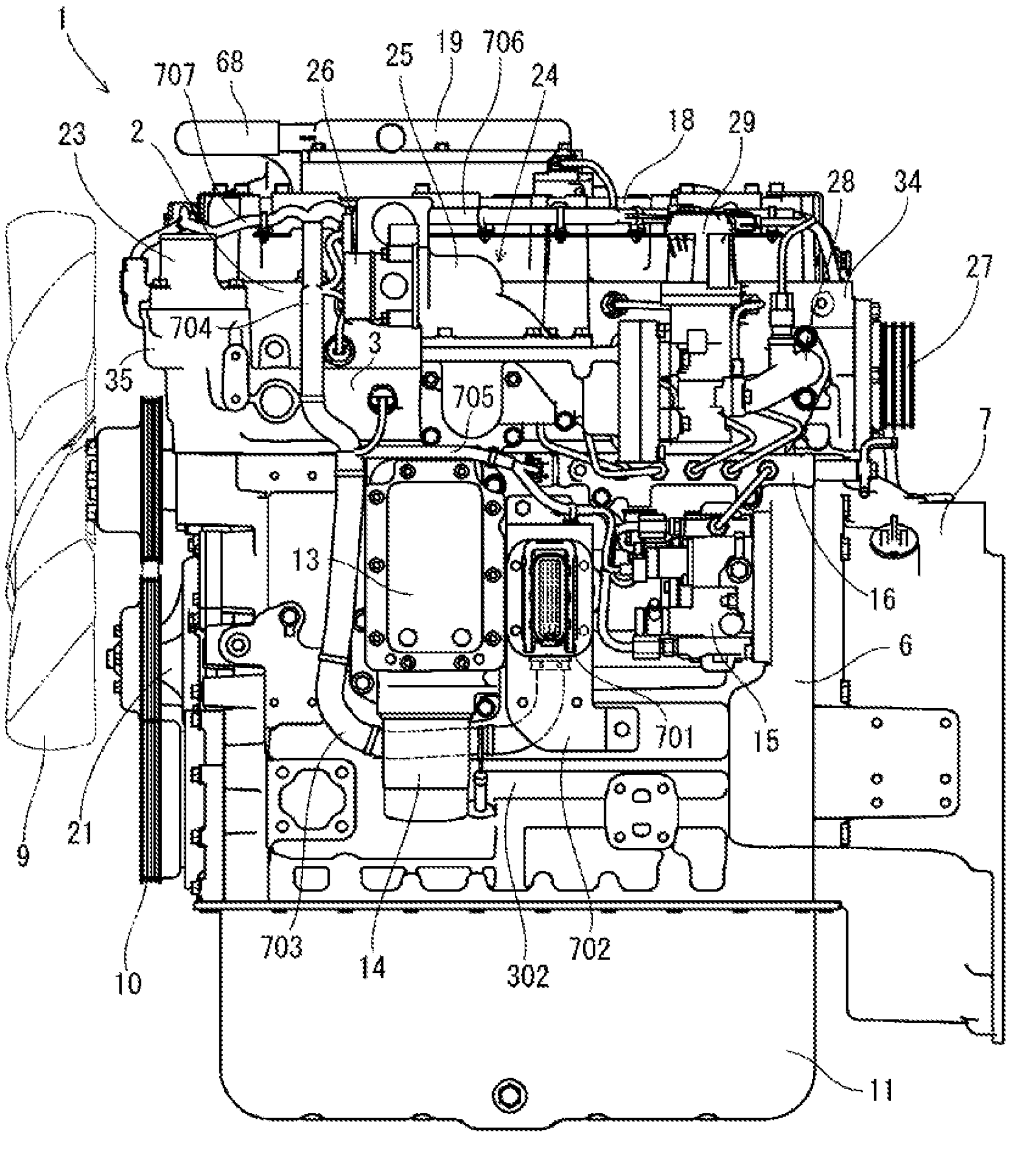
FIG. 25 is a right side view showing a harness.

A part of a harness structure which is annexed to the engine 1 will now be described with reference to FIG. 25. A harness connector 701 that connects component parts of the engine 1 to the engine controller 600 (see FIG. 24) and to a battery (not shown) is fixed to the right surface 302 of the cylinder block 6 with a connector bracket 702 interposed therebetween. The harness connector 701 and the connector bracket 702 are disposed in a region surrounded by the oil cooler 13, the oil filter 14, the fuel feed pump 15, and the common rail 16.

A main harness assembly 703 extending from the harness connector 701 is guided through a space between the right surface 302 of the cylinder block 6 and the connector bracket 702 to a lower region in the engine 1, and then is guided along the linear portion 311*a* of the right-side second reinforcing rib 311, through a space between the right surface 302 and the oil filter 14, toward a rear region in the engine 1. Furthermore, at a location more rearward in the engine 1 than the oil filter 14, the main harness assembly 703 is bent upward in the engine 1, and is guided through the rear side of the oil cooler 13 in the engine 1, toward the cylinder head 2.

The main harness assembly 703 is, in the vicinity of a joining surface where the cylinder head 2 and the cylinder block 6 are joined to each other, branched into an intake/exhaust system harness assembly 704 and a fuel system harness assembly 705. The intake/exhaust system harness assembly 704 is guided along the right surface of the cylinder head 2 toward the upper side in the engine 1, and in the vicinity of an upper portion of the right surface of the head cover 18 relatively close to the rear side, branched into an intake system harness assembly 706 and an exhaust system harness assembly 707. The intake system harness assembly 706 is guided along the right surface of the head cover 18, toward a front region in the engine 1. The exhaust system harness assembly 707 is guided along the right surface and the rear surface of the head cover 18, toward a left region in the engine 1.

The fuel system harness assembly 705 is guided through a space between the oil cooler 13 and the collector 25 of the EGR device 24, toward a front region in the engine 1, and is branched into harnesses connected to the fuel pressure sensor 601 and the pressure reducing valve 603 of the common rail 16 and to the suction metering valve 602 and the fuel temperature sensor 604 of the fuel feed pump 15 shown in FIG. 24.

A layout of the common rail 16 and therearound will be described with reference to FIG. 26 to FIG. 30. The common rail 16 having a substantially cylindrical shape is attached to an upper portion of the right surface 302 of the cylinder block 6 relatively close to the front side such that a longitudinal direction of the common rail 16 is along the crankshaft center 300 (see FIG. 11). The common rail 16 is disposed on the right surface of the cylinder head 2, at a location below the intake manifold 3 which is formed integrally with the cylinder head 2. A front end portion (one end portion) of the common rail 16 is arranged on the gear case 330 and on the flywheel housing 7. The common rail 16 includes, in its front end portion, the return pipe connector 129 (pipe joint member) for returning a surplus fuel, the return pipe connector 129 limiting a fuel pressure in the common rail 16. For example, the return pipe connector 129 is arranged on the flywheel housing 7.

Figure 26:
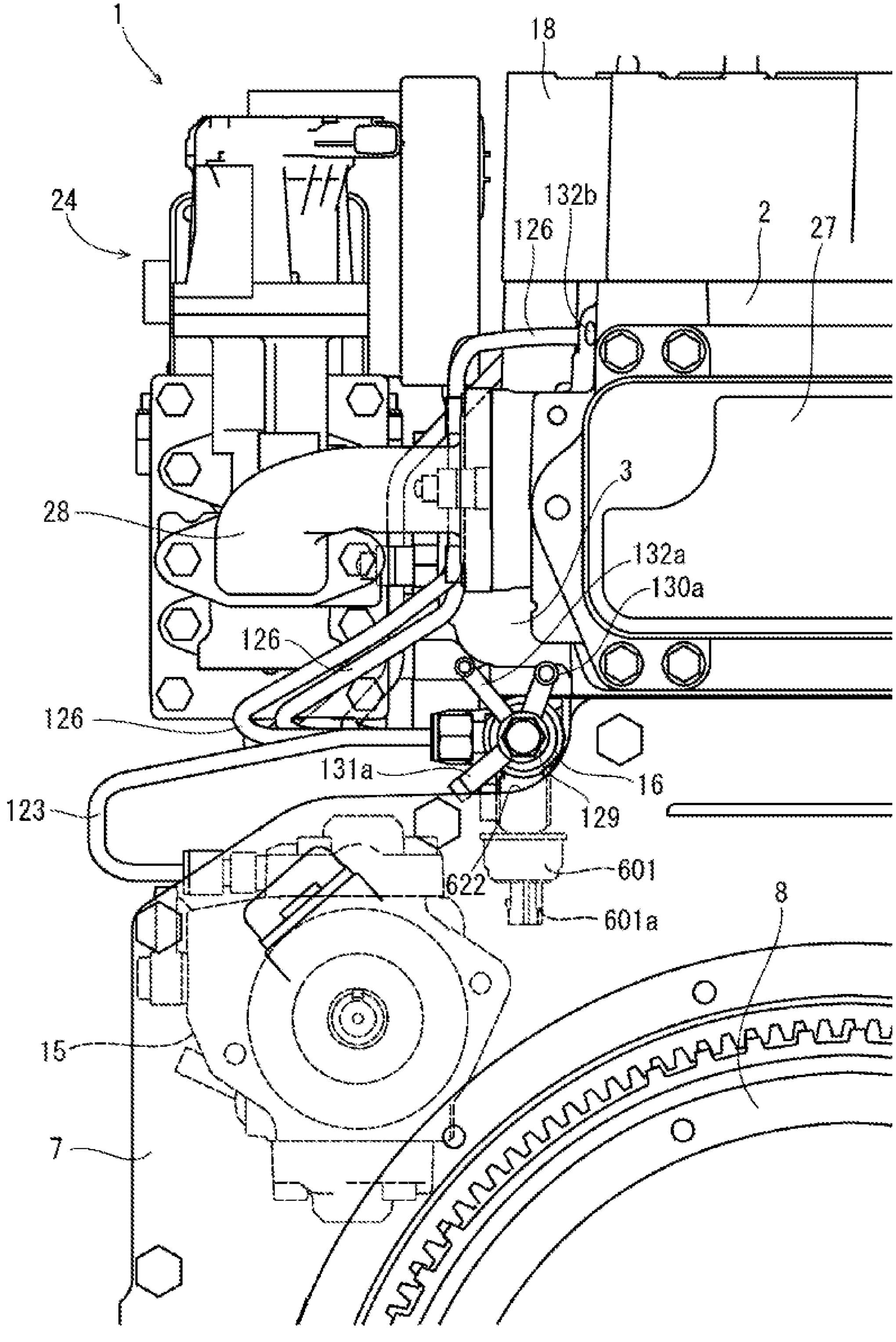
FIG. 26 is a front view showing a common rail and therearound.

A bracket recessed portion 621 provided in the right housing bracket portion 305 of the cylinder block 6 and a housing recessed portion 622 provided in the flywheel housing 7 are arranged near an upper front corner of the right surface 302 of the cylinder block 6. As shown in FIG. 26, the recessed portions 621, 622 are provided near the upper front corner of the right surface 302 such that a joining portion where the flywheel housing 7 and the right housing bracket portion 305 are joined with each other is at a level lower than the upper surface of the cylinder block 6. This allows the front end portion of the common rail 16 attached to the right surface 302 of the cylinder block 6 to extend above the recessed portions 621, 622 toward the upper side of the flywheel housing 7.

The return pipe connector 129 includes a connecting portion 130*a* to which one end of the fuel return pipe 130 (see FIG. 24) is connected, a connecting portion 131*a* to which one end of the pump surplus fuel return pipe 131 (see FIG. 24) is connected, and a connecting portion 132*a* to which one end of the injector surplus fuel return pipe 132 (see FIG. 24) is connected. The return pipe connector 129 is provided therein with an internal fluid passage (not shown) that connects the connecting portions 130*a*, 131*a*, 132*a*, and a fuel pressure regulating valve (not shown) disposed between the internal fluid passage and an internal space of the common rail 16. A surplus fuel outlet 132*b* for a surplus fuel from the injectors 17 (see FIG. 24) is provided in a portion of the cylinder head 2 near an intersection between the right surface 302 and the front surface 303 of the cylinder block 6 (see FIG. 12), which in this embodiment means a portion near a corner where the right surface and the front surface of the cylinder head 2 intersect each other and more specifically means a front end portion of the right surface of the cylinder head 2 relatively close to the upper side. An injector surplus fuel return pipe 132*c* is disposed in connection between the surplus fuel outlet 132*b* and the connecting portion 132*a* of the return pipe connector 129. The surplus fuel outlet 132*b* is connected to a surplus fuel outlet of each injector 17 (see FIG. 24) via a surplus fuel passage (not shown) provided inside a side wall of the cylinder head 2 and the injector surplus fuel return pipe 132 (see FIG. 24) disposed within the cylinder head 2.

Figure 30:
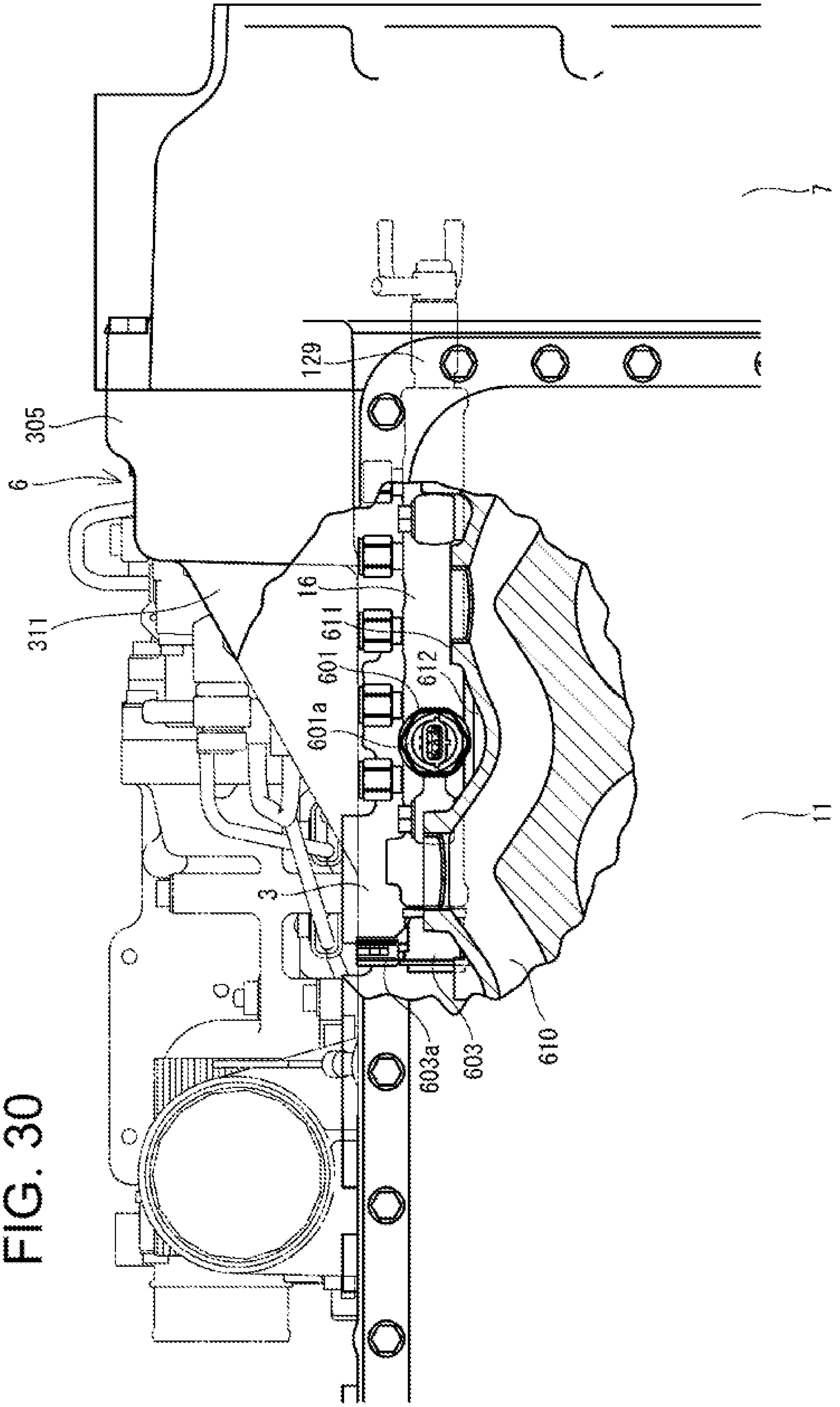
FIG. 30 is a bottom plan view showing a connector of the common rail by cutting off a part of an oil pan and a part of the cylinder block.

Connectors 601*a*, 603*a* of the fuel pressure sensor 601 and the pressure reducing valve 603 of the common rail 16, which are electrically connected to the engine controller 600 (see FIG. 24), are disposed below the intake manifold 3 of the cylinder head 2. As shown in FIG. 13 and FIG. 30, the right surface 302 of the cylinder block 6 has a concavo-convex surface portion 611 that corresponds to the shape of a water rail 610 (coolant passage) which is provided inside the cylinder block 6. The connector 601*a* of the fuel pressure sensor 601 is disposed above a concave region 612 of the concavo-convex surface portion 611. A connecting portion of the connector 601*a* is directed toward the concave region 612 in a side view. A connecting portion of the connector 603*a* of the pressure reducing valve 603 is directed toward the right lateral side of the engine 1, for example.

Figure 29:
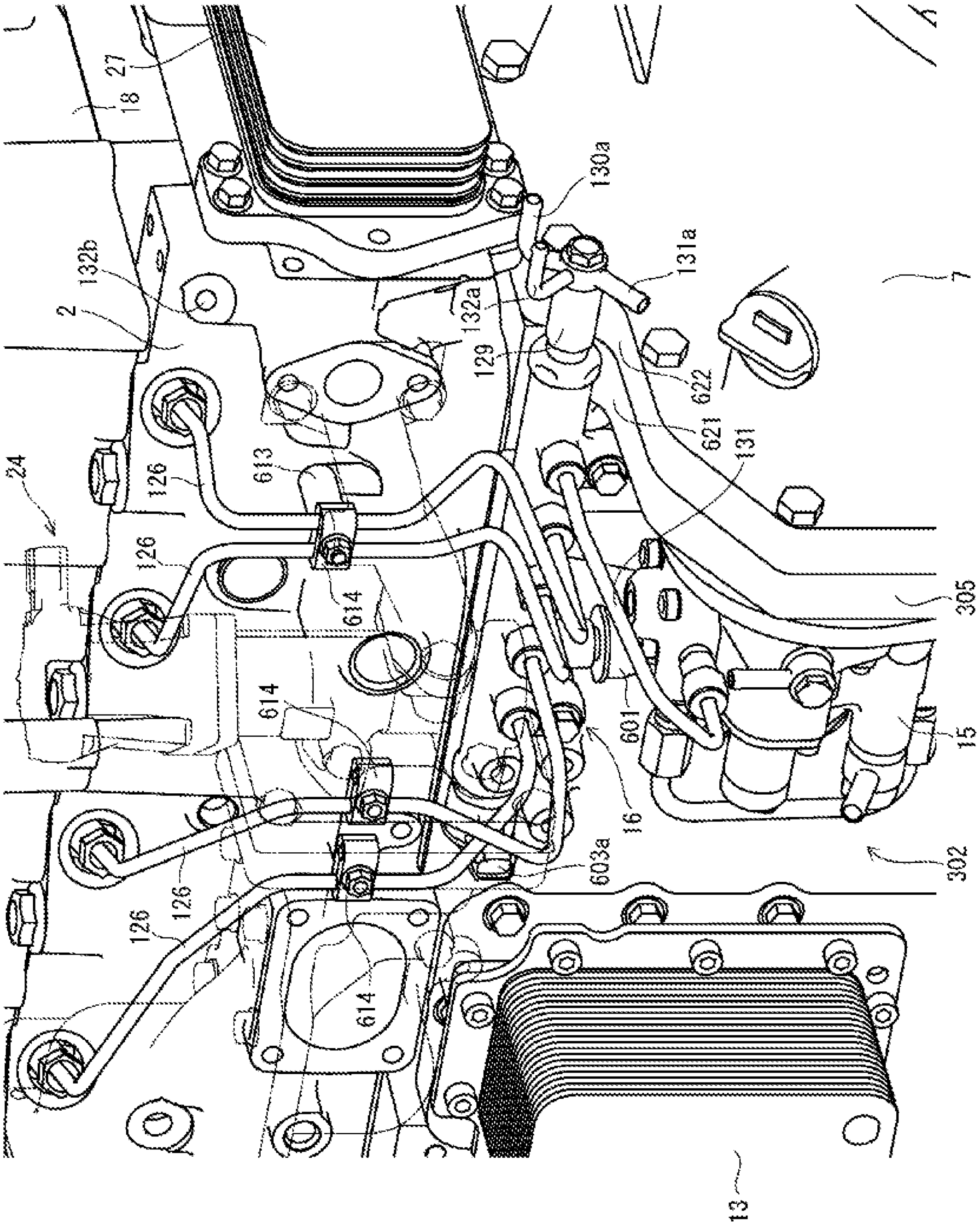
FIG. 29 is a perspective view showing a fuel injection pipe.

The four fuel injection pipes 126 extending from the common rail 16 toward the cylinder head 2 pass through a space between the cylinder head 2 and the EGR device 24 (exhaust-gas recirculation device), and are connected to the respective injectors 17 (see FIG. 24). As shown in FIG. 29, a midway portion of each of the four fuel injection pipes 126 is attached to the cylinder head 2 by a fuel injection pipe fixture 614 which is attached to the cylinder head 2 directly or with a spacer member 613 interposed therebetween. Since the midway portion of each fuel injection pipe 126 is fixed to the cylinder head 2, the fuel injection pipe 126 causes less vibration, and thus damage of the fuel injection pipe 126 due to vibration can be prevented. In this embodiment, among the four fuel injection pipes 126, two fuel injection pipes 126 located more frontward in the engine 1 have their midway portions fixed to the cylinder head 2 with interposition of a spacer member 613 having a substantially cylindrical shape. By adjusting the spacer member 613 to a desired length, the midway portion of the fuel injection pipe 126 can be fixed at a position that is at any distance from the side surface of the cylinder head 2. Thus, the fuel injection pipe 126 with any shape can be handled without the need to change the design of a surface configuration of the cylinder head 2.

Figure 27:
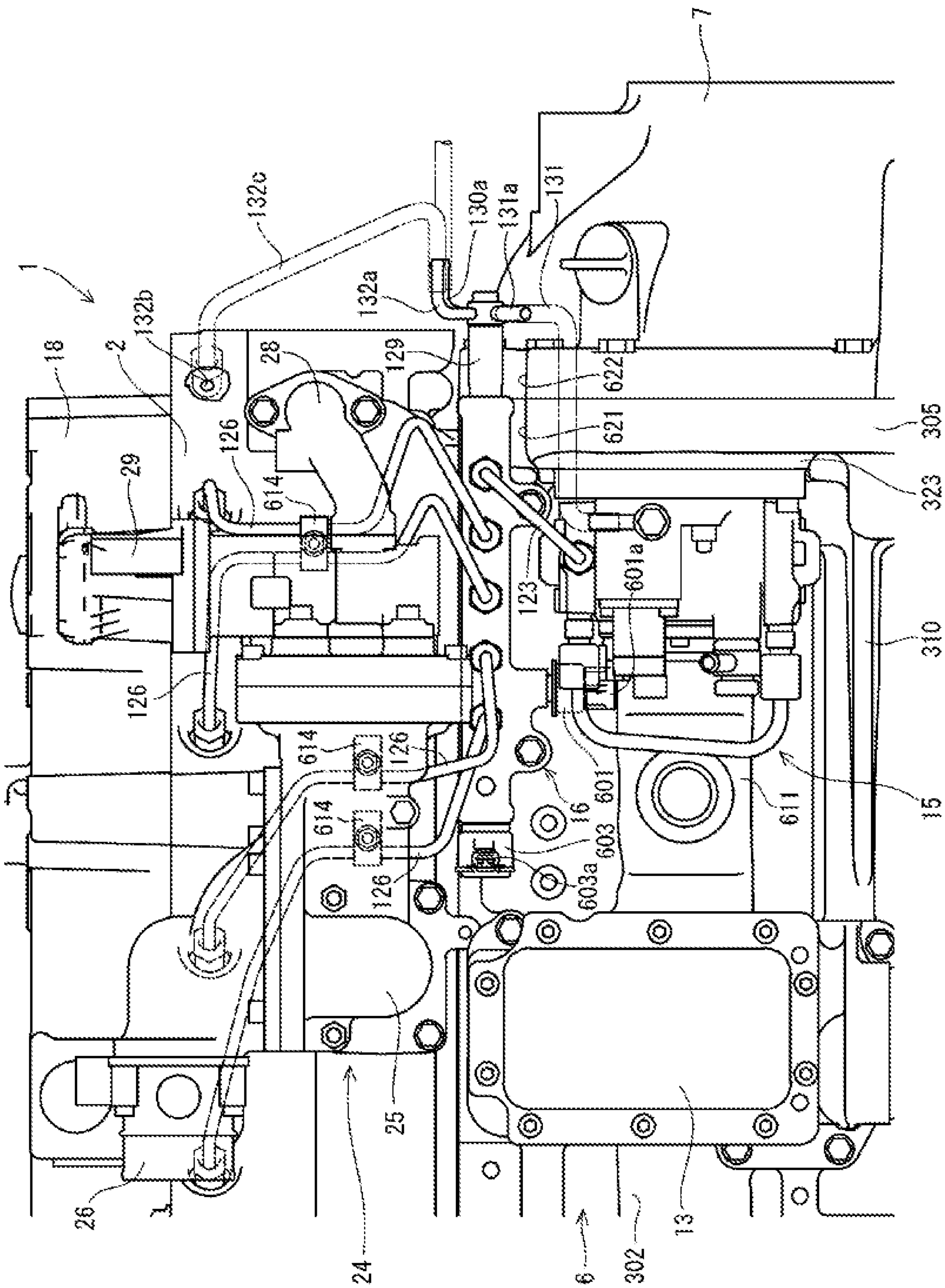
FIG. 27 is a right side view showing the common rail and therearound.
Figure 28:
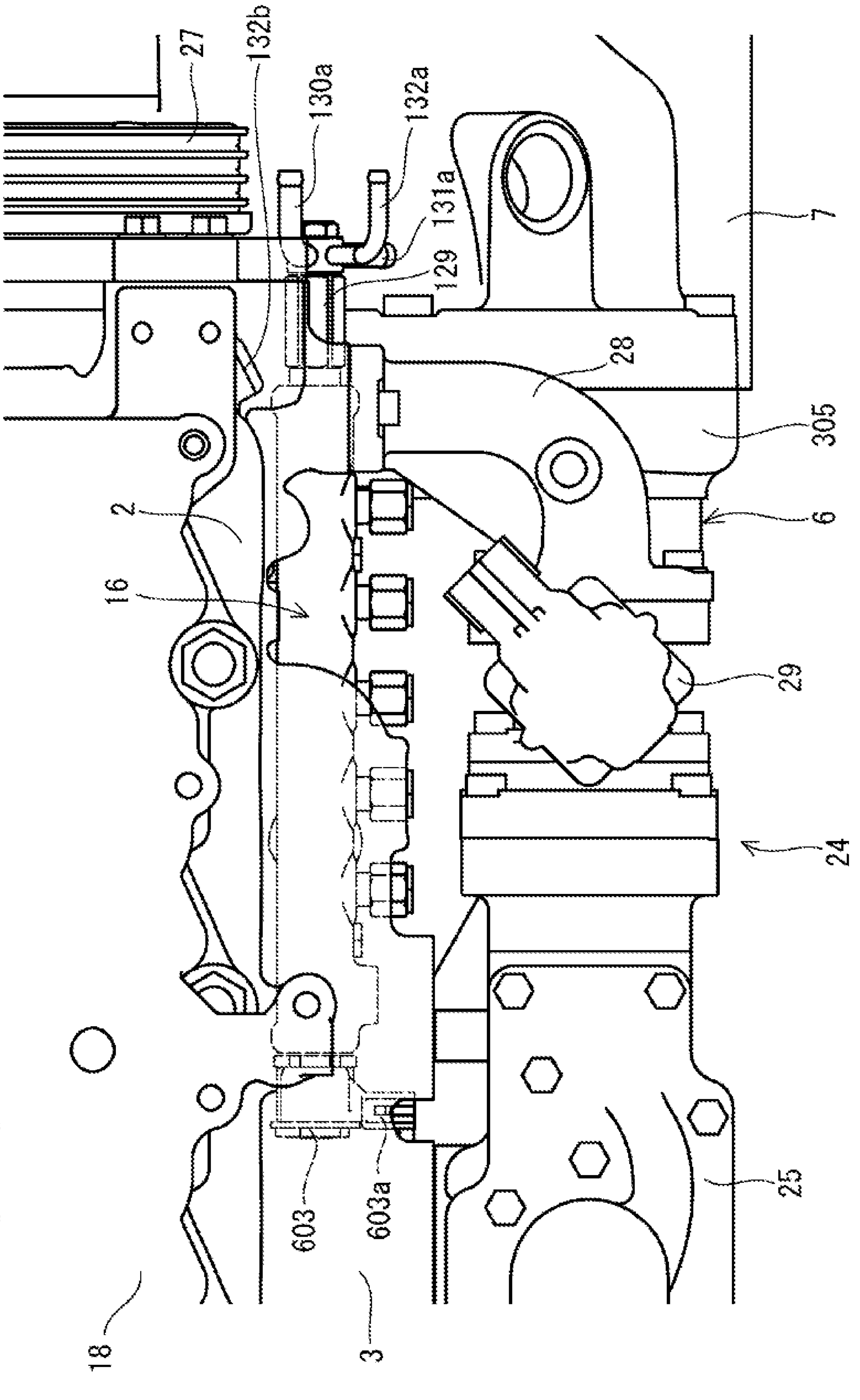
FIG. 28 is a top plan view showing the common rail and therearound.

As shown in FIG. 27, the fuel feed pump 15 attached to the right housing bracket portion 305 of the cylinder block 6 is disposed below the EGR device 24. As mentioned above, the right-side first reinforcing rib 310 is arranged directly under the fuel feed pump 15, and the right-side second reinforcing rib 311 is arranged directly under the right-side first reinforcing rib 310, to thereby prevent the fuel feed pump 15 from being contacted by a foreign object such as muddy water or stone coming from below (see FIG. 16).

The engine 1 of this embodiment, in which one end portion of the common rail 16 attached to the right surface 302 (one side portion) of the cylinder block 6 is disposed above the flywheel housing 7, can reduce an area of the right surface 302 of the cylinder block 6 occupied by a region where the common rail 16 is disposed, as compared to a configuration in which the whole of the common rail 16 is disposed on the right surface 302 of the cylinder block 6. Accordingly, the degree of freedom can be enhanced in a layout of other members on the right surface 302 of the cylinder block 6. For example, in the engine device 1 of this embodiment, the oil cooler 13 is arranged on the rear side of a rear end portion of the common rail 16 in the engine 1 such that the oil cooler 13 is close to the intake manifold 3 and the EGR device 24. Thereby, a compact arrangement configuration of these component parts can be achieved.

In the engine 1 of this embodiment, the connectors 601*a*, 603*a* of the fuel pressure sensor 601 and the pressure reducing valve 603 of the common rail 16, which are electrically connected to the engine controller 600, are disposed below the intake manifold 3 which is formed integrally with the cylinder head 2. Thus, the intake manifold 3 can protect the connectors 601*a*, 603*a* against contact with a foreign object. In addition, the EGR device 24 attached to the intake manifold 3 also protects the connectors 601*a*, 603*a* in the same manner.

Since a connection port of the connector 601*a* is directed toward the concave region 612 of the concavo-convex surface portion 611 that corresponds to the shape of the water rail 610 in a side view. This enables a harness-side connector to be attached to the connector 601*a* so as to extend along the concave region 612, which can enhance operability in attaching harnesses. Furthermore, this enables the connector 601*a* to be arranged at a location relatively close to the cylinder block 6, as compared to a configuration in which the connection port of the connector 601*a* is directed toward the outside of the engine 1. Thus, the width of the engine 1 as a whole can be reduced.

In the engine 1 of this embodiment, the common rail 16 has, in its front end portion, the return pipe connector 129 for returning a surplus fuel, and the surplus fuel outlet 132*b* for a surplus fuel from the respective injectors 17 is provided near the intersection between the right surface 302 and the front surface 303 of the cylinder block 6 of the cylinder head 2 in a plan view. Since the return pipe connector 129 is disposed above the flywheel housing 7, the injector surplus fuel return pipe 132*c* (surplus fuel return path) that connects the surplus fuel outlet 132*b* to the connecting portion 132*a* of the return pipe connector 129 can be shortened and simplified. This can solve a problem of the conventional technique that a surplus fuel return path for a surplus fuel from the injectors 17 is elongated and complicated. In a case where, for example, the fuel filter 121 (see FIG. 24) is provided in a work machine or a vehicle equipped with the engine 1, a vacant space above the flywheel housing 7 can be used to shorten and simplify a piping path between the fuel filter 121 and the connecting portion 130*a* of the return pipe connector 129, and also to enhance the degree of freedom in designing the piping path.

In the engine 1 of this embodiment, the EGR device 24 configured to mix a part of the exhaust gas discharged from the exhaust manifold 4 with fresh air is coupled to the intake manifold 3, and the four fuel injection pipes 126 extending from the common rail 16 toward the cylinder head 2 pass through the space between the cylinder head 2 and the EGR device 24. Thus, the fuel injection pipes 126 can be protected by the EGR device 24. This can solve a problem of the conventional technique having a fuel injection pipe assembled to an outer peripheral portion of an engine device, that is, a problem that deformation of the fuel injection pipe or fuel leakage may be caused due to contact between the engine device and another member during transportation or due to falling of a foreign object, for example.

In the engine 1 of this embodiment, the fuel feed pump 15 for supplying a fuel to the common rail 16 is attached to the cylinder block 6 and is disposed below the EGR device 24. This can protect the fuel feed pump 15 against contact with a foreign object coming from above, such as a tool falling at a time of assembling. Thus, damage of the fuel feed pump 15 can be prevented.

In addition, the fuel feed pump 15 is attached to the right housing bracket portion 305 that protrudes from the right surface 302 of the cylinder block 6, and the reinforcing ribs 310, 311 for coupling the right surface 302 to the right housing bracket portion 305 are disposed below the fuel feed pump 15. This can protect the fuel feed pump 15 against contact with a foreign object, such as a stone, coming from below. As a result, damage of the fuel feed pump 15 can be further prevented.

In this embodiment, as shown in FIG. 27, a space is provided between the oil cooler 13 and the fuel feed pump 15, in order to enable the fuel feed pump 15 having the fuel feed pump gear 334 (see FIG. 12) secured thereto to be removed from the right housing bracket portion 305 without the need to remove the oil cooler 13. As shown in FIG. 25, the harness connector 701 and the connector bracket 702 are arranged between the oil cooler 13 and the fuel feed pump 15. Thereby, with effective utilization of the space between the oil cooler 13 and the fuel feed pump 15, the harness connector 701 can be arranged at a position surrounded by the oil cooler 13, the oil filter 14, the fuel feed pump 15, and the EGR device 24, for protection of the harness connector 701.

A well-known configuration of the conventional engine includes: an oil cooler for heat exchange between a lubricant and a coolant; and an oil filter for purifying the lubricant by filtration (see, for example, Japanese Patent Application Laid-Open No. 2005-273484). A lubricant path and a coolant path leading to the oil cooler are separately provided. In an engine disclosed in Japanese Patent Application Laid-Open No. 2005-273484, therefore, coolant piping such as pipes and hoses for circulating the coolant through the oil cooler is disposed. According to Japanese Patent Application Laid-Open No. 2005-273484, moreover, a lubricant pipe member for circulating the lubricant between the oil cooler and the oil filter is disposed.

For example, a change in oil cooler capacity requires a component part such as piping or a bracket corresponding to the oil cooler capacity. It therefore is necessary to prepare piping for each oil cooler capacity. This involves a problem that an increase number of component parts. The configuration disclosed in Japanese Patent Application Laid-Open No. 2005-273484 requires the lubricant pipe member for connecting the oil cooler to the oil filter, which involves a problem that an increase number of component parts. Thus, the engine 1 of this embodiment aims to reduce the number of component parts in an engine device including an oil cooler and an oil filter.

A structure for attaching the oil cooler 13 and the oil filter 14 will be described with reference to FIG. 31 to FIG. 35. The oil cooler 13 and the oil filter 14 are disposed on the right surface 302 of the cylinder block 6 with an oil cooler bracket 631 (bracket member) interposed therebetween. In this embodiment, the oil cooler 13 is a multi-plate type plate stack heat exchanger in which a plurality of plate members are stacked such that an oil passage and a coolant passage are formed alternately in a stacking direction. The oil cooler bracket 631 is fastened and fixed to an oil cooler bracket attachment pedestal 318 (attaching part) protruding from the right surface 302, with bracket bolts 632.

The oil cooler bracket 631 is composed mainly of an oil cooler attaching part 633, a coupling portion 634, and an oil filter attaching part 635. The oil cooler bracket 631 is a casting. The oil cooler attaching part 633, the coupling portion 634, and the oil filter attaching part 635 are integrally formed.

The oil cooler attaching part 633 is substantially in the shape of a flat plate, and has an oil cooler attaching face 637 on its surface opposite to a joining surface 636 joined to the oil cooler bracket attachment pedestal 318. The oil cooler attaching part 633 has, in its peripheral edge portion, a plurality of flange portions protruding outward along the joining surface 636. Bolt insertion holes 638 through which the bracket bolts 632 are inserted are formed in the flange portions. Two bolt placement concavities 639 are provided in a central portion of the oil cooler attaching face 637, the bolt placement concavities 639 accommodating heads of the bracket bolts 632. Each bolt placement concavity 639 has, at its bottom, a bolt insertion hole 638 that bores to reach the joining surface 636.

The coupling portion 634 is provided upright on the peripheral edge portion of the oil cooler attaching part 633, and protrudes in a direction roughly perpendicular to the oil cooler attaching face 637, toward the side opposite to the joining surface 636. The coupling portion 634 is disposed in a portion of the oil cooler attaching part 633, the portion being located lower when the oil cooler bracket 631 is attached to the oil cooler bracket attachment pedestal 318.

The oil filter attaching part 635 is provided on the distal end side of the coupling portion 634. The oil filter attaching part 635 has an oil filter attaching surface 640 with an annular shape. The oil filter attaching surface 640 is provided in a portion of the oil filter attaching part 635, the portion being on the side opposite to the oil cooler 13 which is attached to the oil cooler attaching face 637.

The oil cooler attaching part 633 has: a coolant inflow hole 641 that is connected to a coolant inlet port 13*a* of the oil cooler 13; a coolant outflow hole 642 that is connected to a coolant outlet port 13*b* of the oil cooler 13; a lubricant inflow hole 643 that is connected to a lubricant inlet port 13*c* of the oil cooler 13; and a lubricant outflow hole 644 that is connected to a lubricant outlet port 13*d* of the oil cooler 13. The coolant inflow hole 641, the coolant outflow hole 642, the lubricant inflow hole 643, and the lubricant outflow hole 644 bore through the joining surface 636 and the oil cooler attaching face 637. A fluid passage cross-sectional area (diameter) of the coolant outflow hole 642 is smaller than a fluid passage cross-sectional area of the coolant inflow hole 641.

In the oil cooler bracket 631, a lubricant inlet passage 645 and a lubricant outlet passage 646 are formed, which extend from the joining surface 636 of the oil cooler attaching part 633 to the oil filter attaching surface 640 of the oil filter attaching part 635 through the inside of the coupling portion 634. The lubricant inlet passage 645 and the lubricant outlet passage 646 extend from the joining surface 636 to the oil filter attaching part 635, in a direction perpendicular to the joining surface 636. The lubricant inlet passage 645 is, within the oil filter attaching part 635, bent in a direction perpendicular to the oil filter attaching surface 640, and is opened at a central position of the oil filter attaching surface 640. The lubricant outlet passage 646 is, within the oil filter attaching part 635, coupled to a substantially cylindrical passage formed around the lubricant inlet passage 645, and is opened with an annular shape enclosing the lubricant inlet passage 645 inside the oil filter attaching surface 640 with an annular shape.

Figure 34:
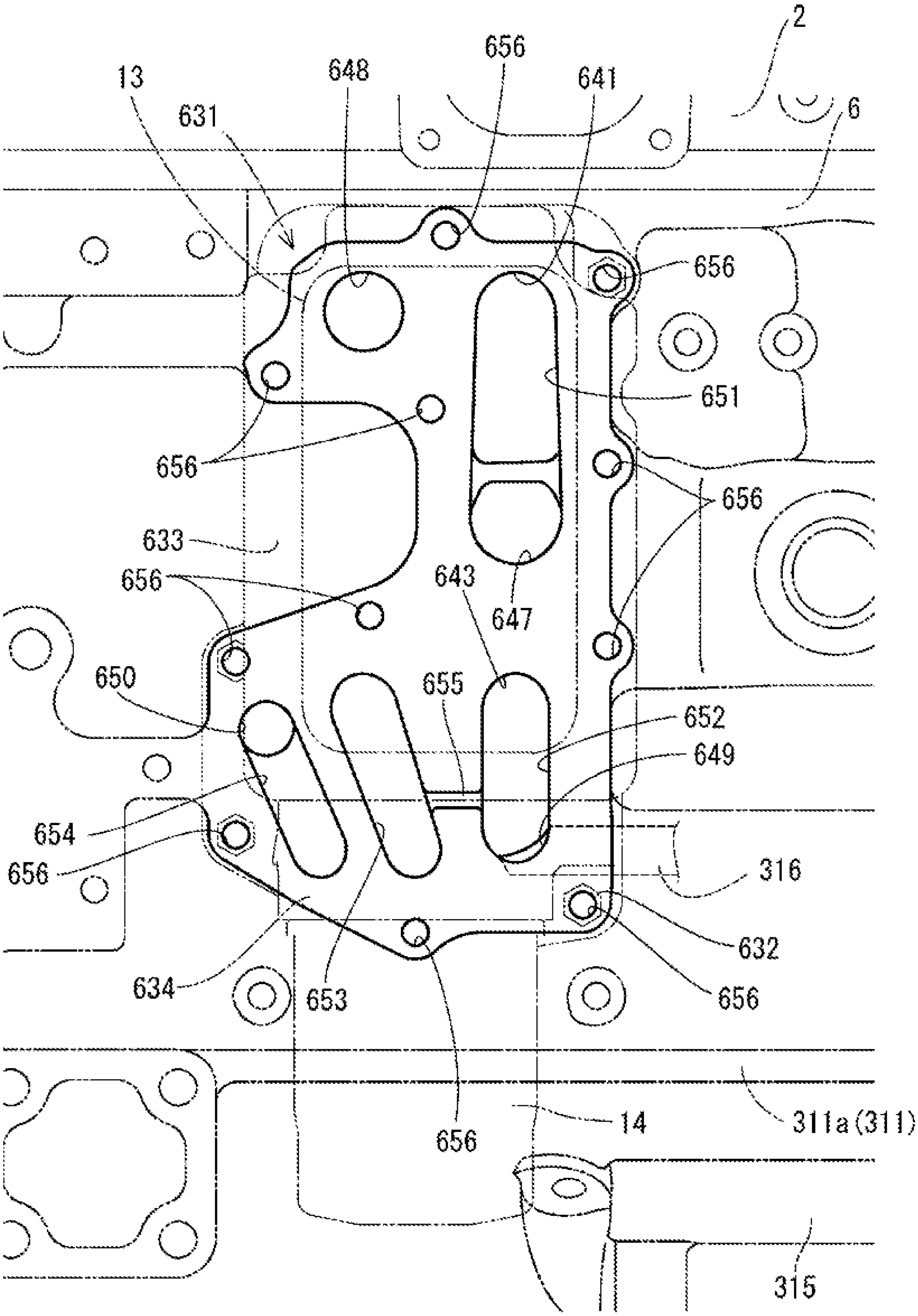
FIG. 34 is a right side view showing an oil cooler bracket attachment pedestal.
Figure 35:
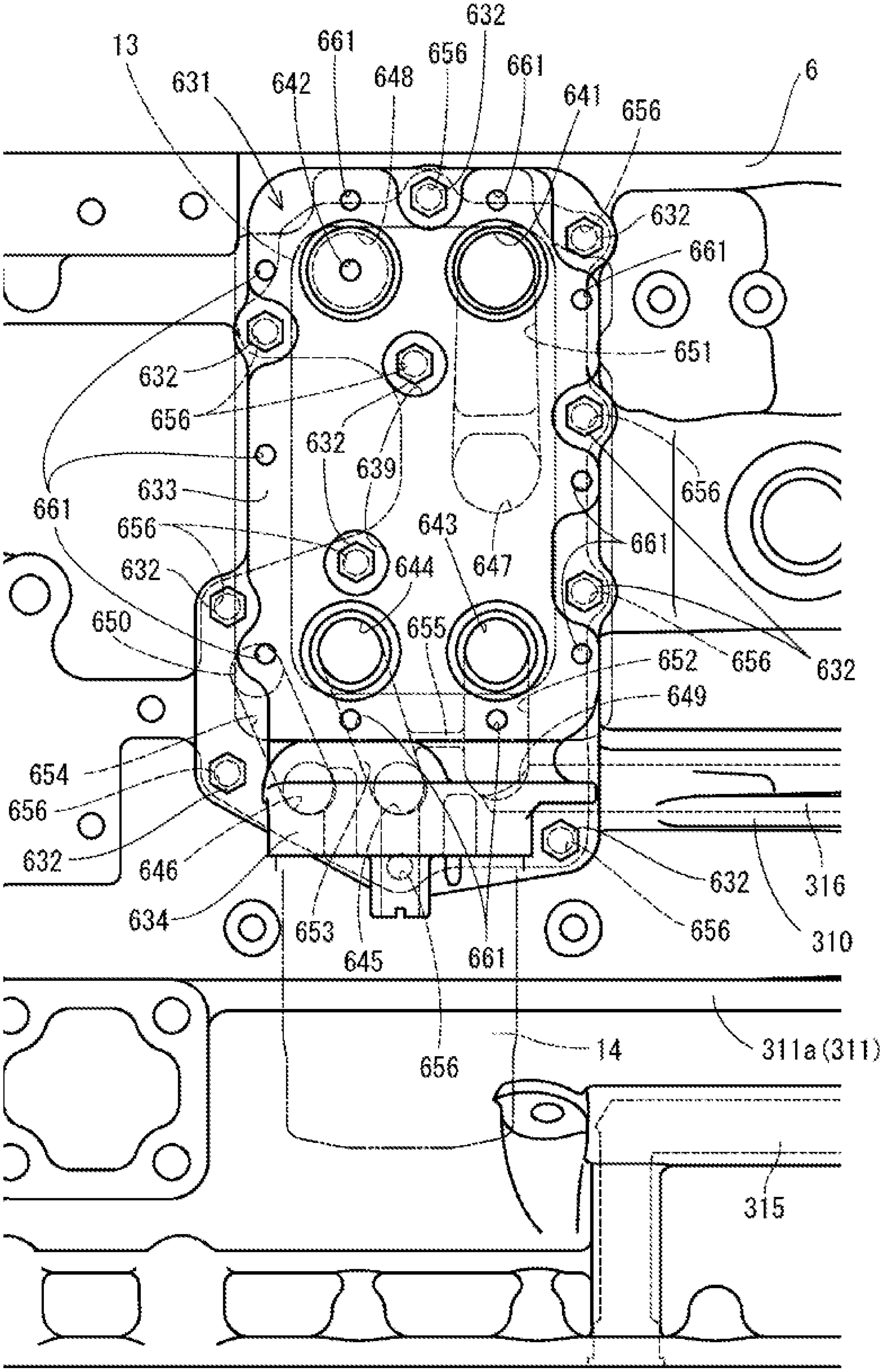
FIG. 35 is a right side view showing an attachment state of the oil cooler bracket.

As shown in FIG. 34, the oil cooler bracket attachment pedestal 318 is provided with: a coolant outlet 647 connected to the water rail 610 (see FIG. 13 and FIG. 30) provided inside the cylinder block 6; a coolant return port 648 connected to a coolant return passage (not shown) provided inside the cylinder block 6; a lubricant outlet 649 connected to the lubricant supply passage 316 (see FIG. 11 and FIG. 13) provided inside the cylinder block 6; and a lubricant return port 650 connected to a lubricant feed passage (not shown) provided inside the cylinder block 6.

In the oil cooler bracket attachment pedestal 318, a coolant inflow passage 651, a lubricant inflow passage 652, a lubricant relay passage 653, and a lubricant outflow passage 654 are formed. The coolant inflow passage 651 guides a coolant from the coolant outlet 647 to the coolant inflow hole 641 of the oil cooler bracket 631. The lubricant inflow passage 652 guides a lubricant from the lubricant outlet 649 to the lubricant inflow hole 643. The lubricant relay passage 653 guides a lubricant from the lubricant outflow hole 644 to the lubricant inlet passage 645. The lubricant outflow passage 654 guides a lubricant from the lubricant outlet passage 646 to the lubricant return port 650. A bypass passage 655 is formed between the lubricant inflow passage 652 and the lubricant relay passage 653.

Each of these passages 651, 652, 653, 654, 655 is constituted of a recessed groove formed in a surface of the oil cooler bracket attachment pedestal 318, and, when covered with the joining surface 636 of the oil cooler bracket 631, forms a passage that allows a fluid to circulate therethrough. The bypass passage 655 is a passage for bypassing a lubricant of the lubricant outlet 649 from the lubricant inflow passage 652 to the lubricant relay passage 653, in order to prevent an excessive oil pressure rise within the oil cooler 13. A groove width and a groove depth of the bypass passage 655, which mean a fluid passage cross-sectional area of the bypass passage 655, is smaller than that of the lubricant inflow passage 652 and that of the lubricant relay passage 653. The oil cooler bracket attachment pedestal 318 has, at positions corresponding to the bolt insertion holes 638 of the oil cooler bracket 631, bracket bolt holes 656 in which the bracket bolts 632 are inserted.

Figure 32:
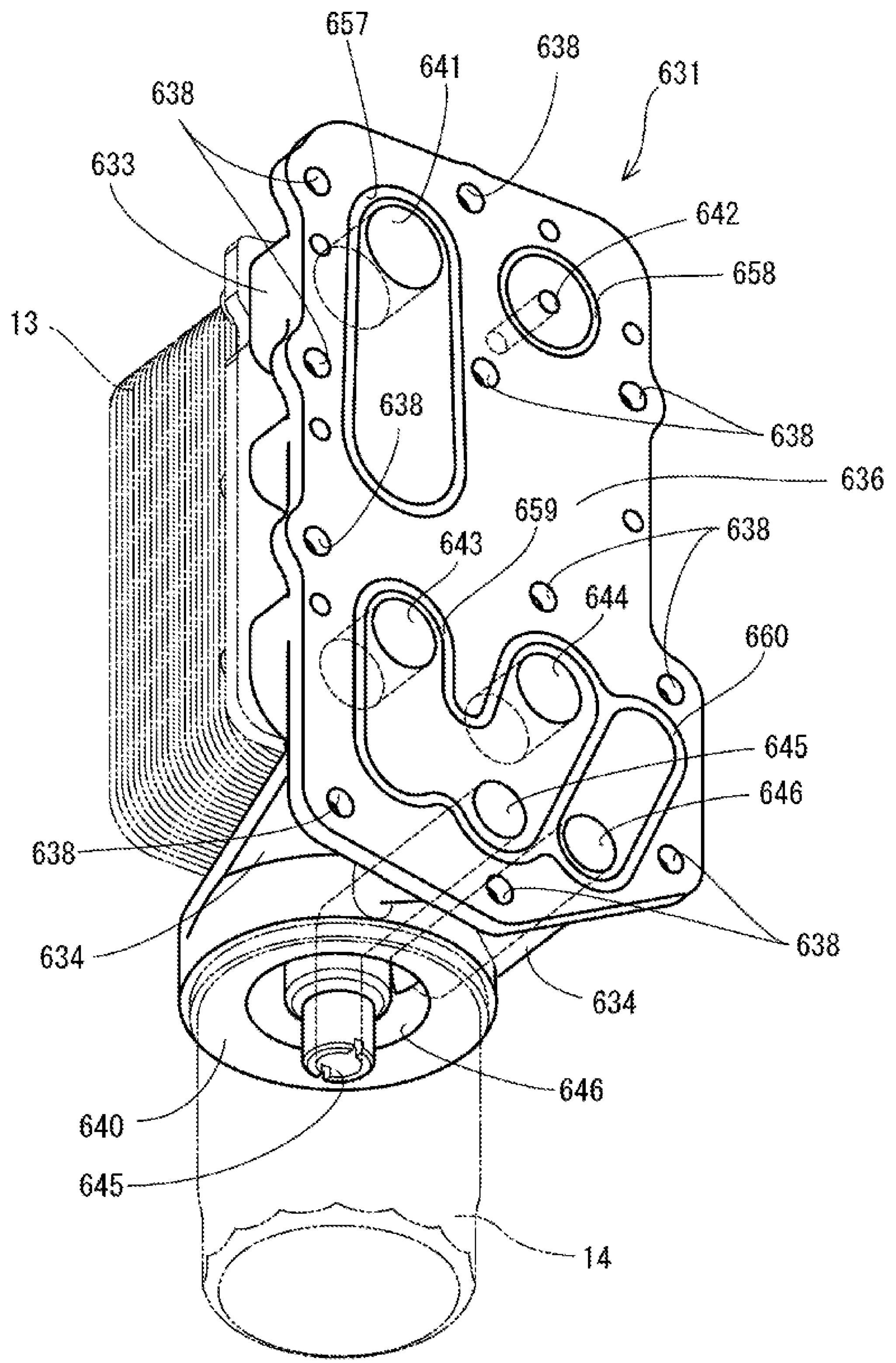
FIG. 32 is a perspective view showing the oil cooler bracket.
Figure 33:
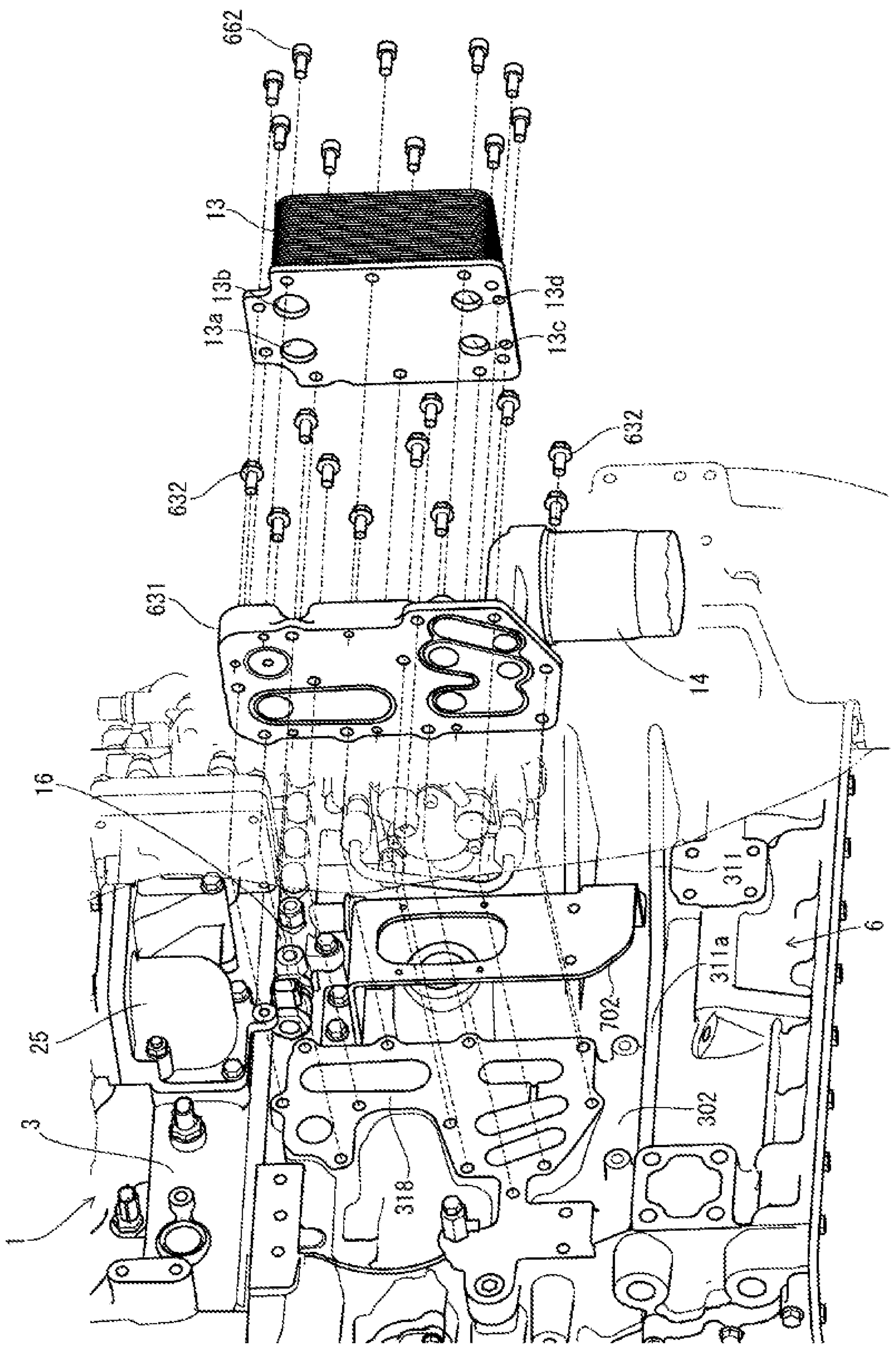
FIG. 33 is an exploded perspective view showing a structure of attachment of the oil cooler bracket and an oil cooler.

As shown in FIG. 32, the joining surface 636 of the oil cooler bracket 631 has a seal member accommodating groove 657, a seal member accommodating groove 658, a seal member accommodating groove 659, and a seal member accommodating groove 660. While the oil cooler bracket 631 is attached to the oil cooler bracket attachment pedestal 318; the seal member accommodating groove 657 encloses an outer periphery of the coolant inflow passage 651, the seal member accommodating groove 658 encloses an outer periphery of the coolant return port 648, the seal member accommodating groove 659 encloses an outer periphery of a group of the lubricant inflow passage 652, the lubricant relay passage 653, and the bypass passage 655, and the seal member accommodating groove 660 encloses an outer periphery of the lubricant outflow passage 654. While these seal member accommodating grooves 657, 658, 659, 660 accommodate seal members (not shown) made of elastic members for example, the oil cooler bracket 631 is attached to the oil cooler bracket attachment pedestal 318, to thereby exert a sealability between the oil cooler bracket 631 and the oil cooler bracket attachment pedestal 318.

Figure 31:
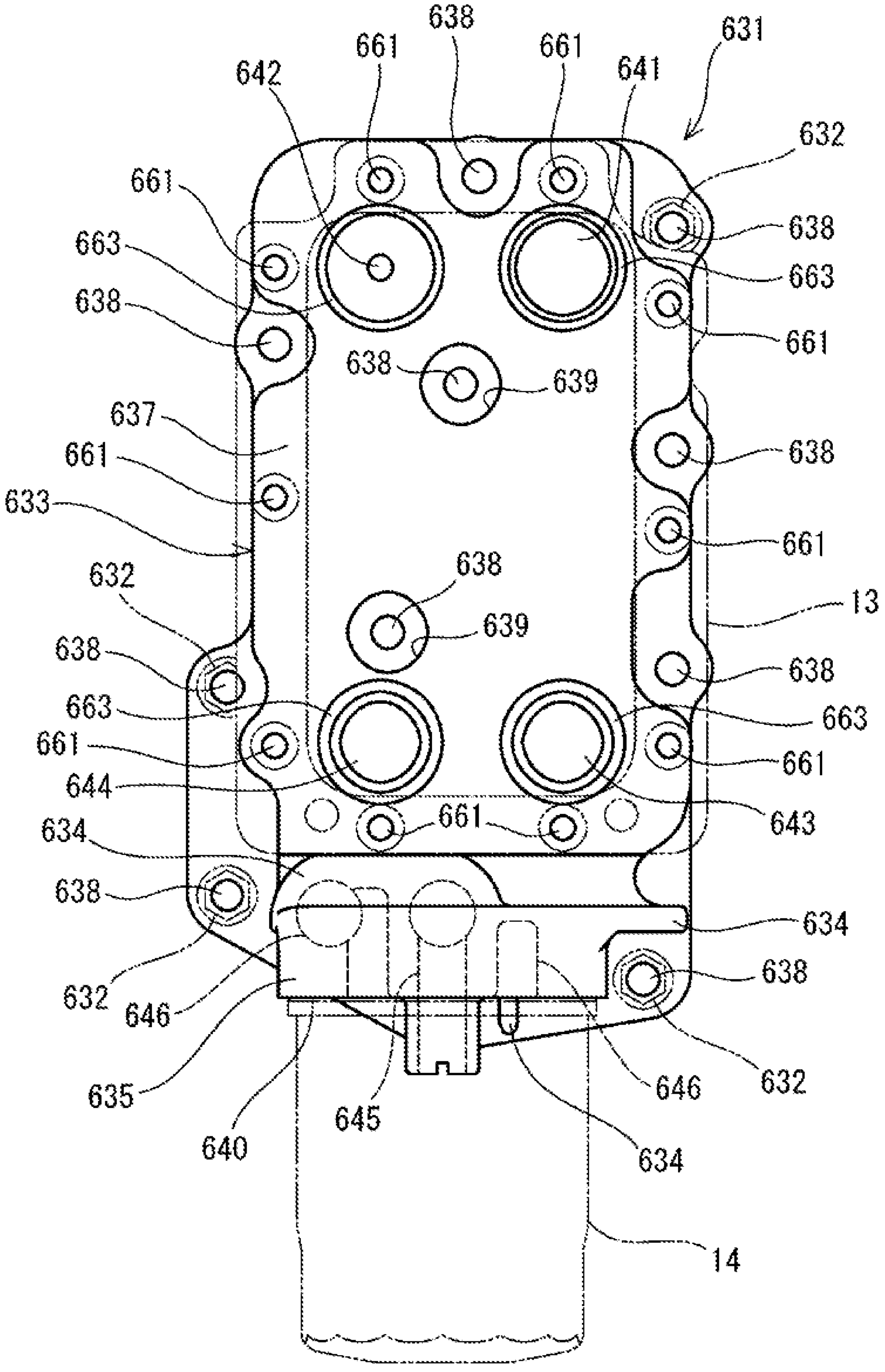
FIG. 31 is a top plan view showing an oil cooler bracket.

As shown in FIG. 31 and FIG. 32, the oil cooler attaching face 637 of the oil cooler bracket 631 has, in its peripheral edge portion, a plurality of cooler bolt holes 661. Cooler bolts 662 are inserted through bolt insertion holes formed in a peripheral edge portion of the oil cooler 13, and are fastened to the cooler bolt holes 661, thereby fixing the oil cooler 13 to the oil cooler bracket 631. The oil cooler attaching face 637 has four circular seal member accommodating grooves 663 surrounding outer peripheries of the coolant inflow hole 641, the coolant outflow hole 642, the lubricant inflow hole 643, and the lubricant outflow hole 644, respectively. The oil cooler 13 is attached to the oil cooler bracket 631 with a seal member (not shown) made of an elastic member such as an O-ring accommodated in each seal member accommodating groove 663, so that a sealability between the oil cooler 13 and the oil cooler bracket 631 is exerted. A female thread provided in a peripheral edge portion of a casing of the oil filter 14 and a male thread provided in a peripheral edge portion of the oil filter attaching surface 640 of the oil cooler bracket 631 are fastened and fixed to each other, so that the oil filter 14 is attached to the oil filter attaching surface 640.

The engine 1 of this embodiment includes the oil cooler bracket 631 for supporting the oil cooler 13 and the oil filter 14, the oil cooler bracket 631 being attached to the cylinder block 6. The coolant outlet 647, the coolant return port 648, the lubricant outlet 649, and the lubricant return port 650 are provided in the oil cooler bracket attachment pedestal 318 of the cylinder block 6. Via the oil cooler bracket 631, a coolant and a lubricant are circulated in the oil cooler 13, and a lubricant is circulated in the oil filter 14. Accordingly, the engine 1 of this embodiment eliminates the need to provide coolant piping to be connected to the oil cooler 13 and a lubricant pipe member for connecting the oil cooler 13 to the oil filter 14, thus reducing the number of component parts. In addition, since the oil cooler 13 and the oil filter 14 are supported by the same oil cooler bracket 631, the oil cooler 13 and the oil filter 14 can be arranged compactly. Furthermore, since the oil cooler 13 and the oil filter 14 are supported by the single oil cooler bracket 631, the structure for attaching the oil cooler 13 and the oil filter 14 can be simplified.

The oil cooler bracket 631 has the coolant inflow hole 641 to be connected to the coolant outlet 647, and the coolant outflow hole 642 to be connected to the coolant return port 648. The fluid passage cross-sectional area of the coolant outflow hole 642 is smaller than the fluid passage cross-sectional area of the coolant inflow hole 641. This can raise a water pressure in the coolant path that extends from the coolant outlet 647 provided in the oil cooler bracket attachment pedestal 318, through the coolant inflow hole 641 and the coolant passage provided in the oil cooler 13, to the coolant outflow hole 642. Accordingly, a phenomenon in which a larger amount of coolant than necessary flows out from the coolant inflow hole 641 to the coolant return port 648 to drop the water pressure in the coolant passage provided inside the cylinder block 6 can be prevented. Thus, a deterioration in the cooling efficiency of the engine 1 can be prevented.

The oil cooler bracket 631 has, in its oil cooler attaching face 637 which is parallel to the joining surface 636 joined to the oil cooler bracket attachment pedestal 318, the oil cooler attaching part 633 to which the oil cooler 13 is attached, and also has, on the distal end side of the coupling portion 634 which is provided upright on the oil cooler attaching part 633, the oil filter attaching part 635 to which the oil filter 14 is attached on the side opposite to the oil cooler 13. This allows the oil filter 14 to protrude substantially in parallel to the right surface 302 (lateral side portion) of the cylinder block 6, which enables the oil cooler 13 and the oil filter 14 to be arranged compactly and also enables the oil filter 14 to protrude from the right surface 302 of the cylinder block 6 by a shortened distance, thereby compactifying the engine 1.

Figure 36:
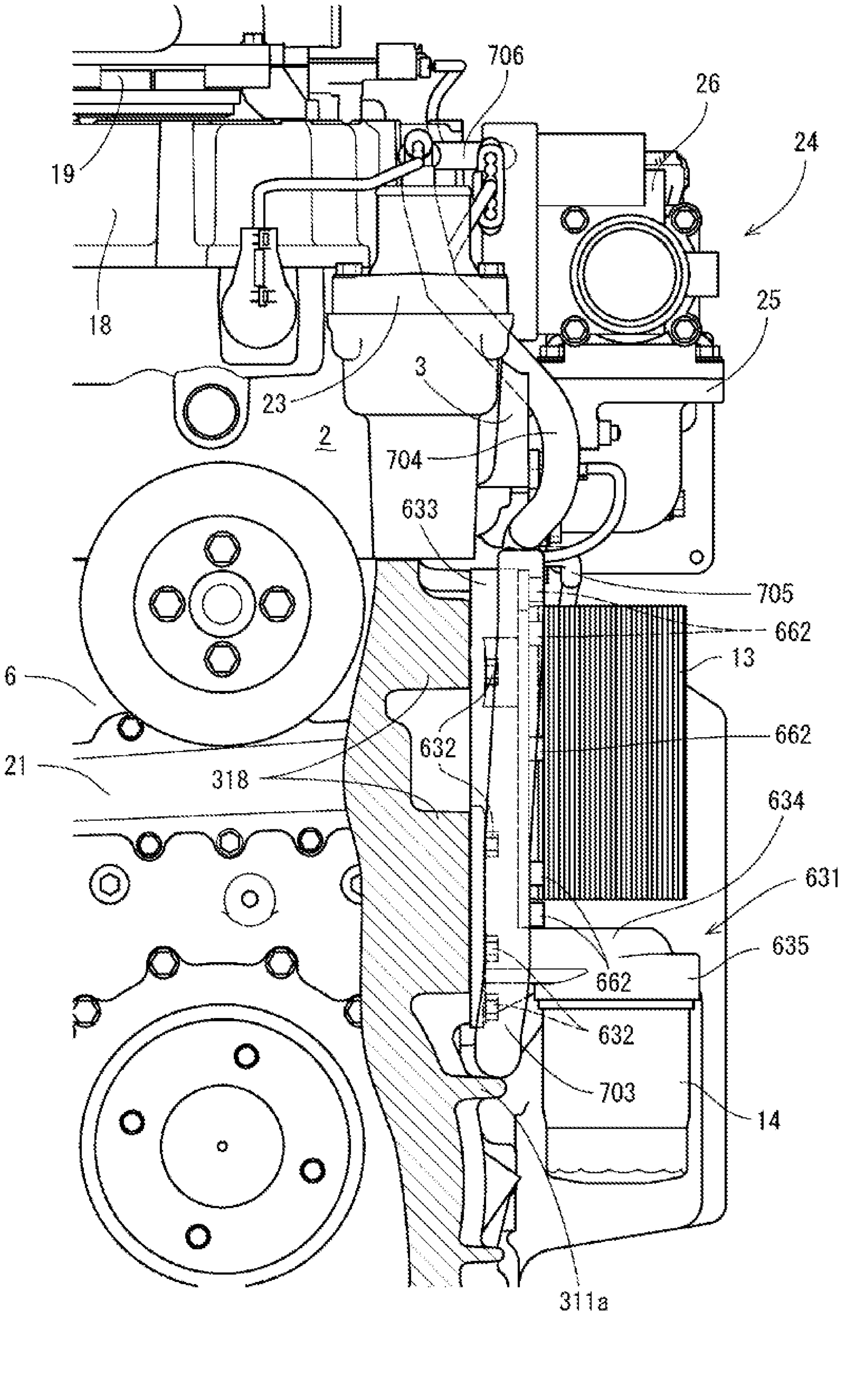
FIG. 36 is a rear view showing a partial cross-section of the cylinder block.
Figure 37:
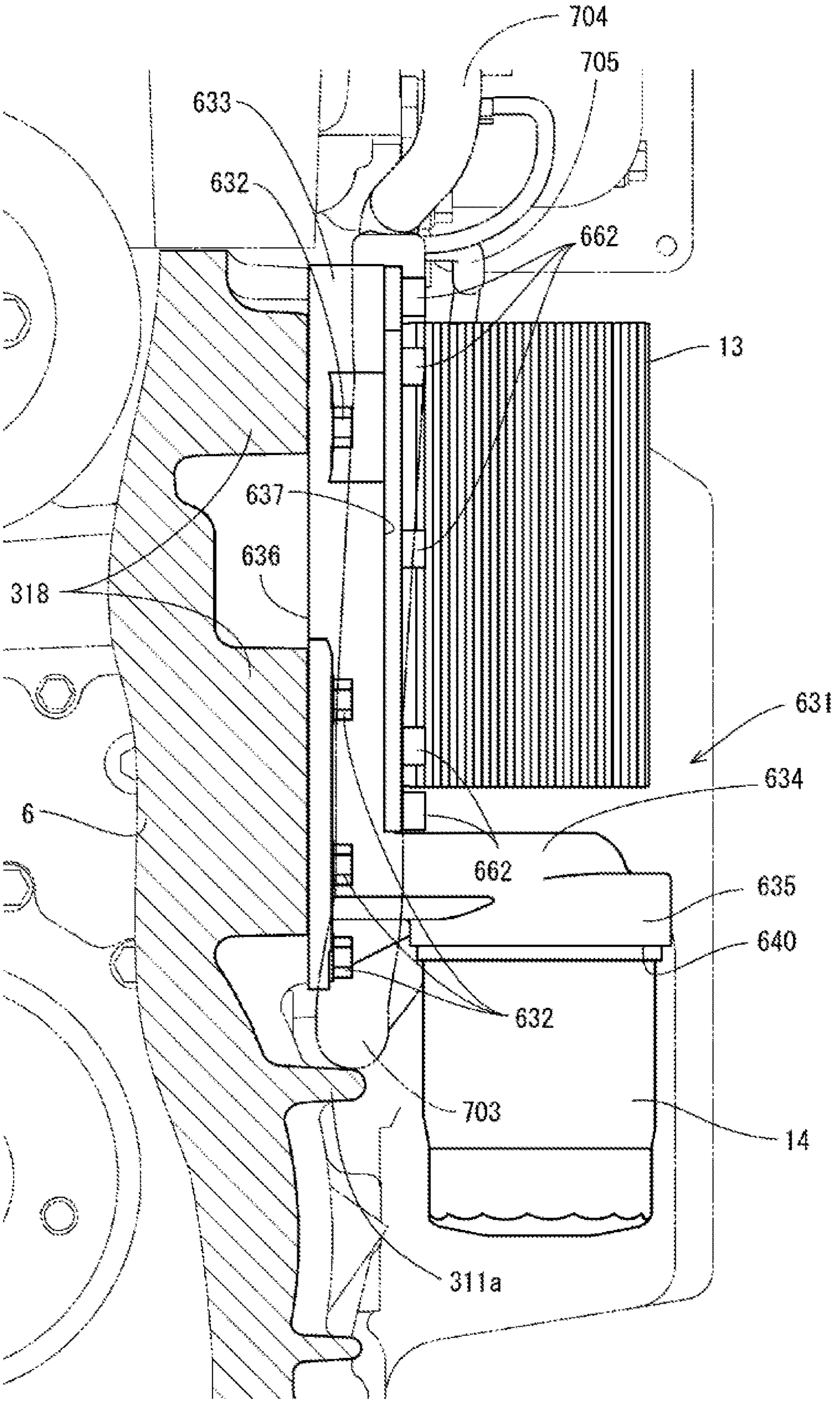
FIG. 37 is a partial cross-sectional rear view showing the oil cooler bracket attachment pedestal and therearound on an enlarged scale.

As shown in FIG. 36 and FIG. 37, the oil filter 14 is supported by the oil cooler bracket 631, and therefore a space can be provided between the oil filter 14 and the right surface 302 of the cylinder block 6. Such a space cannot be obtained by a configuration in which, for example, the oil filter 14 is directly attached to the cylinder block 6. For example, it is possible that the linear portion 311*a* of the right-side second reinforcing rib 311 is arranged in the space between the right surface 302 and the oil filter 14, to enhance the strength and heat dissipation performance of the cylinder block 6, or that the main harness assembly 703 is passed through the space, to shorten the distance by which the main harness assembly 703 is guided. The space between the right surface 302 and the oil filter 14 can be used for other purposes. In this manner, arranging the oil filter 14 at a distance from the cylinder block 6 by using the oil cooler bracket 631 enhances the degree of freedom in designing the engine 1. In addition, arranging the main harness assembly 703 so as to extend along the linear portion 311*a* of the right-side second reinforcing rib 311 can eliminate the need to dispose a bracket for placing and arranging the main harness assembly 703, and also can protect the main harness assembly 703 against dust and dirt, etc. coming from below while preventing interference with a foreign object such as another component part.

The configurations of respective parts of the present invention are not limited to those of the illustrated embodiment, but can be variously changed without departing from the gist of the invention.

REFERENCE SIGNS LIST

1, engine
5, crankshaft
6, cylinder block
7, flywheel housing
8, flywheel
13, oil cooler
14, oil filter
20, starter
27, EGR cooler
30, two-stage turbocharger (turbocharger)
300, crankshaft center
301, left surface (opposite side portions)
302, right surface (opposite side portions)
303, front surface (one side portion)
304, left housing bracket portion
305, right housing bracket portion
306, 307, 308, 309, 310, 311, reinforcing rib
307*a*, 308*a*, 309*a*, 311*a*, linear portion of reinforcing rib
318, oil cooler bracket attachment pedestal (attaching part)
325, bracket recessed portion

341, block upper surface (cylinder head joining surface)
344, motor shaft center
345, turbocharger lubricant pipe
410, starter attachment pedestal
631, oil cooler bracket (bracket member)
633, oil cooler attaching part
634, coupling portion
635, oil filter attaching part
636, joining surface
637, oil cooler attaching face (parallel surface)
641, coolant inflow hole
642, coolant outflow hole
647, coolant outlet
648, coolant return port
649, lubricant outlet
650, lubricant return port

The invention claimed is:

1. An engine device in which a flywheel that rotates integrally with a crankshaft is placed on one side of a cylinder block, and a starter that transmits rotational force to the flywheel when the engine is started is provided, comprising:

a flywheel housing having a starter attachment pedestal for accommodating the flywheel and mounting the starter, being attached to a portion of the one side, wherein the flywheel housing has the starter attachment pedestal at a position not overlapping with a connecting portion between the cylinder block and the flywheel housing.

2. The engine device according to claim 1, wherein the flywheel housing has the starter attachment pedestal below the connecting portion between the cylinder block and the flywheel housing.

3. The engine device according to claim 1, wherein a housing bracket is provided on the one side of the cylinder block, and the flywheel housing has the starter attachment pedestal below a housing bracket portion.

4. The engine device according to claim 2, wherein a housing bracket is provided on the one side of the cylinder block, and the flywheel housing has the starter attachment pedestal below a housing bracket portion.

5. The engine device according to claim 3, wherein the cylinder block has a reinforcing rib provided between a side wall of the cylinder block and a lower portion of the housing bracket portion so that a side portion of the housing bracket is widened.

6. The engine device according to claim 4, wherein the cylinder block has a reinforcing rib provided between a side wall of the cylinder block and a lower portion of the housing bracket portion so that a side portion of the housing bracket is widened.

7. The engine device according to claim 1, wherein the engine device is configured with a turbocharger lubricating oil pipe that circulates lubricating oil to a turbocharger and an EGR cooler that cools an EGR gas that is part of an exhaust gas and is mixed in with fresh air, and wherein the starter is arranged at a position that does not overlap with the turbocharger lubricating oil pipe and the EGR cooler when viewed from a cylinder head joining surface side.

8. The engine device according to claim 2, wherein the engine device is configured with a turbocharger lubricating oil pipe that circulates lubricating oil to a turbocharger and an EGR cooler that cools an EGR gas that is part of an exhaust gas and is mixed in with fresh air, and wherein the starter is arranged at a position that does not overlap with the turbocharger lubricating oil pipe and the EGR cooler when viewed from a cylinder head joining surface side.

9. The engine device according to claim 3, wherein the engine device is configured with a turbocharger lubricating oil pipe that circulates lubricating oil to a turbocharger and an EGR cooler that cools an EGR gas that is part of an exhaust gas and is mixed in with fresh air, and wherein the starter is arranged at a position that does not overlap with the turbocharger lubricating oil pipe and the EGR cooler when viewed from a cylinder head joining surface side.

10. The engine device according to claim 4, wherein the engine device is configured with a turbocharger lubricating oil pipe that circulates lubricating oil to a turbocharger and an EGR cooler that cools an EGR gas that is part of an exhaust gas and is mixed in with fresh air, and wherein the starter is arranged at a position that does not overlap with the turbocharger lubricating oil pipe and the EGR cooler when viewed from a cylinder head joining surface side.

11. The engine device according to claim 5, wherein the engine device is configured with a turbocharger lubricating oil pipe that circulates lubricating oil to a turbocharger and an EGR cooler that cools an EGR gas that is part of an exhaust gas and is mixed in with fresh air, and wherein the starter is arranged at a position that does not overlap with the turbocharger lubricating oil pipe and the EGR cooler when viewed from a cylinder head joining surface side.

12. The engine device according to claim 6, wherein the engine device is configured with a turbocharger lubricating oil pipe that circulates lubricating oil to a turbocharger and an EGR cooler that cools an EGR gas that is part of an exhaust gas and is mixed in with fresh air, and wherein the starter is arranged at a position that does not overlap with the turbocharger lubricating oil pipe and the EGR cooler when viewed from a cylinder head joining surface side.

13. The engine device according to claim 1, wherein a gear case formed by a housing-side gear casing and a block-side gear casing is formed in a space surrounded by the one side portion of the cylinder block, the housing bracket portion, and the flywheel housing;

the flywheel housing is formed with a starter attachment portion having the starter attachment pedestal; and the through hole, formed in the starter attachment portion and into which an end portion of a pinion gear side of the starter is inserted, is provided in the flywheel housing and is partitioned from an internal space of the gear case by a housing-side projecting portion that surrounds the housing-side gear casing.

14. The engine device according to claim 2, wherein a gear case formed by a housing-side gear casing and a block-side gear casing is formed in a space surrounded by the one side portion of the cylinder block, the housing bracket portion, and the flywheel housing;

the flywheel housing is formed with a starter attachment portion having the starter attachment pedestal; and the through hole, formed in the starter attachment portion and into which an end portion of a pinion gear side of the starter is inserted, is provided in the flywheel housing and is partitioned from an internal space of the gear case by a housing-side projecting portion that surrounds the housing-side gear casing.

15. The engine device according to claim 3, wherein a gear case formed by a housing-side gear casing and a block-side gear casing is formed in a space surrounded by the one side portion of the cylinder block, the housing bracket portion, and the flywheel housing;

the flywheel housing is formed with a starter attachment portion having the starter attachment pedestal; and the through hole, formed in the starter attachment portion and into which an end portion of a pinion gear side of the starter is inserted, is provided in the flywheel housing and is partitioned from an internal space of the gear case by a housing-side projecting portion that surrounds the housing-side gear casing.

16. The engine device according to claim 4, wherein a gear case formed by a housing-side gear casing and a block-side gear casing is formed in a space surrounded by the one side portion of the cylinder block, the housing bracket portion, and the flywheel housing;

the flywheel housing is formed with a starter attachment portion having the starter attachment pedestal; and the through hole, formed in the starter attachment portion and into which an end portion of a pinion gear side of the starter is inserted, is provided in the flywheel housing and is partitioned from an internal space of the gear case by a housing-side projecting portion that surrounds the housing-side gear casing.

17. The engine device according to claim 5, wherein a gear case formed by a housing-side gear casing and a block-side gear casing is formed in a space surrounded by the one side portion of the cylinder block, the housing bracket portion, and the flywheel housing;

the flywheel housing is formed with a starter attachment portion having the starter attachment pedestal; and the through hole, formed in the starter attachment portion and into which an end portion of a pinion gear side of the starter is inserted, is provided in the flywheel housing and is partitioned from an internal space of the gear case by a housing-side projecting portion that surrounds the housing-side gear casing.

18. The engine device according to claim 6, wherein a gear case formed by a housing-side gear casing and a block-side gear casing is formed in a space surrounded by the one side portion of the cylinder block, the housing bracket portion, and the flywheel housing;

the flywheel housing is formed with a starter attachment portion having the starter attachment pedestal; and the through hole, formed in the starter attachment portion and into which an end portion of a pinion gear side of the starter is inserted, is provided in the flywheel housing and is partitioned from an internal space of the gear case by a housing-side projecting portion that surrounds the housing-side gear casing.

19. The engine device according to claim 7, wherein a gear case formed by a housing-side gear casing and a block-side gear casing is formed in a space surrounded by the one side portion of the cylinder block, the housing bracket portion, and the flywheel housing;

the flywheel housing is formed with a starter attachment portion having the starter attachment pedestal; and the through hole, formed in the starter attachment portion and into which an end portion of a pinion gear side of the starter is inserted, is provided in the flywheel housing and is partitioned from an internal space of the gear case by a housing-side projecting portion that surrounds the housing-side gear casing.

20. The engine device according to claim 8, wherein a gear case formed by a housing-side gear casing and a block-side gear casing is formed in a space surrounded by the one side portion of the cylinder block, the housing bracket portion, and the flywheel housing;

the flywheel housing is formed with a starter attachment portion having the starter attachment pedestal; and the through hole, formed in the starter attachment portion and into which an end portion of a pinion gear side of the starter is inserted, is provided in the flywheel housing and is partitioned from an internal space of the gear case by a housing-side projecting portion that surrounds the housing-side gear casing.

* * * * *